United States Patent
Park et al.

(10) Patent No.: US 10,368,363 B2
(45) Date of Patent: Jul. 30, 2019

(54) UPLINK DATA TRANSMISSION METHOD IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Joonkui Ahn, Seoul (KR); Seonwook Kim, Seoul (KR); Kijun Kim, Seoul (KR); Hanbyul Seo, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/565,804

(22) PCT Filed: Apr. 18, 2016

(86) PCT No.: PCT/KR2016/004000
§ 371 (c)(1),
(2) Date: Oct. 11, 2017

(87) PCT Pub. No.: WO2016/167623
PCT Pub. Date: Oct. 20, 2016

(65) Prior Publication Data
US 2018/0110057 A1    Apr. 19, 2018

Related U.S. Application Data

(60) Provisional application No. 62/148,702, filed on Apr. 16, 2015.

(51) Int. Cl.
| | |
|---|---|
| *H04W 72/12* | (2009.01) |
| *H04B 7/0452* | (2017.01) |
| *H04W 16/14* | (2009.01) |
| *H04W 74/08* | (2009.01) |
| *H04B 7/0404* | (2017.01) |
| *H04W 74/00* | (2009.01) |

(52) U.S. Cl.
CPC .......... *H04W 72/12* (2013.01); *H04B 7/0404* (2013.01); *H04B 7/0452* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2013/0315114 A1* | 11/2013 | Seo | H04L 5/001 370/280 |
| 2014/0003387 A1* | 1/2014 | Lee | H04L 5/001 370/330 |

(Continued)

OTHER PUBLICATIONS

Samsung, "Discussion on LBT for LAA UL"; 3GPP TSG RAN WG1 Ad-hoc Meeting; R1-151049; Paris, France, Mar. 24-26, 2015; pp. 1-3 and Fig. 2.

(Continued)

*Primary Examiner* — Edan Orgad
*Assistant Examiner* — Emmanuel K Maglo
(74) *Attorney, Agent, or Firm* — Dentons US LLP

(57) ABSTRACT

Disclosed are an uplink data transmission method in a wireless communication system and a device therefor. Particularly, a method for transmitting uplink data in an unlicensed band by a user equipment (UE) in a wireless communication system may comprise the steps of: receiving, from a base station, uplink scheduling information within a cell operating in an unlicensed band; sensing a channel of the cell; transmitting a reservation signal when the channel is sensed to be in an idle state; and transmitting, to the base station, uplink data in a wireless resource allocated on the basis of the uplink scheduling information, wherein the channel is sensed to be in the idle state when energy detected, except for the reservation signal transmitted from another UE that is co-scheduled along with the UE for (Continued)

uplink multi-user multiple input multiple output (UL MU-MIMO) transmission, is smaller than a predetermined threshold value.

11 Claims, 21 Drawing Sheets

(52) U.S. Cl.
CPC ....... *H04W 16/14* (2013.01); *H04W 74/0808* (2013.01); *H04W 74/006* (2013.01)

(56) References Cited

U.S. PATENT DOCUMENTS

| | | | |
|---|---|---|---|
| 2014/0036889 A1* | 2/2014 | Kim | H04L 1/1854 370/336 |
| 2014/0362780 A1 | 12/2014 | Malladi et al. | |
| 2015/0049715 A1 | 2/2015 | Yerramalli et al. | |
| 2016/0105897 A1* | 4/2016 | Liu | H04W 72/1226 370/235 |
| 2016/0227416 A1* | 8/2016 | Suzuki | H04W 72/0453 |
| 2016/0302231 A1* | 10/2016 | Chien | H04W 74/0816 |
| 2016/0360553 A1* | 12/2016 | Cheng | H04W 16/14 |
| 2017/0295498 A1* | 10/2017 | Han | H04L 27/0006 |
| 2017/0366308 A1* | 12/2017 | Choi | H04L 1/1887 |

OTHER PUBLICATIONS

Intel Corporation "On the LAA uplink"; 3GPP TSG RAN WG1 Meeting #80-BIS; R1-151827; Belgrade, Serbia, Apr. 20-24, 2015; pp. 1-2.

MediaTek Inc. "LAA Reservation Signal Design"; R1-151938; 3GPP TSG RAN WG1 Meeting #80bis; Belgrade, Serbia, Apr. 20-24, 2015; pp. 1-4 and Fig. 1.

\* cited by examiner

[FIG. 1]
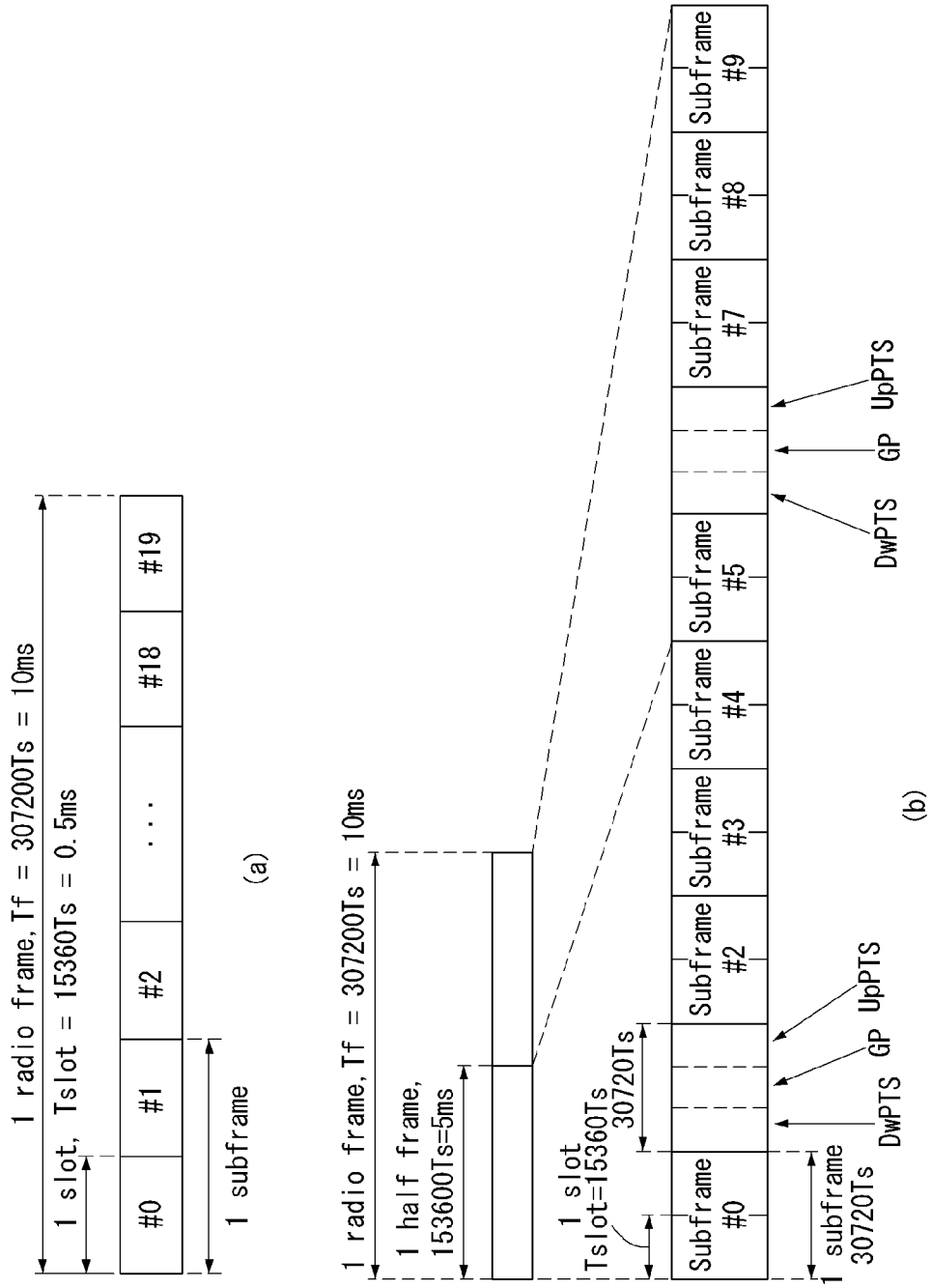

[FIG. 2]
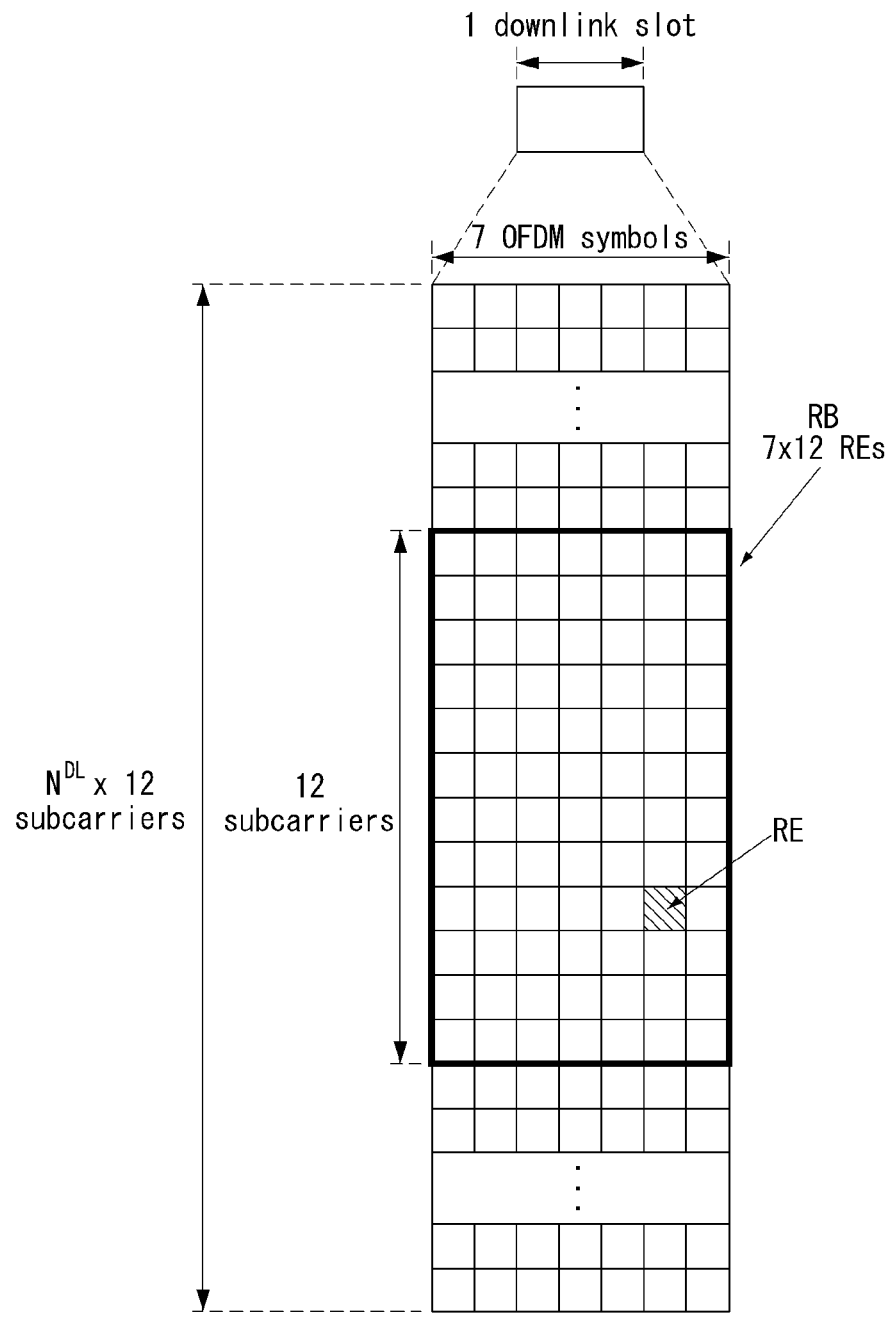

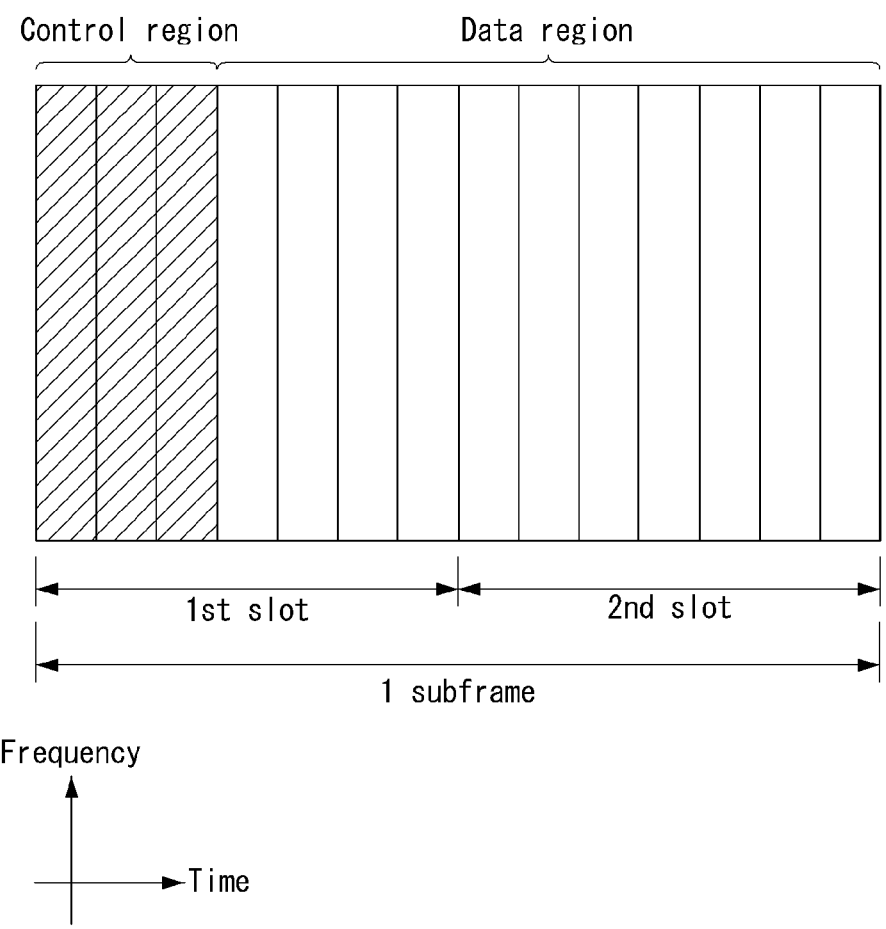
[FIG. 3]

[FIG. 4]
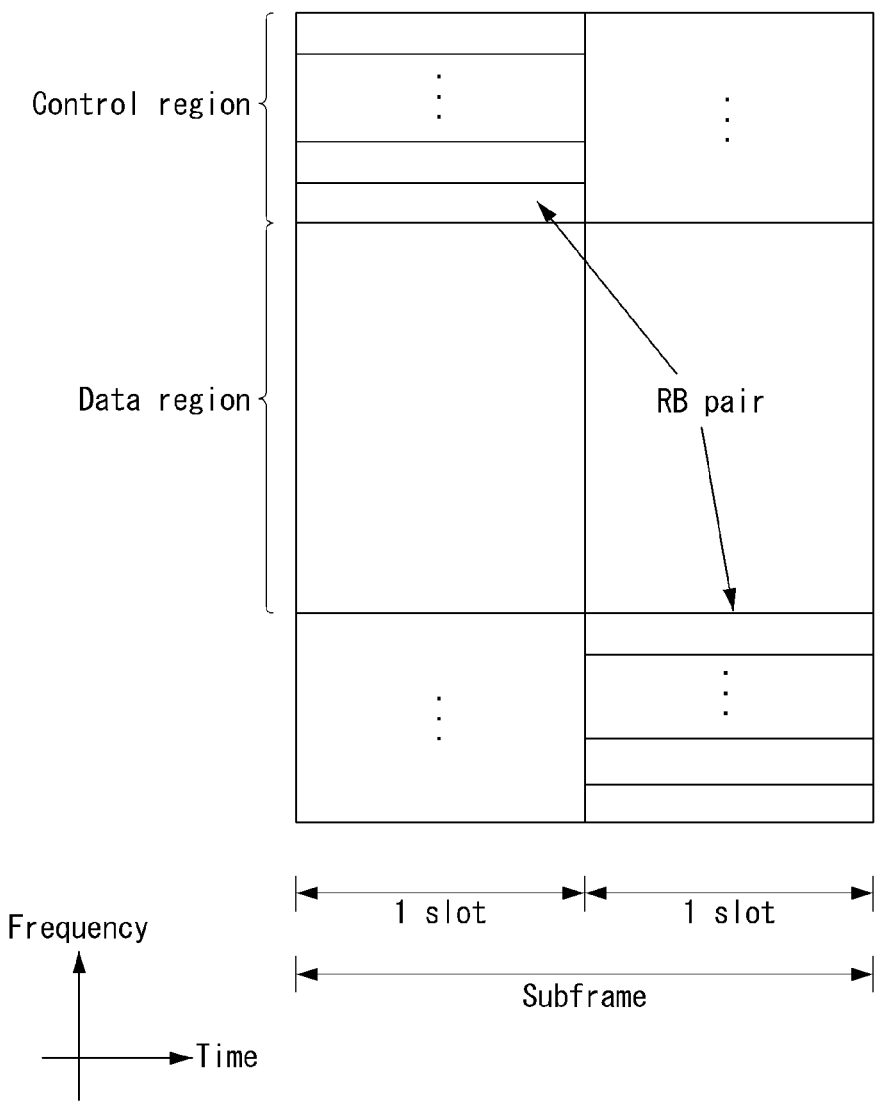

[FIG. 5]
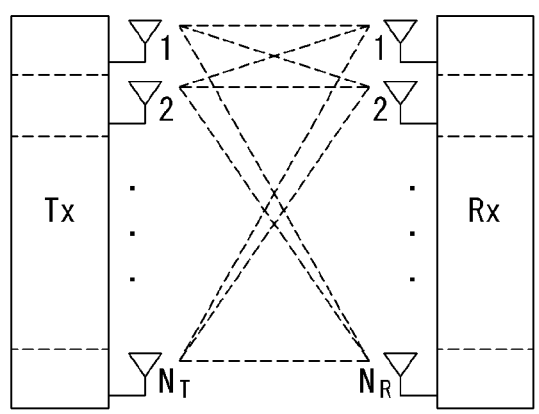
[FIG. 6]
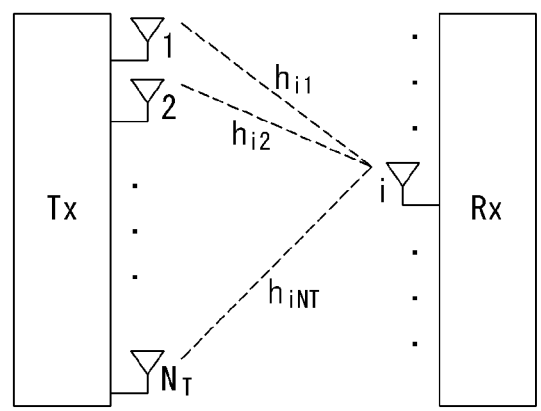

[FIG. 7]
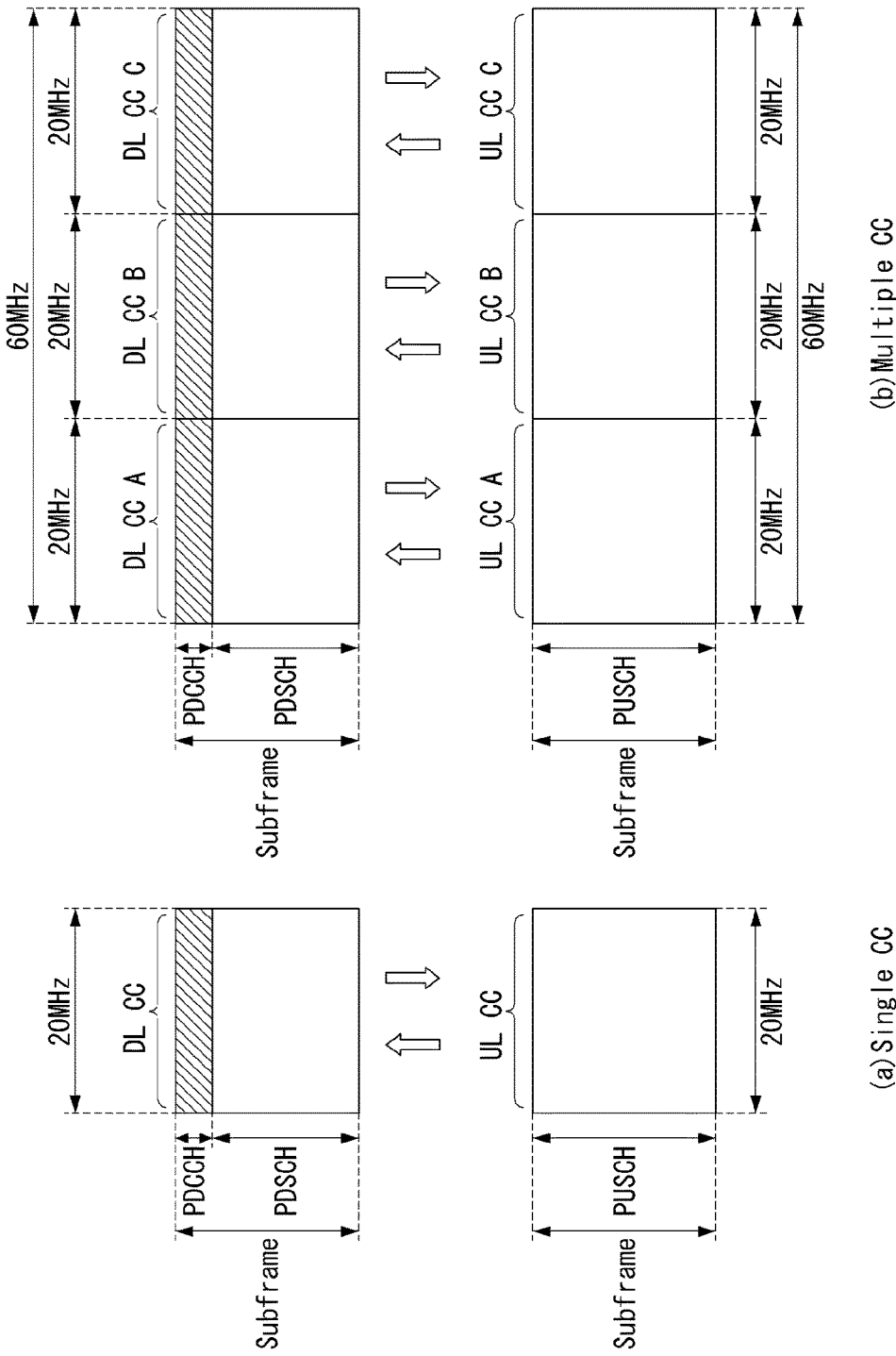

[FIG. 8]
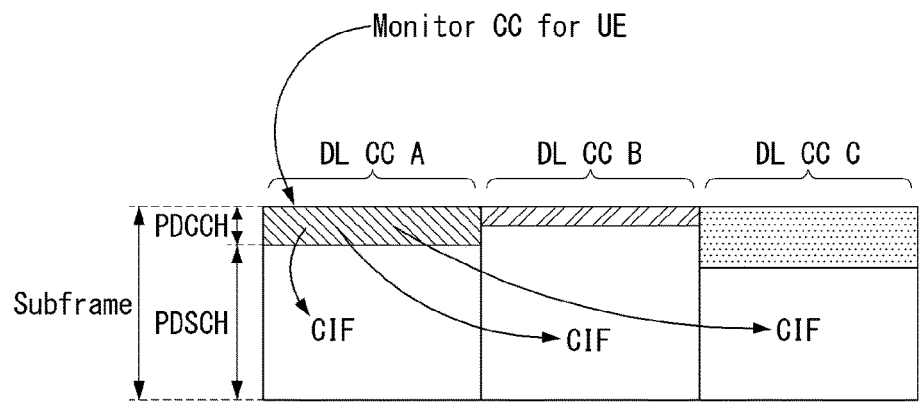
[FIG. 9]
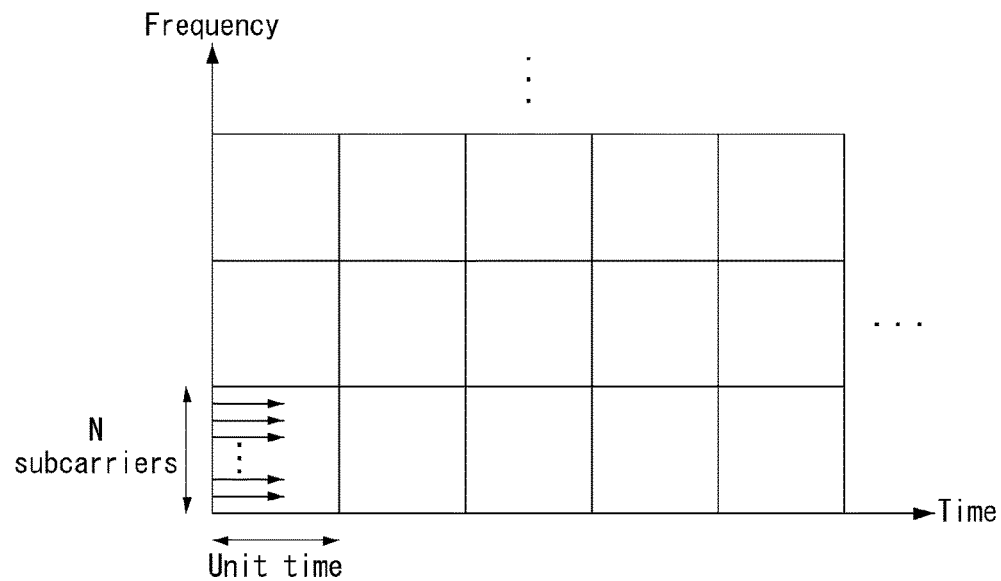

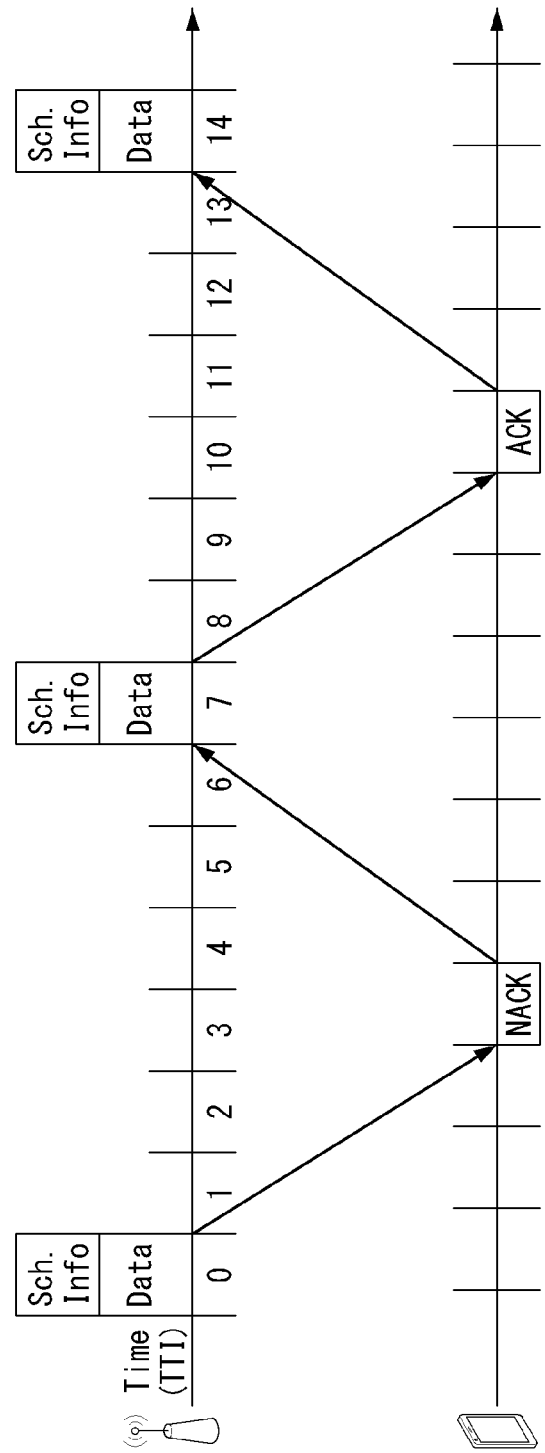
[FIG. 10]

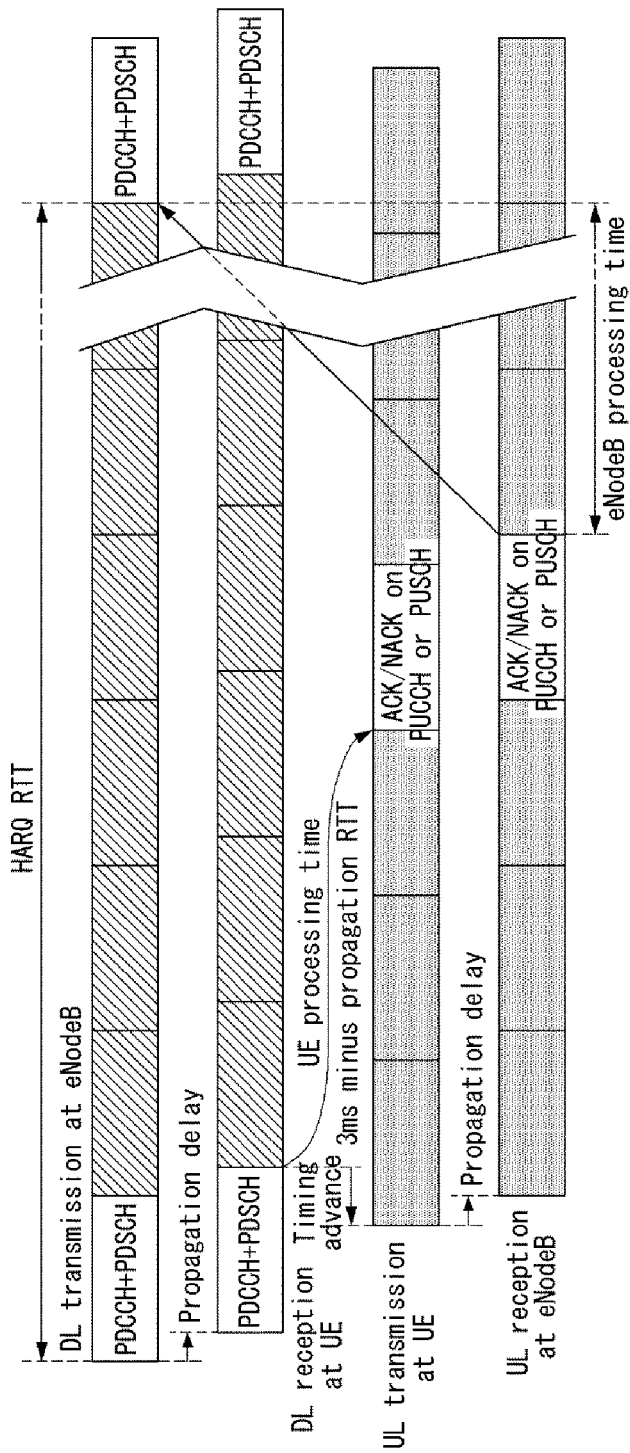
[FIG. 11]

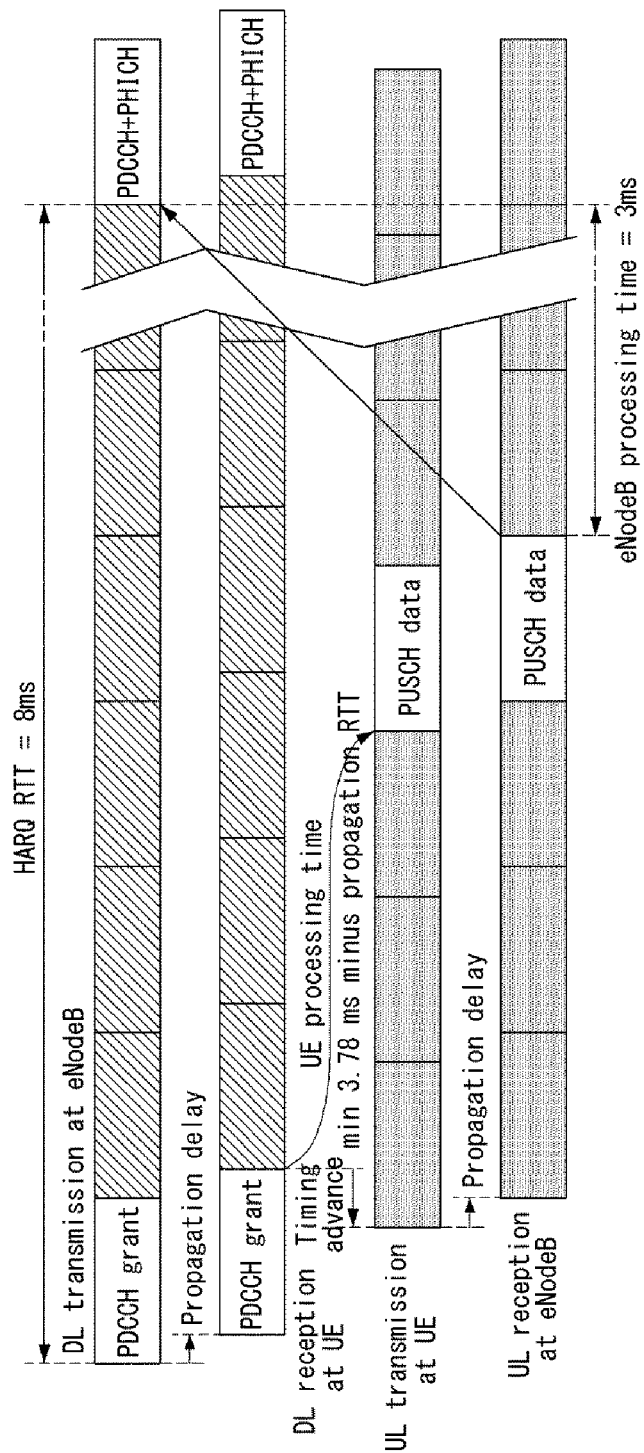
[FIG. 12]

[FIG. 13]
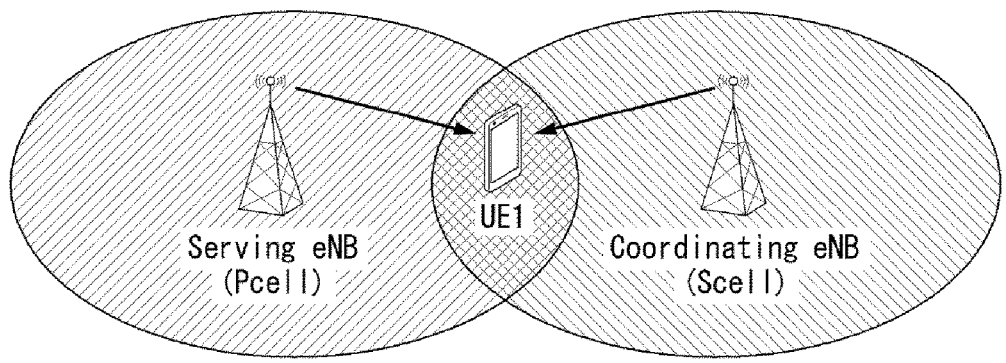
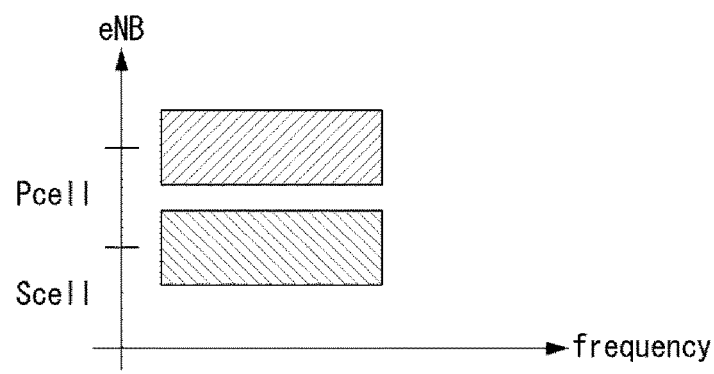

[FIG. 14]
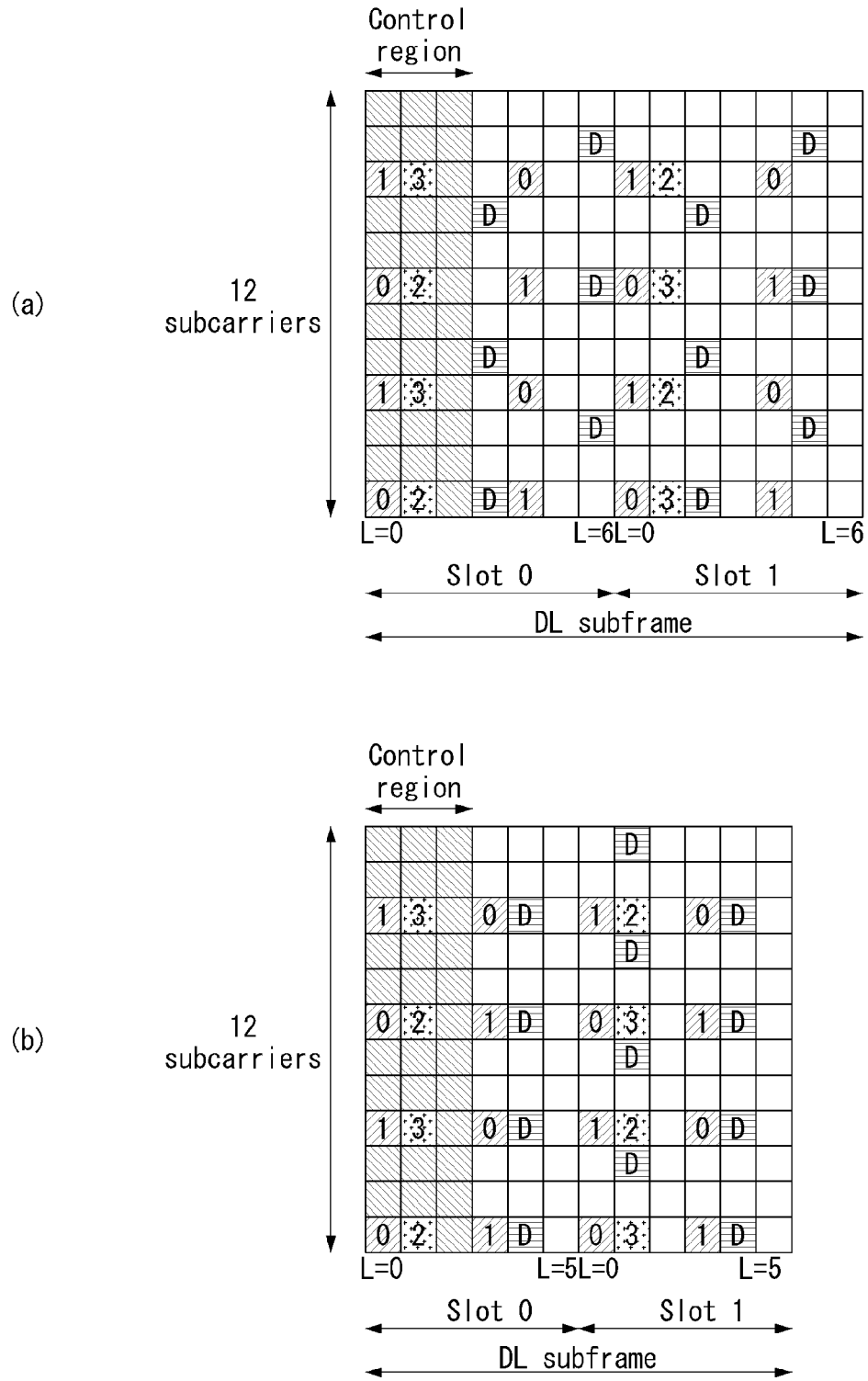

[FIG. 15]
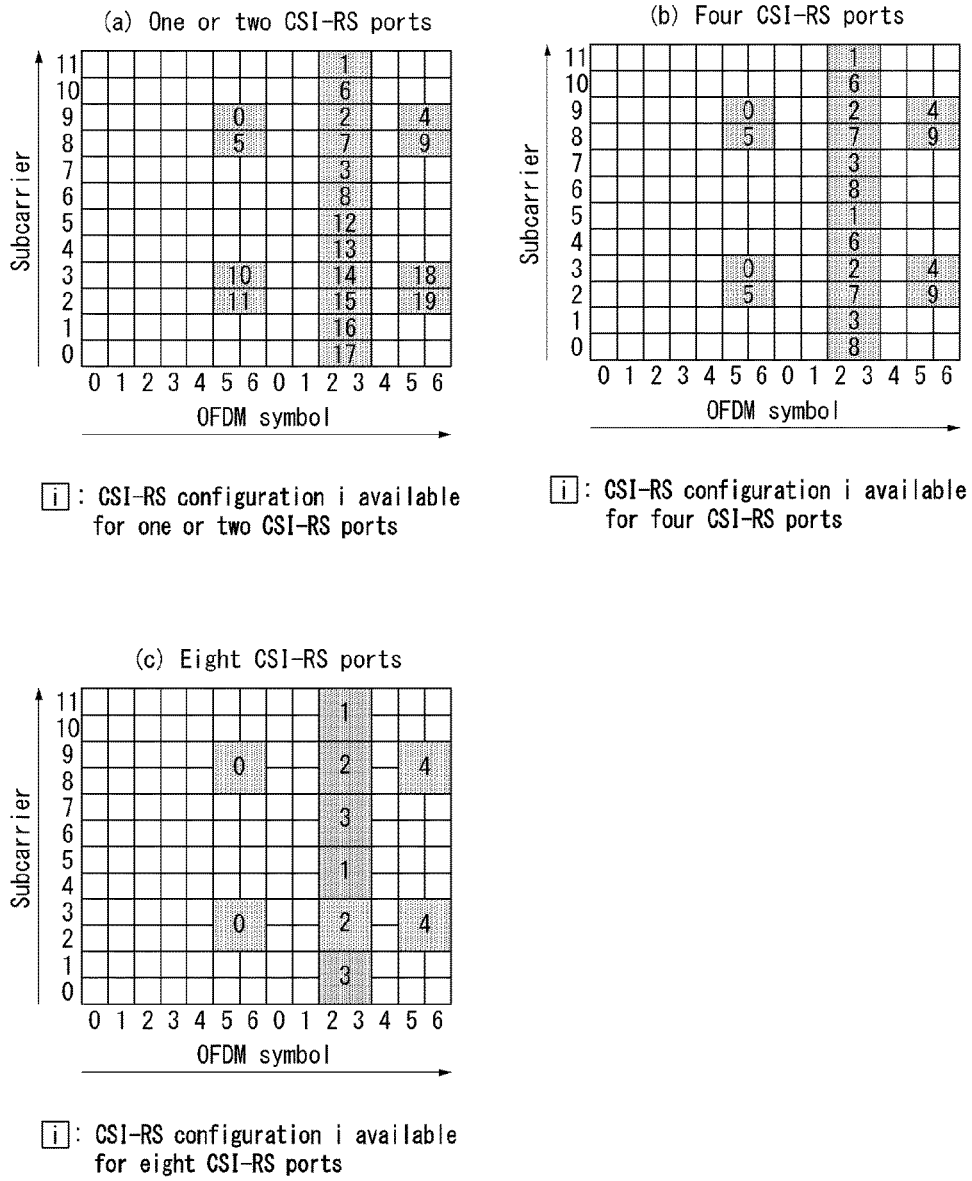

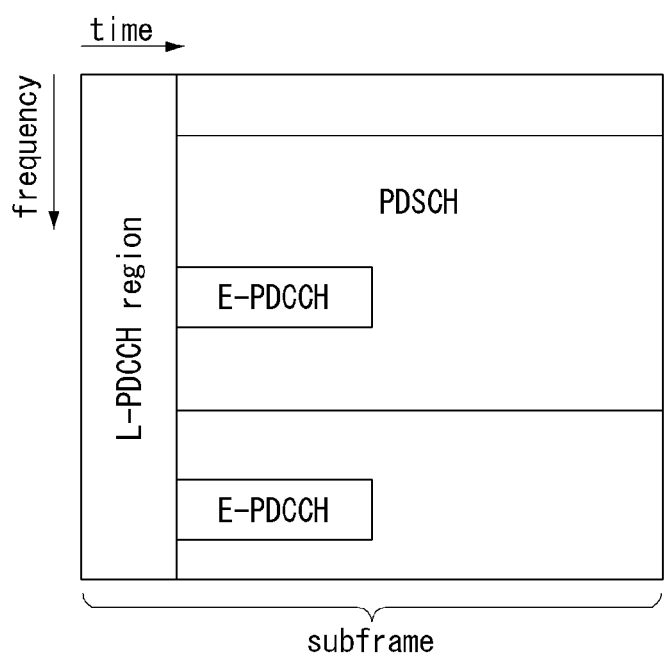
[FIG. 16]

[FIG. 17]
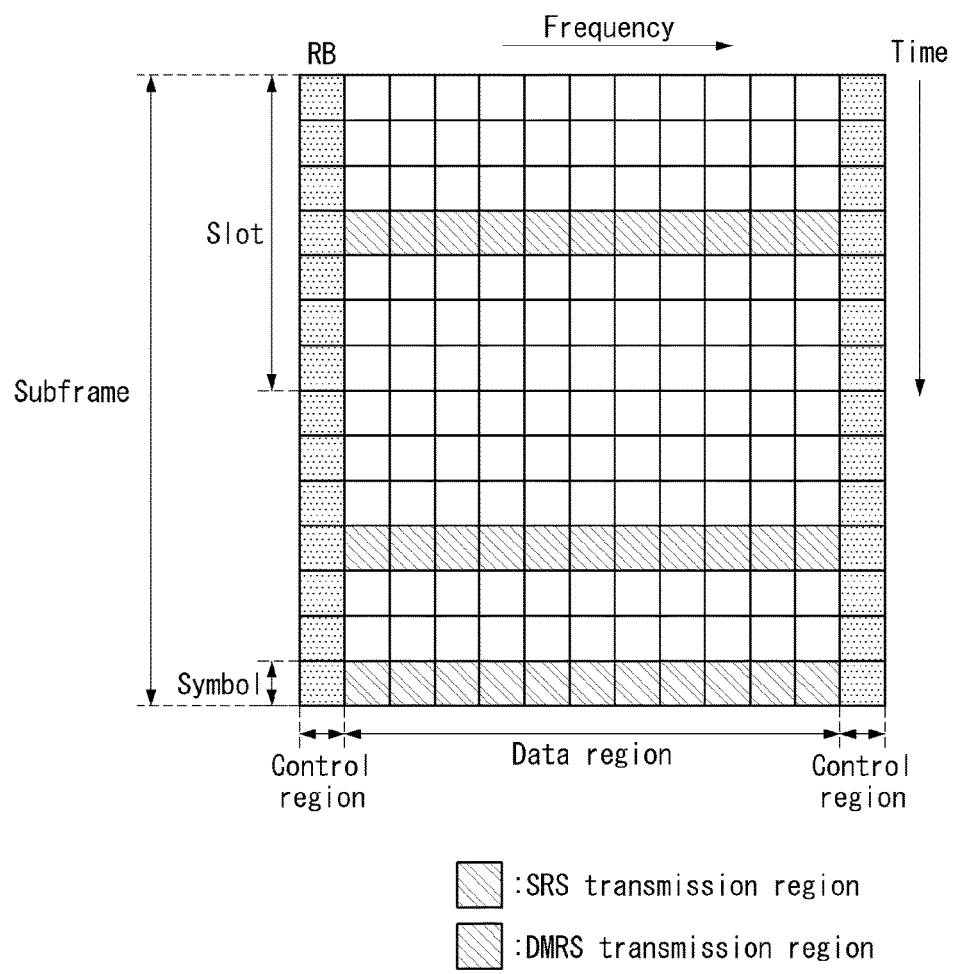

[FIG. 18]
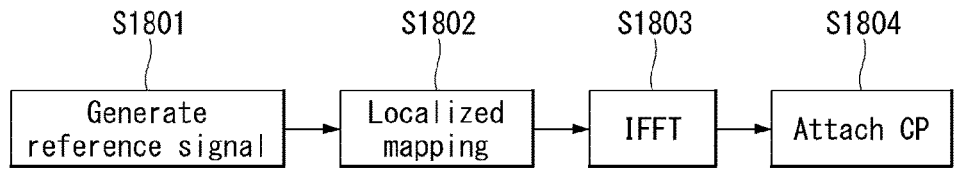
[FIG. 19]
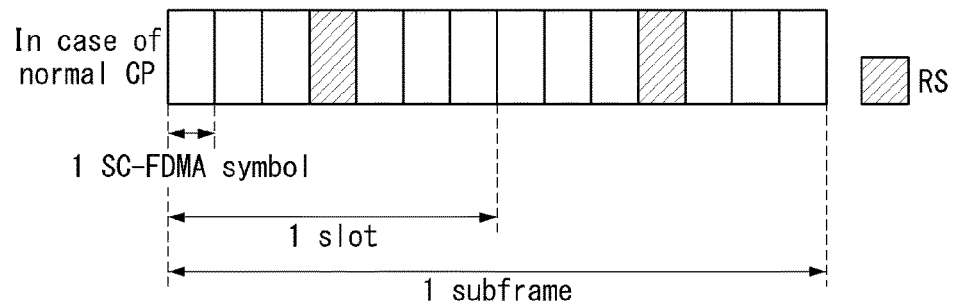
(a)
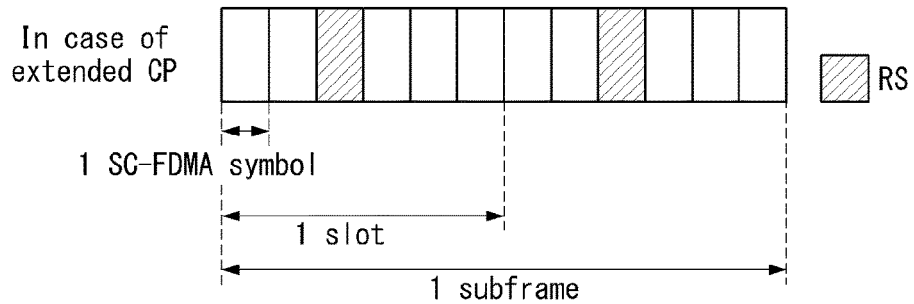
(b)

【FIG. 20】
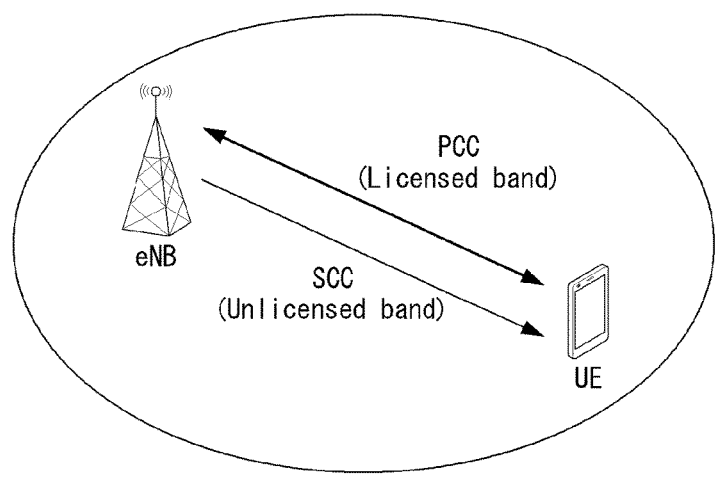
【FIG. 21】
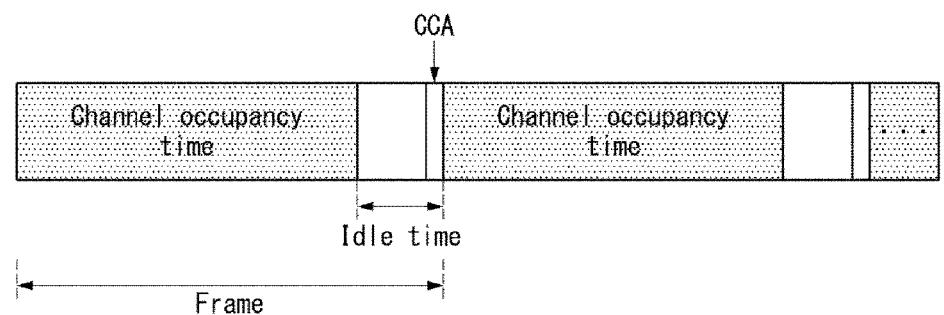

[FIG. 22]
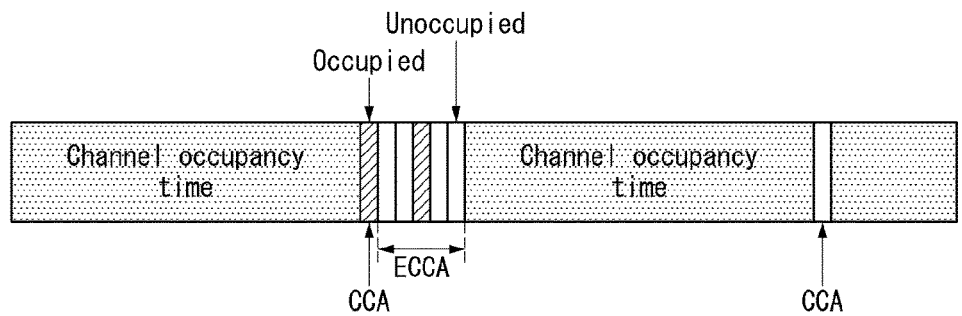
[FIG. 23]
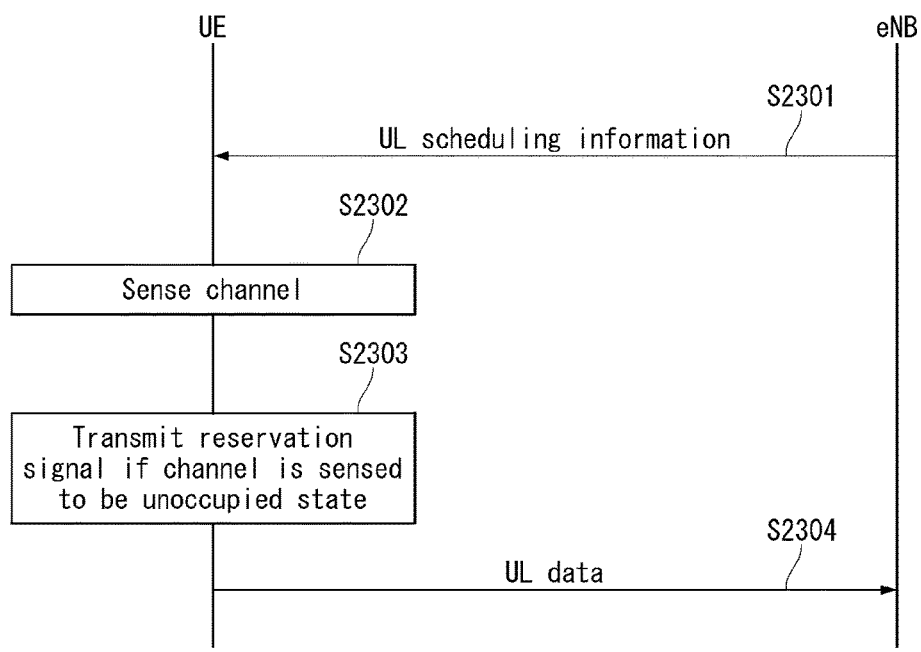

[FIG. 24]
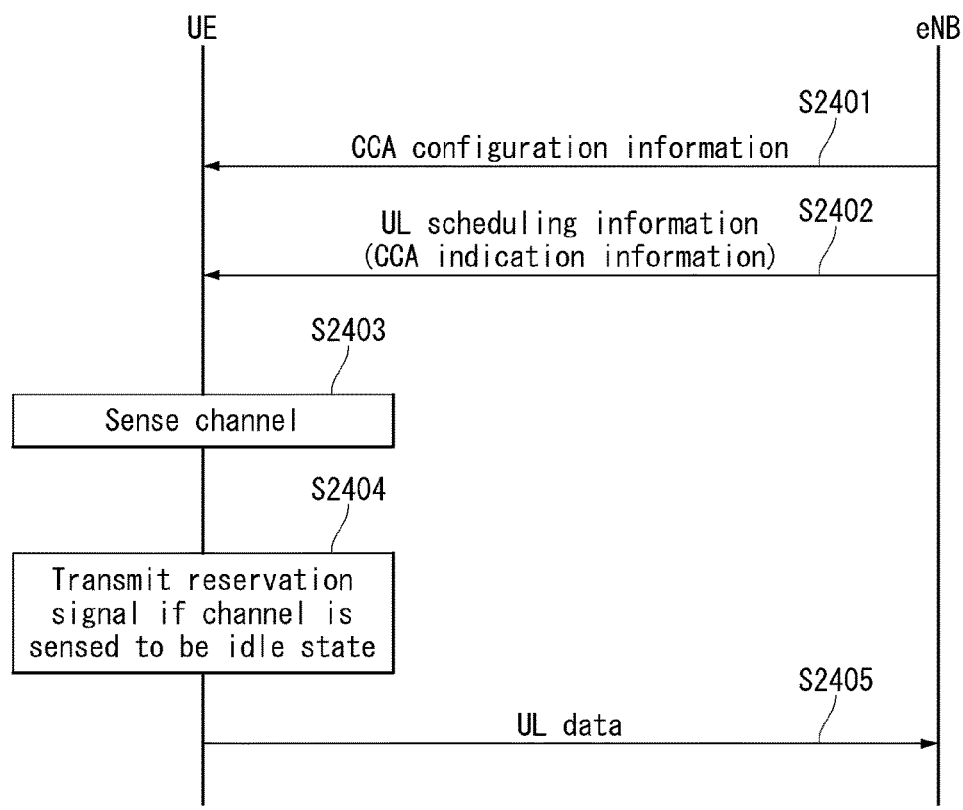

[FIG. 25]
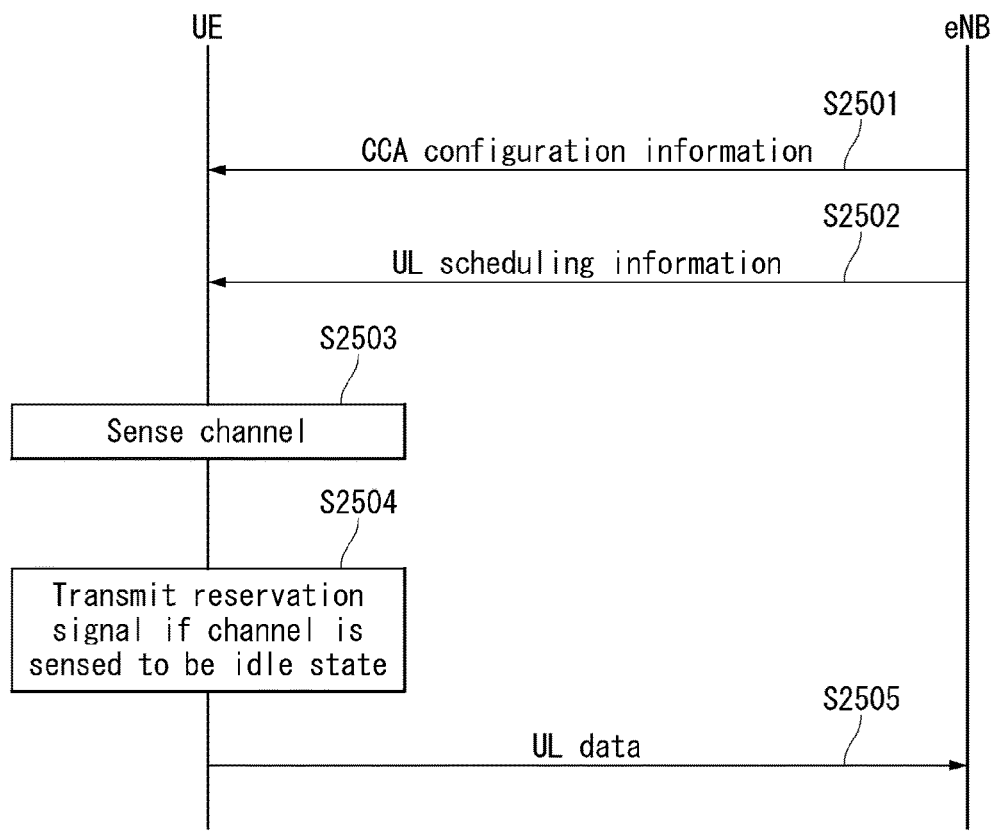

[FIG. 26]
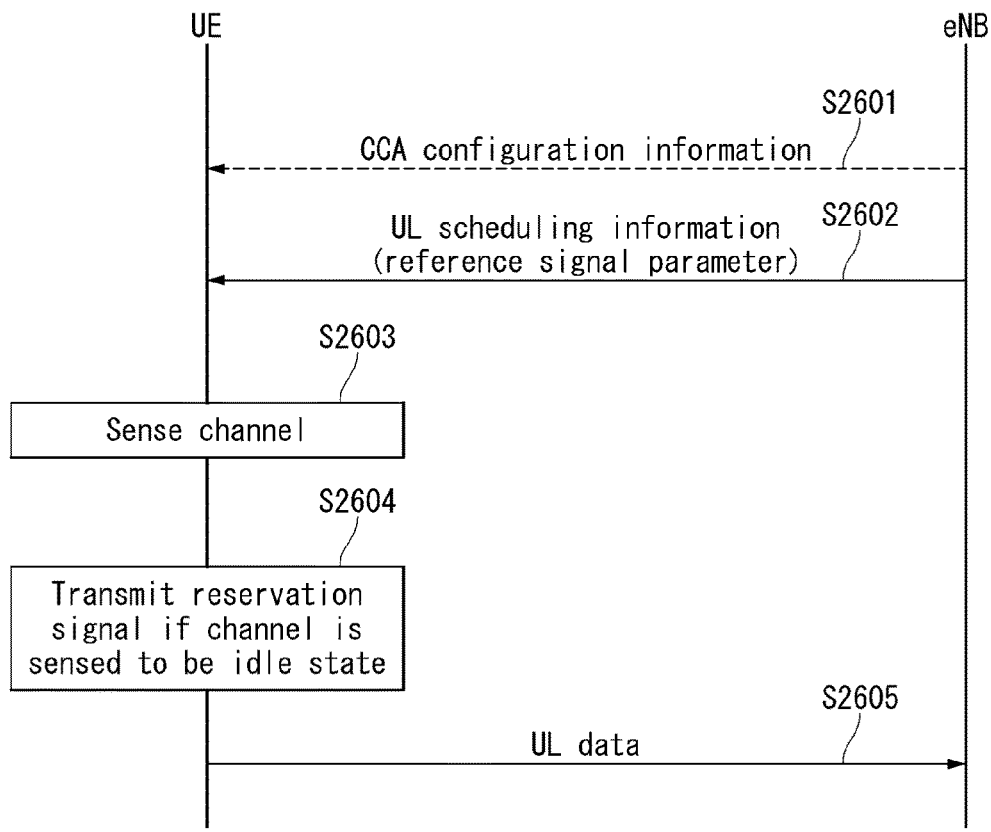
[FIG. 27]
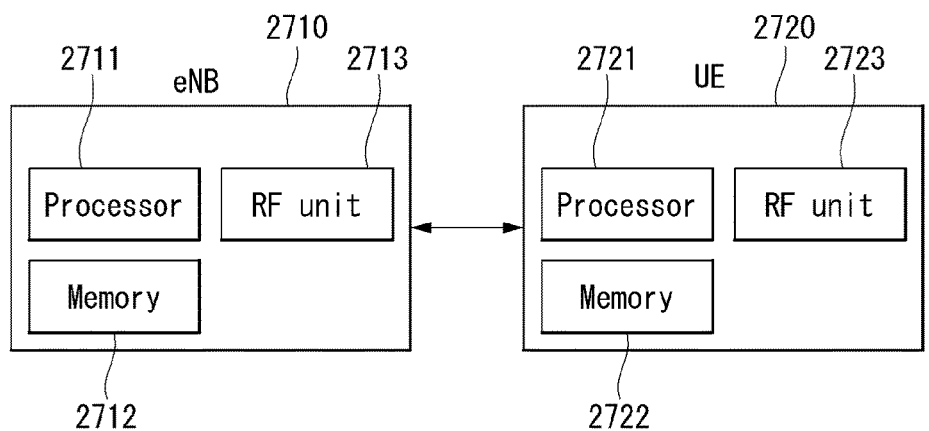

UPLINK DATA TRANSMISSION METHOD IN WIRELESS COMMUNICATION SYSTEM AND DEVICE THEREFOR

This application is a 35 USC § 371 National Stage entry of International Application No. PCT/KR2016/004000, filed on Apr. 18, 2016, and claims priority to U.S. Provisional Application No. 62/148,702, filed Apr. 16, 2015, all of which are incorporated by reference in their entirety herein.

TECHNICAL FIELD

The present invention relates to a wireless communication system and, more particularly, to a method of transmitting uplink data in an unlicensed band and a device supporting the same.

BACKGROUND ART

Mobile communication systems have been developed to provide voice services, while guaranteeing user activity. Service coverage of mobile communication systems, however, has extended even to data services, as well as voice services. Today, an explosive increase in traffic has resulted in the shortage of resources, and there is a need for an advanced mobile communication system because users require a high speed service.

The requirements of a next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device the networking, have been researched.

DISCLOSURE

Technical Problem

An object of the present invention is to propose a method of transmitting uplink data in an unlicensed band.

Another object of the present invention is to propose a method of performing clear channel assessment (CCA) on the remaining signals by cancelling a signal transmitted by a co-scheduled UE for uplink multi-user multiple input multiple output transmission in an unlicensed band.

Technical objects to be achieved by the present invention are not limited to the aforementioned objects, and those skilled in the art to which the present invention pertains may evidently understand other technical objects from the following description.

Technical Solution

In an aspect of the present invention, a method of transmitting, by a user equipment (UE), uplink data in an unlicensed band in a wireless communication system includes the steps of receiving uplink scheduling information within a cell operating in an unlicensed band from an eNB, sensing a channel of the cell, transmitting a reservation signal if the channel is sensed to be an idle state, and transmitting uplink data to the eNB in radio resources assigned by the uplink scheduling information, wherein the channel may be sensed to be the idle state if energy detected by cancelling a reservation signal transmitted by a different UE co-scheduled with the UE for uplink multi-user multiple input multiple output (UL MU-MIMO) transmission is smaller than a predetermined threshold.

In another aspect of the present invention, a user equipment transmitting uplink data in an unlicensed band in a wireless communication system includes a radio frequency (RF) unit transceiving radio signals and a processor controlling the RF unit. The processor is configured to receive uplink scheduling information within a cell operating in an unlicensed band from an eNB, sense a channel of the cell, transmit a reservation signal if the channel is sensed to be an idle state, and transmit uplink data to the eNB in radio resources assigned by the uplink scheduling information. The channel may be sensed to be the idle state if energy detected by cancelling a reservation signal transmitted by a different UE co-scheduled with the UE for uplink multi-user multiple input multiple output (UL MU-MIMO) transmission is smaller than a predetermined threshold.

Preferably, the reservation signal transmitted by the UE may be repeatedly transmitted in a specific period unit before the uplink data is transmitted.

Preferably, clear channel assessment (CCA) configuration information including information for identifying the reservation signal transmitted by the different UE may be received from the eNB. The reservation signal transmitted by the different UE may be identified using the CCA configuration information.

Preferably, whether an operation of cancelling the reservation signal transmitted by the different UE and determining the idle state of the channel is to be enabled may be explicitly or implicitly indicated by the uplink scheduling information.

Preferably, the CCA configuration information may be transmitted by the eNB for each state, the uplink scheduling information may include CCA indication information indicating the state applied to the UE, and the reservation signal transmitted by the different UE may be identified using the CCA configuration information corresponding to the state indicated by the CCA indication information.

Preferably, the CCA configuration information may include the type of reservation signal transmitted by the different UE and/or a sequence seed value for generating the reservation signal transmitted by the different UE.

Preferably, at least one of a demodulation reference signal (DMRS), a sounding reference signal (SRS), a synchronization signal (SS) or a sidelink synchronization signal (sidelink SS, SLSS) may be used as the reservation signal transmitted by the UE and the reservation signal transmitted by the different UE.

Preferably, the sequence seed value may be a virtual cell identity.

Preferably, the reservation signal transmitted by the different UE for determining the idle state of the channel may be determined based on the reservation signal transmitted by the UE within a set of predetermined reference signals.

Preferably, the sequence of the reservation signal transmitted by the UE may be determined based on a predetermined layer index and a value of a cyclic shift field within the uplink scheduling information.

Preferably, the sequence of the reservation signal transmitted by the different UE may be determined based on a layer index other than the predetermined layer index and the value of the cyclic shift field within the uplink scheduling information.

Preferably, the reservation signal transmitted by the UE and the reservation signal transmitted by the different UE may be a predetermined cell-specific signal or operator-specific signal or inter-operator-specific signal.

Preferably, the step of receiving reservation signal configuration information for the reservation signal transmitted by the UE from the eNB is further included. The UE may transmit a predetermined default reservation signal before the UE receives the reservation signal configuration information.

Preferably, the uplink scheduling information may include information indicating whether the UE needs to transmit the reservation signal.

Preferably, the sequence of the reservation signal transmitted by the UE and a sequence of the reservation signal transmitted by the different UE may have a form in which 0 is inserted at specific intervals.

Preferably, after inverse fast Fourier transform (IFFT) are applied to the reservation signal transmitted by the UE and the reservation signal transmitted by the different UE, a cyclic prefix may not be inserted into the reservation signals.

Preferably, the reservation signal transmitted by the UE and the reservation signal transmitted by the different UE may be transmitted in a predetermined bandwidth or a transmission bandwidth assigned by the uplink scheduling information.

Advantageous Effects

In accordance with an embodiment of the present invention, uplink multi-user multiple input multiple output transmission can be smoothly supported in an unlicensed band.

Furthermore, in accordance with an embodiment of the present invention, CCA can be determined more precisely because it is performed by cancelling a signal transmitted by a co-scheduled UE.

Advantages which may be obtained by the present invention are not limited to the aforementioned advantages, and various other advantages may be evidently understood by those skilled in the art to which the present invention pertains from the following description.

DESCRIPTION OF DRAWINGS

The accompanying drawings, which are included herein as a part of a description in order to help understanding of the present invention, provide embodiments of the present invention, and describe the technical features of the present invention with the description below.

FIG. 1 illustrates the structure of a radio frame in a wireless communication system to which an embodiment of the present invention may be applied.

FIG. 2 is a diagram illustrating a resource grid for a downlink slot in a wireless communication system to which an embodiment of the present invention may be applied.

FIG. 3 illustrates the structure of a downlink subframe in a wireless communication system to which an embodiment of the present invention may be applied.

FIG. 4 illustrates the structure of an uplink subframe in a wireless communication system to which an embodiment of the present invention may be applied.

FIG. 5 shows the configuration of a known MIMO communication system.

FIG. 6 is a diagram showing a channel from a plurality of transmission antennas to a single reception antenna.

FIG. 7 shows an example of component carriers and a carrier aggregation in a wireless communication system to which an embodiment of the present invention may be applied.

FIG. 8 shows an example of the structure of a subframe according to cross-carrier scheduling in a wireless communication system to which an embodiment of the present invention may be applied.

FIG. 9 is a diagram illustrating a time-frequency resource block in a time frequency domain in a wireless communication system to which an embodiment of the present invention may be applied.

FIG. 10 is a diagram illustrating a resource allocation and retransmission process of an asynchronous HARQ method in a wireless communication system to which an embodiment of the present invention may be applied.

FIG. 11 is a diagram showing a downlink HARQ process in an LTE FDD system to which an embodiment of the present invention may be applied.

FIG. 12 is a diagram showing an uplink HARQ process in an LTE FDD system to which an embodiment of the present invention may be applied.

FIG. 13 is a diagram illustrating a carrier aggregation-based CoMP system in a wireless communication system to which an embodiment of the present invention may be applied.

FIG. 14 illustrates a reference signal pattern mapped to a downlink resource block pair in a wireless communication system to which an embodiment of the present invention may be applied.

FIG. 15 is a diagram illustrating a CSI-RS configuration in a wireless communication system to which the present invention may be applied.

FIG. 16 is a diagram illustrating a PDCCH and an E-PDCCH in a wireless communication system to which the present invention may be applied.

FIG. 17 is a diagram illustrating the structure of an uplink subframe in a wireless communication system to which the present invention may be applied.

FIG. 18 is a diagram for illustrating a signal processing process for transmitting a reference signal in uplink in a wireless communication system to which the present invention may be applied.

FIG. 19 is a diagram showing the structure of a subframe for transmitting a demodulation-reference signal in a wireless communication system to which the present invention may be applied.

FIG. 20 is a diagram illustrating a carrier aggregation in an unlicensed band according to an embodiment of the present invention.

FIG. 21 illustrates a channel access operation of frame based equipment in a wireless communication system to which the present invention may be applied.

FIG. 22 illustrates a channel access operation of load based equipment in a wireless communication system to which the present invention may be applied.

FIG. 23 is a diagram illustrating a method of transmitting uplink data in an unlicensed band according to an embodiment of the present invention.

FIG. 24 is a diagram illustrating a method of transmitting uplink data in an unlicensed band according to an embodiment of the present invention.

FIG. 25 is a diagram illustrating a method of transmitting uplink data in an unlicensed band according to an embodiment of the present invention.

FIG. 26 is a diagram illustrating a method of transmitting uplink data in an unlicensed band according to an embodiment of the present invention.

FIG. 27 illustrates the block configuration of a wireless communication device according to an embodiment of the present invention.

MODE FOR INVENTION

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 1(a) illustrates the structure of a type 1 radio frame. The type 1 radio frame may be applied to both full duplex and half duplex FDD.

The radio frame includes 10 subframes. One radio frame includes 20 slots of $T\_slot=15360*T\_s=0.5$ ms in length. 0 to 19 indices are assigned to the respective slots. One subframe includes consecutive 2 slots in the time domain, and a subframe i includes a slot 2i and a slot 2i+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 1(b) shows a frame structure type 2.

The frame structure type 2 includes two half frames, each having a length of $153600*T\_s=5$ ms. Each half frame includes 5 subframes, each having a length of $30720*Ts=1$ ms.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having T_slot=15360*T_s=0.5 ms length.

An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a physical downlink control channel (PDCCH) like other scheduling information. Configuration information may be transmitted to all pieces of UE within a cell through a broadcast channel as broadcasting information.

Table 2 shows the configuration (the length of a DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only an example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (also called a "downlink grant"), resource allocation information about an uplink shared channel (UL-SCH) (also called an "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some consecutive CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches cyclic redundancy check (CRC) to control information. A unique identifier (a radio network temporary identifier (RNTI)) is masked to the CRC depending on the owner or use of a PDCCH. If the PDCCH is a PDCCH for specific UE, an identifier unique to the UE, for example, a cell-RNTI (C-RNTI) may be masked to the CRC. If the PDCCH is a PDCCH for a paging message, a paging indication identifier, for example, a paging-RNTI (P-RNTI) may be masked to the CRC. If the PDCCH is a PDCCH for system information, more specifically, a system information block (SIB), a system information identifier, for example, a system information-RNTI (SI-RNTI) may be masked to the CRC. A random access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas.

Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s=[s_1,s_2,\ldots,s_{N_T}]^T \quad \text{[Equation 2]}$$

Transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Equation 3]}$$

In Equation 3, transmission information having controlled transmission power may be represented as follows using the diagonal matrix P of transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector having controlled transmission power in Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y=[y_1,y_2,\ldots,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}]$$ [Equation 7]

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$ [Equation 8]

Additive white Gaussian noise (AWGN) is added to an actual channel after the actual channel experiences the channel matrix H. Accordingly, AWGN n_1, n_2, ..., n_NR added to the N_R reception antennas, respectively, are represented using a vector as follows.

$$n = [n_1, n_2, \ldots n_{N_R}]^T$$ [Equation 9]

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

General Carrier Aggregation

A communication environment taken into consideration in embodiments of the present invention includes a multi-carrier support environment. That is, a multi-carrier system or carrier aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between consecutive carriers and an aggregation between inconsecutive (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a primary cell (PCell) and a secondary cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or a primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An evolved universal terrestrial radio access network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a primary component carrier (PCC) may be used as the same meaning as a PCell, and a secondary component carrier (SCC) may be used as the same meaning as an SCell.

FIG. 7 shows an example of component carriers and a carrier aggregation in a wireless communication system to which an embodiment of the present invention may be applied.

FIG. 7(a) shows the structure of a single carrier used in an LTE system. A CC includes a DL CC and an UL CC. One component carrier may have a frequency range of 20 MHz.

FIG. 7(b) shows the structure of a carrier aggregation used in an LTE-A system. FIG. 7(b) shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to the UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by system information block type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

When one or more SCells are configured in UE, a network may activate or deactivate the configured SCell(s). A PCell is always activated. The network activates or deactivates the SCell(s) by transmitting an activation/deactivation MAC control element.

The activation/deactivation MAC control element has a fixed size and consists of a single octet including 7 C-fields and 1 R-field. The C-field is configured for each SCell index (SCellIndex) and is indicative of the activation/deactivation of the SCell. When the value of the C-field is set to "1", it indicates the activation of an SCell having the index of the corresponding SCell. When the value of the C-field is set to "0", it indicates the deactivation of an SCell having the index of the corresponding SCell.

Furthermore, the UE maintains a timer (sCellDeactivationTimer) for each configured SCell and deactivates a related SCell when the timer expires. The same initial timer value is applied to each instance of the timer (sCellDeactivationTimer) and configured by RRC signaling. When an SCell(s) is added or after handover, an initial SCell(s) has been deactivated.

UE performs the following operation on each configured SCell(s) in each TTI.

When the UE receives an activation/deactivation MAC control element that activates an SCell in a specific TTI (subframe n), the UE activates an SCell in a TTI (a subframe n+8 or thereafter) corresponding to predetermined timing, and (re)starts a timer related to the corresponding SCell. The activation of the SCell by the UE means that the UE applies common SCell operations, such as the transmission of a sounding reference signal (SRS) on the SCell, the report of a channel quality indicator (CQI)/precoding matrix indicator (PMI)/rank indication (RI)/precoding type indicator (PTI) for the SCell, PDCCH monitoring on the SCell, and PDCCH monitoring for the SCell.

When the UE receives an activation/deactivation MAC control element that deactivates the SCell in a specific TTI (subframe n) or a timer related to the activated SCell in a specific TTI (subframe n) expires, the UE deactivates the SCell in a TTI (subframe n+8 or thereafter) corresponding to predetermined timing, stops the timer of the corresponding SCell, and flushes the entire HARQ buffer related to the corresponding SCell.

When a PDCCH on the activated SCell is indicative of an uplink grant or downlink assignment or when a PDCCH on a serving cell that schedules the activated SCell is indicative of an uplink grant or downlink assignment for the activated SCell, the UE restarts a timer related to the corresponding SCell.

When the SCell is deactivated, the UE does not transmit an SRS on an SCell, does not report a CQI/PMI/RI/PTI for an SCell, and does not transmit an UL-SCH on an SCell, and does not monitor a PDCCH on an SCell.

Cross-Carrier Scheduling

In a carrier aggregation system, there are two types of a self-scheduling method and a cross-carrier scheduling method from a viewpoint of scheduling for a carrier or serving cell. Cross-carrier scheduling may be called cross component carrier scheduling or cross cell scheduling.

Cross-carrier scheduling means that a PDCCH (DL grant) and a PDSCH are transmitted on different DL CCs or that a PUSCH transmitted according to a PDCCH (UL grant) transmitted in a DL CC is transmitted on an UL CC different from an UL CC link to a DL CC on which the UL grant has been received.

Whether cross-carrier scheduling is to be performed may be activated or deactivated in a UE-specific manner, and each piece of UE may be semi-statically notified of whether cross-carrier scheduling is to be performed through higher layer signaling (e.g., RRC signaling).

If cross-carrier scheduling is activated, there is a need for a carrier indicator field (CIF), providing notification that a PDSCH/PUSCH indicated by a corresponding PDCCH is transmitted through which DL/UL CC, in a PDCCH. For example, a PDCCH may allocate a PDSCH resource or a PUSCH resource to any one of a plurality of CCs using a Cl. That is, a CIF is set if a PDCCH on a DL CC allocates a PDSCH or PUSCH resource on one of multiple DL/UL CCs which have been aggregated. In this case, the DCI format of LTE-A Release-8 may be extended according to the CIF. In this case, the set CIF may be fixed to a 3-bit field and the position of the set CIF may be fixed regardless of the size of the DCI format. Furthermore, the PDCCH structure (the same coding and the same CCE-based resource mapping) of LTE-A Release-8 may be reused.

In contrast, if a PDCCH on a DL CC allocates a PDSCH resource on the same DL CC or allocates a PUSCH resource on one linked UL CC, a CIF is not set. In this case, the same PDCCH structure (the same coding and the same CCE-based resource mapping) and DCI format as those of LTE-A Release-8 may be used.

If cross-carrier scheduling is possible, UE needs to monitor a PDCCH for a plurality of DCIs in the control region of a monitoring CC depending on the transmission mode and/or bandwidth of each CC. Accordingly, there is a need for the configuration of a search space capable of supporting such a need and for PDCCH monitoring.

In a carrier aggregation system, a UE DL CC set is indicative of a set of DL CC that has been scheduled for UE to receive a PDSCH, and a UE UL CC set is indicative of a set of UL CCs that has been scheduled for UE scheduled to send a PUSCH. Furthermore, a PDCCH monitoring set is indicative of a set of at least one DL CC on which PDCCH monitoring is performed. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. A DL CC included in the PDCCH monitoring set may be configured to be always self-scheduled for a linked UL CC. Such a UE DL CC set, UE UL CC set and PDCCH monitoring set may be configured in a UE-specific, UE group-specific or cell-specific manner.

If cross-carrier scheduling has been deactivated, it means that a PDCCH monitoring set is always the same as a UE DL CC set. In such a case, indication, such as separate signaling for the PDCCH monitoring set, is not required. If cross-carrier scheduling has been activated, however, a PDCCH monitoring set may be defined within a UE DL CC set. That is, in order to schedule a PDSCH or a PUSCH for UE, an eNB sends a PDCCH through only the PDCCH monitoring set.

FIG. 8 shows an example of the structure of a subframe according to cross-carrier scheduling in a wireless communication system to which an embodiment of the present invention may be applied.

Referring to FIG. 8, 3 DL CCs are aggregated in a DL subframe for LTE-A UE. A DL CC "A" indicates a case where the DL CC has been configured as a PDCCH monitoring DL CC. If a CIF is not used, each DL CC may send a PDCCH for scheduling its own PDSCH without a CIF. In contrast, if a CIF is used through higher layer signaling, only one DL CC "A" may send a PDCCH for scheduling its own PDSCH or the PDSCH of another CC using a CIF. In this case, DL CCs "B" and "C" not configured as a PDCCH monitoring DL CC do not send a PDCCH.

Hybrid—Automatic Repeat and Request (HARQ)

In a mobile communication system, one eNB sends and receives data to and from a plurality of UEs in one cell/sector through a wireless channel environment.

In a system in which multiple carriers operate or a system operating in a form similar to the system, an eNB receives packet traffic over a wired Internet and sends the received packet traffic to UE using a predetermined communication method. In this case, it is a downlink scheduling that the eNB determines to send data to which UE using which frequency domain at which timing.

Furthermore, the eNB receives data from the UE using a predetermined communication method, demodulates the received data, and sends packet traffic through the wired Internet. It is an Uplink scheduling that the eNB determines to allow which UE to send uplink data using which frequency band at which timing. In general, UE having a better channel state sends and receives data using more time and more frequency resources.

FIG. 9 is a diagram illustrating a time-frequency resource block in a time frequency domain in a wireless communication system to which an embodiment of the present invention may be applied.

Resources in a system in which multiple carriers operate and a system operating in a form similar to the system may be basically divided into a time domain and a frequency domain. The resources may be defined as resource blocks. The resource block includes specific N subcarriers and specific M subframes or a predetermined time unit. In this case, N and M may be 1.

In FIG. 9, one square means one resource block, and one resource block use several subcarriers as one axis and a predetermined time unit as the other axis. In downlink, an eNB schedules one or more resource blocks for selected UE according to a predetermined scheduling rule, and sends data to the UE using allocated resource blocks. In uplink, an eNB schedules one or more resource blocks to selected UE according to a predetermined scheduling rule, and the UE sends data using the allocated resource in uplink.

After the scheduling and the data is transmitted, an error control method if a frame is lost or damaged includes an automatic repeat request (ARQ) method and a hybrid ARQ (HARQ) method of a more advanced form.

Basically, in the ARQ method, after one frame is transmitted, a transmission side waits for an acknowledgement message (ACK). A reception side sends an acknowledgement message (ACK) only when the frame is successfully received. If an error is generated in the received frame, the reception side sends a negative-ACK (NACK) message again and deletes information about the received frame having an error from a reception end buffer. When an ACK signal is received, a transmission side sends a subsequent frame. When a NACK message is received, the transmission side resends a corresponding frame.

Unlike in the ARQ method, in the HARQ method, if a received frame cannot be demodulated, a reception end sends a NACK message to a transmission end, but stores an already received frame in a buffer during a specific time and combines the stored frame with a previously received from when the corresponding frame is retransmitted, thereby increasing a success rate of reception.

Recently, the HARQ method more efficient than the basic ARQ method is widely used. Such an HARQ method includes several types. The HARQ method may be basically divided into synchronous HARQ and asynchronous HARQ depending on retransmission timing and may be divided into a channel-adaptive method and a channel-non-adaptive method depending on whether a channel state is incorporated into the amount of resources used upon retransmission.

In the synchronous HARQ method, when initial transmission fails, subsequent retransmission is performed by a system according to predetermined timing. That is, assuming that timing upon retransmission is performed every fourth time unit after an initial transmission failure, an eNB and UE do not need to be additionally notified of such timing because the timing has already been agreed between the eNB and the UE. In this case, if a data transmission side has received an NACK message, it retransmits a frame every fourth time unit until it receives an ACK message.

In contrast, in the asynchronous HARQ method, retransmission timing may be newly scheduled or may be performed through additional signaling. Timing when retransmission for a previously failed frame is performed is changed depending on several factors, such as a channel state.

In the channel-non-adaptive HARQ method, the modulation of a frame upon retransmission, the number of resource blocks, and adaptive modulation and coding (AMC) are performed as they have been predetermined upon initial transmission. In contrast, in the channel-adaptive HARQ method, the modulation of a frame upon retransmission, the number of resource blocks, and adaptive modulation and coding (AMC) are performed are changed depending on the state of a channel. For example, in the channel-non-adaptive HARQ method, a transmission side sends data using 6 resource blocks upon initial transmission and performs retransmission using 6 resource blocks upon subsequent retransmission in the same manner. In contrast, in the channel-adaptive HARQ method, although transmission has been performed using 6 resource blocks, retransmission is subsequently performed using resource blocks greater than or smaller than the 6 resources blocks depending on a channel state.

Four HARQ combinations may be performed based on such a classification, but a HARQ method that are used primarily includes an asynchronous and channel-adaptive HARQ method and a synchronous and channel-non-adaptive HARQ method.

The asynchronous and channel-adaptive HARQ method can maximize retransmission efficiency because retransmission timing and the amount of resources used are adaptively changed depending on the state of a channel, but has a disadvantage in that overhead is increased. Accordingly, the asynchronous and channel-adaptive HARQ method is not taken into consideration in common for uplink.

The synchronous and channel-non-adaptive HARQ method is advantageous in that overhead for timing for retransmission and resource allocation is rarely present because the timing for retransmission and the resource allocation have been predetermined within a system, but is disadvantageous in that retransmission efficiency is very low if such a method is used in a channel state that varies severely.

FIG. 10 is a diagram illustrating a resource allocation and retransmission process of the asynchronous HARQ method in a wireless communication system to which an embodiment of the present invention may be applied.

For example, in the case of downlink, after scheduling is performed and data is transmitted, ACK/NACK information is received from UE. Time delay is generated until next data is transmitted as shown in FIG. 10. The time delay is generated due to channel propagation delay and the time taken for data decoding and data encoding.

For such a delay period, a method for sending data using an independent HARQ process is used for blankless data transmission. For example, if the shortest cycle between next data transmission and subsequent data transmission is 7 subframes, data may be transmitted without a blank if 7 independent processes are placed in the 7 subframes.

An LTE physical layer supports HARQ in a PDSCH and a PUSCH and associated reception acknowledge (ACK) feedback in a separate control channel is transmitted.

In an LTE FDD system, if the LTE FDD system does not operate in MIMO, 8 stop-and-wait (SAW) HARQ processes are supported in uplink and downlink both in a constant round trip time (RTT) of 8 ms.

FIG. 11 is a diagram showing a downlink HARQ process in an LTE FDD system to which an embodiment of the present invention may be applied, and FIG. 12 is a diagram showing an uplink HARQ process in an LTE FDD system to which an embodiment of the present invention may be applied.

Each HARQ process is defined by a unique HARQ process identifier (HARQ ID) of a 3-bit size. A reception end (i.e., UE in a downlink HARQ process and an eNodeB in an uplink HARQ process) requires individual soft buffer allocation for the combination of retransmitted data.

Furthermore, for an HARQ operation, a new data indicator (NDI), a redundancy version (RV), and a modulation and coding scheme (MCS) field are defined within downlink control information. The NDI field is toggled whenever new packet transmission starts. The RV field indicates an RV selected for transmission or retransmission. The MCS field indicates an MCS level.

In an LTE system, a downlink HARQ process is an adaptive asynchronous method. Accordingly, downlink control information for an HARQ process is explicitly accompanied every downlink transmission.

In an LTE system, an uplink HARQ process is a synchronous method and may include an adaptive or non-adaptive method. The uplink non-adaptive HARQ scheme requires a preset RV sequence (e. g., 0, 2, 3, 1, 0, 2, 3, 1, . . . ) for consecutive packet transmission because it does not accompany the explicit signaling of control information. In contrast, in the uplink adaptive HARQ scheme, an RV is explicitly signaled. In order to minimize control signaling, uplink mode in which an RV (or MCS) is combined with another control information is also supported.

Limited Buffer Rate Matching (LBRM)

Owing to the entire memory required for saving the Log-Likelihood Ratio (LLR) in order to support the HARQ process (throughout all HARQ processes), that is, the UE HARQ soft buffer size, the complexity in the UE implement is increased.

An object of the limited buffer rate matching (LBRM) is to maintain the peak data rates and to minimize the influence on the system performance, and in addition, to decrease the UE HARQ soft buffer size. The LBRM reduces the length of virtual circular buffer of the code block segments for the transmission block (TB) that has a size greater than a predetermined size. Using the LBRM, the mother code rate for the TB becomes the function of UE soft buffer size that is allocated to the TB size and the TB. For example, for the UE category that does not support the FDD operation and the UE of the lowest category (e.g., UE categories 1 and 2 that do not support the spatial multiplexing), the limit on the buffer is transparent. That is, the LBRM does not cause the reduction of the soft buffer. In the case of the UE of high category (i.e., UE categories 3, 4 and 5), the size of soft buffer is calculated by assuming the buffer decrease of 50% that corresponds to two thirds of the mother code rate for eight HARQ processes and the maximum TB. Since an eNB knows the soft buffer capacity of UE, the code bit is transmitted in the virtual circular buffer (VCB) that may be stored in the HARQ soft buffer of the UE for all of the given TB (re)transmissions.

Coordinated Multi-Point Transmission and Reception (CoMP)

In accordance with the demand of LTE-advanced, CoMP transmission is proposed to enhance performance of a system.

CoMP is referred to as a scheme for two or more eNBs, (Access) Points or Cells cooperate with each other and communicate with UE in order to perform smoothly communication between a specific UE and an eNB, (Access) Point or Cell. The CoMP is also called co-MIMO, collaborative MIMO, network MIMO, and the like. It is anticipated that the CoMP will improve performance of UE positioned at a cell boundary and improve an average throughput of the cell (sector).

In this specification, an eNB, an access point, and a cell are used as the same meaning.

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in the cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a coordinated scheduling/beamforming (CS/CB) method.

In case of JP method, the data headed from each eNB that performs the CoMP to UE is transmitted to UE instantaneously and simultaneously, and the UE combines the signal from each of the eNBs so as to improve the reception performance. Meanwhile, in the case of the CS/CB, the data headed to UE is transmitted instantaneously through a single eNB, and the scheduling or beamforming is performed such that the interference exerted on another eNB by the UE becomes the minimum.

In the JP method, data may be used in each point (i.e, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

CA-Based CoMP Operation

In system subsequent to LTE, cooperative multi-point (CoMP) transmission may be implemented using a carrier aggregation (CA) function in LTE.

FIG. 13 is a diagram illustrating a carrier aggregation-based CoMP system in a wireless communication system to which an embodiment of the present invention may be applied.

FIG. 13 illustrates that a primary cell (PCell) carrier and a secondary cell (SCell) carrier use the same frequency band on a frequency axis and are respectively allocated to two eNBs that are geographically spaced apart from each other.

A serving eNB allocates a PCell to UE1, and an neighboring eNB providing much interference allocates an SCell, so that Various DL/UL CoMP operations such as JT, CS/CB, and dynamic cell selection may be performed.

FIG. 13 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

UE Procedure for Receiving PDSCH

When UE detects a PDCCH of a serving cell on which a DCI format 1, 1A, 1B, 1C, 1D, 2, 2A, 2B or 2C intended for the UE is carried other than a subframe(s) indicated by a higher layer parameter "mbsfn-SubframeConfigList", the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 1C intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

If not, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 3 below. The PDSCH corresponding to the PDCCH(s) is scrambling-initialized by the SI-RNTI.

Table 3 illustrates a PDCCH and PDSCH configured by an SI-RNTI.

TABLE 3

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 4 below. The PDSCH corresponding to the PDCCH(s) is scrambling-initialized by the P-RNTI.

Table 4 illustrates a PDCCH and PDSCH configured by a P-RNTI.

TABLE 4

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 5 below. The PDSCH corresponding to the PDCCH(s) is scrambling-initialized by the RA-RNTI.

Table 5 illustrates a PDCCH and PDSCH configured by an RA-RNTI.

TABLE 5

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 9 transmission modes, including a mode 1 to a mode 9.

In the case of the frame structure type 1,
UE does not receive a PDSCH RB transmitted in the antenna port 5 even in any subframe in which the number of OFDM symbols for a PDCCH having a common CP is 4.

If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.

UE does not receive a PDSCH RB transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

In the case of the frame structure type 2,
UE does not receive a PDSCH RB transmitted in the antenna port 5 even in any subframe in which the number of OFDM symbols for a PDCCH having a common CP is 4.

If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.

If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.

If a common CP is configured, UE does not receive a PDSCH in the antenna port 5 in which distributed VRB resource allocation has been assigned within a special subframe in an uplink-downlink configuration #1 or #6.

UE does not receive a PDSCH transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 6 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is set as the transmission mode 7, a UE-specific reference signal corresponding to a PDCCH(s) is scrambling-initialized by a C-RNTI.

If an extended CP is used in downlink, UE does not support the transmission mode 8.

If UE is set as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 6 illustrates a PDCCH and PDSCH configured by a C-RNTI.

TABLE 6

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
|  | DCI format 1 | UE-specific by a C-RNTI | a single antenna port, a port 0 |
| Mode 2 | DCI format 1A | common and UE-specific by a C-RNTI | transmit diversity |
|  | DCI format 1 | UE-specific by a C-RNTI | transmit diversity |
| Mode 3 | DCI format 1A | common and UE-specific by a C-RNTI | transmit diversity |
|  | DCI format 2A | UE-specific by a C-RNTI | large delay CDD or transmit diversity |
| Mode 4 | DCI format 1A | common and UE-specific by a C-RNTI | transmit diversity |
|  | DCI format 2 | UE-specific by a C-RNTI | closed-loop spatial multiplexing or transmit diversity |
| Mode 5 | DCI format 1A | common and UE-specific by a C-RNTI | transmit diversity |
|  | DCI format 1D | UE-specific by a C-RNTI | multi-user MIMO |
| Mode 6 | DCI format 1A | common and UE-specific by a C-RNTI | transmit diversity |
|  | DCI format 1B | UE-specific by a C-RNTI | closed-loop spatial multiplexing using a single transport layer |
| Mode 7 | DCI format 1A | common and UE-specific by a C-RNTI | If the number of PBCH antenna ports is 1, a single antenna port, a port 0 is used, and if not, transmit diversity |
|  | DCI format 1 | UE-specific by a C-RNTI | Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
|  | DCI format 2B | UE-specific by a C-RNTI | dual layer transmission, ports 7 and 8 or a single antenna port, a port 7 or 8 |

TABLE 6-continued

| TRANSMISSION MODE | DCI FORMAT | SEARCH SPACE | METHOD FOR SENDING PDSCH CORRESPONDING TO PDCCH |
|---|---|---|---|
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
| | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 7 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

SubframeConfigList." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 7 illustrates a PDCCH and PDSCH configured by an SPS C-RNTI.

TABLE 7

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | transmit diversity |
| Mode 4 | DCI format 1A | common and UE-specific by a C-RNTI | transmit diversity |
| | DCI format 2 | UE-specific by a C-RNTI | transmit diversity |
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
| | DCI format 1 | UE-specific by a C-RNTI | a single antenna port, a port 5 |
| Mode 8 | DCI format 1A | common and UE-specific by a C-RNTI | a single antenna port, a port 7 |
| | DCI format 2B | UE-specific by a C-RNTI | a single antenna port, a port 7 or 8 |
| Mode 9 | DCI format 1A | common and UE-specific by a C-RNTI | a single antenna port, a port 7 |
| | DCI format 2C | UE-specific by a C-RNTI | a single antenna port, a port 7 or 8 |

If UE is set as the transmission mode 7, a PDCCH(s) and a corresponding UE-specific reference signal is scrambling-initialized by an SPS C-RNTI.

If UE is set as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn- If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 8. The PDSCH corresponding to the PDCCH(s) is scrambling-initialized by the temporary C-RNTI.

Table 8 illustrates a PDCCH and a PDSCH configured by a temporary C-RNTI.

TABLE 8

| DCI FORMAT | SEARCH SPACE | METHOD FOR SENDING PDSCH CORRESPONDING TO PDCCH |
|---|---|---|
| DCI format 1A | common and UE-specific by a temporary C-RNTI | If the number of PBCH antenna ports is 1, a single antenna port, a port 0 is used, and if not, transmit diversity |
| DCI format 1 | UE-specific by a temporary C-RNTI | If the number of PBCH antenna ports is 1, a single antenna port, a port 0 is used, and if not, transmit diversity |

UE Procedure for PUSCH Transmission

UE is semi-statically configured through higher layer signaling so that it performs PUSCH transmission signaled through a PDCCH according to any one of two types of uplink transmission modes 1 and 2 defined in Table 9 below. If the UE is configured by a higher layer so that it decodes a PDCCH with CRC scrambled by a C-RNTI, the UE decodes the PDCCH according to a combination defined in Table 9 and sends the corresponding PUSCH. The PUSCH transmission corresponding to the PDCCH(s) and the PUSCH retransmission for the same transport block is scrambling-initialized by the C-RNTI. The transmission mode 1 is a default uplink transmission mode until an uplink transmission mode is assigned in the UE by higher layer signaling.

When UE is configured as the transmission mode 2 and receives a DCI format 0 uplink scheduling grant, the UE assumes that PUSCH transmission is related to a transport block 1 and a transport block 2 is disabled.

Table 9 illustrates a PDCCH and a PUSCH configured by a C-RNTI.

TABLE 9

| TRANSMISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |
|  | DCI format 4 | UE-specific by a C-RNTI | closed-loop spatial multiplexing |

If UE is configured by a higher layer so that it decodes a PDCCH with CRC scrambled by a C-RNTI and also configured to receive a random access procedure started by a PDCCH order, the UE decodes the PDCCH according to a combination defined in Table 10 below.

Table 10 illustrates a PDCCH set as a PDCCH order for starting a random access procedure.

TABLE 10

| DCI FORMAT | SEARCH SPACE |
|---|---|
| DCI format 1A | common and UE-specific by a C-RNTI |

If UE is configured by a higher layer so that it decodes a PDCCH with CRC scrambled by an SPS C-RNTI, the UE decodes the PDCCH according to a combination defined in Table 11 below and sends a corresponding PUSCH. The PUSCH transmission corresponding to the PDCCH(s) and the PUSCH retransmission for the same transport block is scrambling-initialized by the SPS C-RNTI. PUSCH retransmission for the same transport block as the minimum transmission of a PUSCH without a corresponding PDCCH is scrambling-initialized by an SPS C-RNTI.

Table 11 illustrates a PDCCH and a PUSCH configured by an SPS C-RNTI.

TABLE 11

| TRANSMISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |

If UE is configured by a higher layer so that it decodes a PDCCH scrambled by a temporary C-RNTI regardless of whether the UE has been configured to decode a PDCCH with CRC scrambled by a C-RNTI, the UE decodes the PDCCH according to a combination defined in Table 12 and sends a corresponding PUSCH. The PUSCH corresponding to the PDCCH(s) is scrambling-initialized by the temporary C-RNTI.

If a temporary C-RNTI is set by a higher layer, PUSCH transmission corresponding to a random access response grant and PUSCH retransmission for the same transport block are scrambled by the temporary C-RNTI. If not, the PUSCH transmission corresponding to the random access response grant and the PUSCH retransmission for the same transport block are scrambled by a C-RNTI.

Table 12 illustrates a PDCCH configured by a temporary C-RNTI.

TABLE 12

| DCI FORMAT | SEARCH SPACE |
|---|---|
| DCI format 0 | common |

If UE is configured by a higher layer so that it decodes a PDCCH with CRC scrambled by a TPC-PUCCH-RNTI, the UE decodes the PDCCH according to a combination defined in Table 13 below. In Table 13, indication "3/3A" means that UE receives the DCI format 3 or a DCI format depending on a configuration.

Table 13 illustrates a PDCCH configured by a TPC-PUCCH-RNTI.

TABLE 13

| DCI FORMAT | SEARCH SPACE |
|---|---|
| DCI formats 3/3A | common |

If UE is configured by a higher layer so that it decodes a PDCCH with CRC scrambled by a TPC-PUSCH-RNTI, the UE decodes the PDCCH according to a combination defined in Table 14 below. In Table 14, indication "3/3A" includes that UE receives the DCI format 3 or a DCI format depending on a configuration.

Table 14 illustrates a PDCCH configured by a TPC-PUSCH-RNTI.

TABLE 14

| DCI FORMAT | SEARCH SPACE |
|---|---|
| DCI formats 3/3A | common |

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transmission/reception efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable user equipment (UE) to acquire a channel information in downlink (DL), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when an eNB transmits DL data. If UE receives the corresponding reference signal, the UE can perform channel estimation, thereby demodulating data. And, the corresponding reference signal should be transmitted in a data transmitted region.

5 types of downlink reference signals are defined.

A cell-specific reference signal (CRS)

A multicast-broadcast single-frequency network reference signal (MBSFN RS)

A UE-specific reference signal or a demodulation reference signal (DM-RS)

A positioning reference signal (PRS)

A channel state information reference signal (CSI-RS)

One RS is transmitted in each downlink antenna port.

The CRS is transmitted in all of downlink subframe in a cell supporting PDSCH transmission. The CRS is transmitted in one or more of antenna ports 0-3. The CRS is transmitted only in $\Delta f=15$ kHz.

The MBSFN RS is transmitted in the MBSFN region of an MBSFN subframe only when a physical multicast channel (PMCH) is transmitted. The MBSFN RS is transmitted in an antenna port 4. The MBSFN RS is defined only in an extended CP.

The DM-RS is supported for the transmission of a PDSCH and is transmitted in antenna ports p=5, p=7, p=8 or p=7, 8, ..., u+6. In this case, u is the number of layers which is used for PDSCH transmission. The DM-RS is present and valid for the demodulation of a PDSCH only when PDSCH transmission is associated in a corresponding antenna port. The DM-RS is transmitted only in a resource block (RB) to which a corresponding PDSCH is mapped.

If any one of physical channels or physical signals other than the DM-RS is transmitted using the resource element (RE) of the same index pair (k,l) as that of a RE in which a DM-RS is transmitted regardless of an antenna port "p", the DM-RS is not transmitted in the RE of the corresponding index pair (k,l).

The PRS is transmitted only in a resource block within a downlink subframe configured for PRS transmission.

If both a common subframe and an MBSFN subframe are configured as positioning subframes within one cell, OFDM symbols within the MBSFN subframe configured for PRS transmission use the same CP as that of a subframe #0. If only an MBSFN subframe is configured as a positioning subframe within one cell, OFDM symbols configured for a PRS within the MBSFN region of the corresponding subframe use an extended CP.

The start point of an OFDM symbol configured for PRS transmission within a subframe configured for the PRS transmission is the same as the start point of a subframe in which all of OFDM symbols have the same CP length as an OFDM symbol configured for the PRS transmission.

The PRS is transmitted in an antenna port 6.

The PRS is not mapped to RE (k,l) allocated to a physical broadcast channel (PBCH), a PSS or and SSS regardless of an antenna port "p."

The PRS is defined only in Δf=15 kHz.

The CSI-RS is transmitted in 1, 2, 4 or 8 antenna ports using p=15, p=15, 16, p=15, ..., 18 and p=15, ..., 22, respectively.

The CSI-RS is defined only in Δf=15 kHz.

A reference signal is described in more detail.

The CRS is a reference signal for obtaining information about the state of a channel shared by all of UEs within a cell and measurement for handover, etc. The DM-RS is used to demodulate data for only specific UE. Information for demodulation and channel measurement may be provided using such reference signals. That is, the DM-RS is used for only data demodulation, and the CRS is used for the two purposes of channel information acquisition and data demodulation.

The receiver side (i.e., terminal) measures the channel state from the CRS and feeds back the indicators associated with the channel quality, such as the channel quality indicator (CaI), the precoding matrix index (PMI), and/or the rank indicator (RI) to the transmitting side (i.e., an eNB). The CRS is also referred to as a cell-specific RS. On the contrary, a reference signal associated with a feed-back of channel state information (CSI) may be defined as CSI-RS.

The DM-RS may be transmitted through resource elements when data demodulation on the PDSCH is required. The terminal may receive whether the DM-RS is present through the upper layer and is valid only when the corresponding PDSCH is mapped. The DM-RS may be referred to as the UE-specific RS or the demodulation RS (DMRS).

FIG. 14 illustrates a reference signal pattern mapped to a downlink resource block pair in the wireless communication system to which an embodiment of the present invention may be applied.

Referring to FIG. 14, as a unit in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (FIG. 14(a)) and a length of 12 OFDM symbols in the case of an extended cyclic prefix (CP) (FIG. 14(b)). Resource elements (REs) represented as '0', '1', '2', and '3' in a resource block lattice mean the positions of the CRSs of antenna port indexes '0', '1', '2', and '3', respectively and resource elements represented as 'D' means the position of the DM-RS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (eNB). The RSs are transmitted based on maximum 4 antenna ports depending on the number of transmitting antennas of an eNB in the 3GPP LTE system (for example, release-8). The transmitter side has three types of antenna arrays of three single transmitting antennas, two transmitting antennas, and four transmitting antennas. For instance, in case that the number of the transmitting antennas of the eNB is 2, CRSs for antenna #1 and antenna #2 are transmitted. For another instance, in case that the number of the transmitting antennas of the eNB is 4, CRSs for antennas #1 to #4 are transmitted. When the number of transmission antennas of the eNB is four, the CRS pattern in one RB is as shown in FIG. 14.

When the eNB uses the single transmitting antenna, a reference signal for a single antenna port is arrayed.

When the eNB uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the eNB uses four transmitting antennas, reference signals for four transmitting antenna ports are arrayed using the TDM and/or FDM scheme. Channel information measured by a downlink signal receiving side (i.e., a terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule for mapping a CRS to a resource block is defined as below.

$$k = 6m + (v + v_{shift}) \bmod 6 \qquad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

-continued
$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. N_symb^DL represents the number of OFDM symbols in one downlink slot and N_RB^DL represents the number of radio resources allocated to the downlink. n_s represents a slot index and, N_ID^Cell represents a cell ID. mod represents an modulo operation. The position of the reference signal varies depending on the v_shift value in the frequency domain. Since v_shift depends on the cell ID (i.e., physical layer cell ID), the position of the reference signal has various frequency shift values according to the cell.

More specifically, the position of the CRS may be shifted in the frequency domain according to the cell in order to improve channel estimation performance through the CRS. For example, when the reference signal is positioned at an interval of three subcarriers, reference signals in one cell are allocated to a 3 k-th subcarrier and a reference signal in another cell is allocated to a 3 k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DM-RS is described in more detail, the DM-RS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DM-RS for rank 1 beamforming is defined. The DM-RS for the rank 1 beamforming also means a reference signal for antenna port index 5.

A rule of mapping the DM-RS to the resource block is defined as below. Equation 13 shows the case of the normal CP and Equation 14 shows the case of the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k and l indicate a subcarrier index and a symbol index, respectively, and p indicates an antenna port. N_sc^RB indicates the size of the resource block in the frequency domain and is expressed as the number of subcarriers. n_PRB indicates the number of physical resource blocks. N_RB^PDSCH indicates a frequency band of the resource block for the PDSCH transmission. n_s indicates the slot index and N_ID^cell indicates the cell ID. mod indicates the modulo operation. The position of the reference signal varies depending on the v_shift value in the frequency domain. Since v_shift depends on the cell ID (i.e., physical layer cell ID), the position of the reference signal has various frequency shift values according to the cell.

An LTE-A system of a form evolved and advanced from the LTE system needs to be designed to support a maximum of eight transmission antennas in the downlink of an eNB. Accordingly, an RS for the maximum of eight transmission antennas need to be also supported. In the LTE system, a downlink RS has been defined for a maximum of four antenna ports. Accordingly, in the LTE-A system, if an eNB has a maximum of eight downlink transmission antennas greater than 4, an RS for the antenna ports needs to be additionally defined and designed. In the RS for the maximum of eight transmission antenna ports, all of the aforementioned RS for channel measurement and the aforementioned two RSs for data demodulation need to be designed.

One of things that need to be taken into consideration in designing the LTE-A system is backward compatibility, that is, that an LTE UE must well operate without any problem in the LTE-A system and the system must support such an operation. From a viewpoint of RS transmission, an RS for the maximum of eight transmission antenna ports must be additionally defined in the time-frequency domain in which a CRS defined in LTE is transmitted every subframe in a full band. In the LTE-A system, if an RS pattern for the maximum of eight transmission antennas is added to a full band every subframe using a method, such as the CRS of the existing LTE, RS overhead is excessively increased.

Accordingly, in the LTE-A system, a newly designed RS is basically divided into two types. The two types include the RS of a channel measurement object for the selection of an MCS or a PMI (a channel state information-RS (CSI-RS), a channel state indication-RS, etc.) and an RS for the demodulation of data transmitted through the eight transmission antennas (a data demodulation-RS (DMRS)).

The CSI-RS for the channel measurement object is characterized in that it is designed for a channel measurement-oriented purpose unlike the existing CRS that is used for an object, such as channel measurement and the measurement of handover, and for data demodulation. Furthermore, the CSI-RS may also be used for an object for the measurement of handover. Unlike the CRS, the CSI-RS does not need to be transmitted every subframe because it is transmitted for only an object of obtaining information about a channel state. In order to reduce overhead of the CSI-RS, the CSI-RS is intermittently transmitted on the time axis.

For data demodulation, a DM-RS is dedicatedly transmitted to a UE scheduled in a corresponding time-frequency domain. That is, the DM-RS of a specific UE is transmitted only in a region in which the corresponding UE has been scheduled, that is, in a time-frequency domain in which the corresponding UE receives data.

In the LTE-A system, an eNB has to transmit a CSI-RS for all of antenna ports. If the CSI-RS for the maximum of eight transmission antenna ports is transmitted every subframe, there is a disadvantage in that overhead is very large. Accordingly, the CSI-RS may be intermittently transmitted in the time axis without being transmitted every subframe in order to reduce the overhead. That is, the CSI-RS may be periodically transmitted with a cycle of a whole number multiple of one subframe or may be transmitted in a specific transmission pattern. In this case, the cycle or pattern in which the CSI-RS is transmitted may be configured by the eNB.

In order to measure a CSI-RS, a UE must be aware of information about the transmission subframe index of a CSI-RS for each of CSI-RS antenna ports of a cell to which the UE belongs, a CSI-RS resource element (RE) time-frequency position within a transmission subframe and a CSI-RS sequence.

In the LTE-A system, an eNB has to transmit a CSI-RS with respect to each of the maximum of eight antenna ports. Resources used for the CSI-RS transmissions of different antenna ports need to be orthogonal to each other. When one eNB transmits CSI-RSs for different antenna ports, the eNB may orthogonally assign resources using an FDM/TDM method by mapping the CSI-RSs for the antenna ports to different REs. Alternatively, the eNB may transmit the CSI-RSs for different antenna ports using a CDM method of mapping the CSI-RSs to pieces of orthogonal code.

When the eNB notifies a UE within its cell of the information about the CSI-RS, first, the eNB must notify the UE of information about a time-frequency to which the CSI-RS for each antenna port is mapped. Specifically, the information includes a subframe numbers in which the CSI-RSs are transmitted, a cycle in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

The CSI-RS is transmitted through one, two, four or eight antenna ports. In this case, the antenna ports used are p=15, p=15, 16, p=15, . . . , 18, p=15, . . . , 22. The CSI-RS may be defined with respect to only a subcarrier interval $\Delta f=15$ kHz.

(k',l') (in this case, k' is a subcarrier index within a resource block, and l' indicates an OFDM symbol index within a slot) and the condition of n_s is determined depending on a CSI-RS configuration, such as Table 15 or Table 16 below.

Table 15 illustrates the mapping of (k',l') from a CSI-RS configuration in a normal CP.

TABLE 15

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |

TABLE 15-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 16 illustrates the mapping of (k',l') from a CSI-RS configuration in an extended CP.

TABLE 16

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 15 and Table 16, in the transmission of the CSI-RSs, a maximum of 32 (in the case of a normal CP) or a maximum of 28 (in the case of an extended CP) different configurations are defined in order to reduce inter-cell interference (ICI) in a multi-cell environment including a heterogeneous network (HeNet) environment.

The CSI-RS configuration is different depending on the number of antenna ports within a cell and a CP. A neighbor cell may have a maximum of different configurations. Furthermore, the CSI-RS configuration may be divided into a case where it is applied to both an FDD frame and a TDD frame and a case where it is applied to a TDD frame depending on a frame structure.

(k',l') and n_s are determined depending on a CSI-RS configuration based on Table 15 and Table 16, and time-frequency resources used for each CSI-RS antenna port to transmit a CSI-RS are determined.

FIG. 15 is a diagram illustrating a CSI-RS configuration in a wireless communication system to which the present invention may be applied.

FIG. 15(a) shows twenty CSI-RS configurations which may be used for CSI-RS transmission by one or two CSI-RS antenna ports. FIG. 15(b) shows ten CSI-RS configurations which may be used by four CSI-RS antenna ports. FIG. 15(c) shows five CSI-RS configurations which may be used for CSI-RS transmission by eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, a CSI-RS is transmitted on radio resources according to a configured CSI-RS configuration of the twenty CSI-RS configurations shown in FIG. 15(a).

Likewise, if four antenna ports are configured for CSI-RS transmission with respect to a specific cell, CSI-RSs are transmitted on radio resources according to a configured CSI-RS configuration of the ten types of CSI-RS configurations shown in FIG. 15(b). Furthermore, if eight antenna ports are configured for CSI-RS transmission with respect to a specific cell, CSI-RSs are transmitted on radio resources according to a configured CSI-RS configuration of the five CSI-RS configurations shown in FIG. 15(c).

A CSI-RS for each of antenna ports every two antenna ports (i.e., {15,16}, {17,18}, {19,20} or {21,22}) is subjected to CDM in the same radio resources and transmitted. For example, in the case of the antenna ports 15 and 16, CSI-RS complex symbols for the antenna ports 15 and 16 are the same, but different types of orthogonal code (e.g., Walsh code) are multiplied and mapped to the same radio resources. The complex symbol of the CSI-RS for the antenna port 15 is multiplied by [1, 1] and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code multiplied into a transmitted symbol. That is, code [1 1] multiplied in order to detect the CSI-RS for the antenna ports 15 is multiplied, and code [1 −1] multiplied in order to detect the CSI-RS for the antenna ports 16 is multiplied.

Referring to FIGS. 15(a) to 15(c), in the case of the same CSI-RS configuration index, radio resources according to a CSI-RS configuration having a large number of antenna ports include radio resources according to a CSI-RS configuration having a small number of CSI-RS antenna ports. For example, in the case of a CSI-RS configuration 0, radio resources for the number of eight antenna ports include radio resources for the number of four antenna ports and radio resources for the number of one or two antenna ports.

A plurality of CSI-RS configurations may be used in one cell. Only 0 or 1 CSI-RS configuration may be used for a non-zero power (NZP) CSI-RS, and 0 or several CSI-RS configurations may be used for a zero power (ZP) CSI-RS.

A UE assumes zero transmission power in REs corresponding to the four CSI-RS columns of Table 15 and Table 16 (an RE overlapping an RE assuming an NZP CSI-RS configured by a higher layer is cancelled) for each bit set to 1 in the zeropower CSI-RS (ZP CSI-RS), that is, a bitmap of 16 bits configured by a higher layer. The most significant bit (MSB) corresponds to the lowest CSI-RS configuration index, and next bits within the bitmap sequentially correspond to next CSI-RS configuration indices.

A CSI-RS is transmitted only in a downlink slot that satisfies the condition of (n_s mod 2) and a subframe that satisfies a CSI-RS subframe configuration in Table 15 and Table 16.

In the case of the frame structure type 2 (TDD), a CSI-RS is not transmitted in a special subframe, a synchronization signal (SS), a subframe that collides against the transmission of a PBCH or SystemInformationBlockType1 (SIB 1) message or a subframe configured to paging message transmission.

Furthermore, an RE in which a CSI-RS for which antenna port belonging to the antenna port set S(S={15}, S={15,16}, S={17,18}, S={19,20} or S={21,22}) is transmitted is not used for the transmission of a PDSCH or the CSI-RS of other antenna ports.

As CSI-RS overhead increases, data throughput is decreased because time-frequency resources used for CSI-RS transmission cannot be used for data transmission. A CSI-RS is not configured to be transmitted every subframe, but is configured to be transmitted in each specific transmission cycle corresponding to a plurality of subframes by taking into consideration the above problem. In this case, CSI-RS transmission overhead can be greatly reduced compared to a case where every subframe CSI-RS is transmitted.

A subframe cycle (hereinafter referred to as a "CSI transmission cycle") T_CSI-RS and a subframe offset Δ_CSI-RS for CSI-RS transmission is listed in Table 17.

Table 17 illustrates CSI-RS subframe configurations.

TABLE 17

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 17, the CSI-RS transmission cycle T_CSI-RS and the subframe offset Δ_CSI-RS are determined depending on a CSI-RS subframe configuration I_CSI-RS.

The CSI-RS subframe configuration of Table 17 may be configured as one of the "SubframeConfig" field and the "zeroTxPowerSubframeConfig" field. The CSI-RS subframe configuration may be separately configured with respect to the NZP CSI-RS and the ZP CSI-RS.

A subframe including a CSI-RS satisfies Equation 15 below.

$$(10 n_f + \lfloor n_s/2 \rfloor - \Delta_{CSI-RS}) \bmod T_{CSI-RS} = 0 \quad \text{[Equation 15]}$$

In Equation 15, the T_CSI-RS means a CSI-RS transmission cycle, Δ_CSI-RS means a subframe offset value, n_f means a system frame number, and n_s means a slot number.

In the case of a UE for which the transmission mode 9 has been configured with respect to a serving cell, one CSI-RS resource configuration may be configured for the UE. In the case of a UE for which the transmission mode 10 has been configured with respect to a serving cell, one or more CSI-RS resource configuration(s) may be configured for the UE.

The following parameters for each CSI-RS resource configuration are configured through high layer signaling.
  if the transmission mode 10 has been configured, a CSI-RS resource configuration identifier
  a CSI-RS port number
  a CSI-RS configuration (refer to Table 15 and Table 16)
  a CSI-RS subframe configuration I_CSI-RS (refer to Table 17)
  if the transmission mode 9 has been configured, transmission power P_C for CSI feedback
  if the transmission mode 10 has been configured, transmission power P_C for CSI feedback with respect to each CSI process. If CSI subframe sets C_CSI,0 and C_CSI,1 are configured by a higher layer for a CSI process, P_C is configured for each CSI subframe set of the CSI process.
  a pseudo-random sequence generator parameter n_ID
  if the transmission mode 10 has been configured, a higher layer parameter "qcl-CRS-Info-r11" including the quasi-co-located (QCL) type B and a QCL scrambling identifier "qcl-ScramblingIdentity-r11" for UE assumption, a CRS port count "crs-PortsCount-r11", an MBSFN subframe configuration list "mbsfn-SubframeConfigList-r11" parameter.

If a CSI feedback value derived by a UE has a value within the [−8, 15] dB range, P_C is assumed to be the ratio of PDSCH EPRE to CSI-RS EPRE. In this case, the PDSCH EPRE corresponds to a symbol whose ratio of the PDSCH EPRE to the CRS EPRE is ρ_A.

A CSI-RS and a PMCH are not transmitted together in the same subframe of a serving cell.

In the frame structure type 2, if four CRS antenna ports have been configured, CSI-RS configuration indices belonging to the [20-31] set (refer to Table 15) in the case of a normal CP or CSI-RS configuration indices belonging to [16-27] set (refer to Table 16) in the case of an extended CP are not configured for a UE.

A UE may assume that the CSI-RS antenna port of a CSI-RS resource configuration has a QCL relation with respect to delay spread, Doppler spread, a Doppler shift, an average gain and average delay.

A UE in which the transmission mode 10 and the QCL type B have been configured may assume that the antenna ports 0-3 corresponds to a CSI-RS resource configuration and the antenna ports 15-22 corresponding to a CSI-RS resource configuration have a QCL relation with respect to Doppler spread and a Doppler shift.

In the case of a UE in which the transmission mode 10 has been configured, one or more channel state information-interference measurement (CSI-IM) resource configurations may be configured with respect to a serving cell.

The following parameters for each CSI-IM resource configuration may be configured through high layer signaling.
  a ZP CSI-RS configuration (refer to Table 15 and Table 16)
  a ZP CSI RS subframe configuration "I_CSI-RS" (refer to Table 17)

The CSI-IM resource configuration is the same as any one of configured ZP CSI-RS resource configurations.

A CSI-IM resource and a PMCH are not configured in the same subframe of a serving cell at the same time.

In the case of a UE in which the transmission mode 1-9 has been configured, one ZP CSI-RS resource configuration may be configured for the UE with respect to a serving cell. In the case of a UE in which the transmission mode 10 has been configured, one or more ZP CSI-RS resource configurations may be configured for the UE with respect to a serving cell.

The following parameters for the ZP CSI-RS resource configuration may be configured through high layer signaling.
  a ZP CSI-RS configuration list (refer to Table 15 and Table 16)
  a ZP CSI-RS subframe configuration "I_CSI-RS" (refer to Table 17)

A ZP CSI-RS and a PMCH are not configured in the same subframe of a serving cell at the same time.

Cross-Carrier Scheduling and E-PDCCH Scheduling

In the 3GPP LTE Rel-10 system, a cross-component carrier (cross-CC) scheduling operation is defined as follows in an aggregation situation for a plurality of CCs (a CC=a (serving) cell). One CC (i.e., a scheduled CC) may be previously configured so that DL/UL scheduling is performed from only one specific CC (i.e., a scheduling CC) (i.e., a DL/UL grant PDCCH for a corresponding scheduled CC can be received). Furthermore, a corresponding scheduling CC may basically perform DL/UL scheduling on the corresponding scheduling CC. In other words, a search space (SS) for a PDCCH that schedules a scheduling/scheduled CC having a cross-CC scheduling relation may be fully present in the control channel region of the scheduling CC.

Meanwhile, in the LTE system, as described above, in FDD DL carriers or TDD DL subframes, the first n OFDM symbols of a subframe are used to transmit a PDCCH, a PHICH and a PCFICH, that is, physical channels for the transmission of a variety of types of control information, and the remaining OFDM symbols are used for PDSCH transmission. In this case, the number of symbols used for the transmission of the control channels in each subframe is transmitted to a UE dynamically through a physical channel, such as a PCFICH, or in a semi-static manner through RRC signaling. In this case, characteristically, the n value may be set from one symbol to a maximum of 4 symbols depending on subframe characteristics and system characteristics (FDD/TDD, system bandwidth, etc.).

Meanwhile, in the existing LTE system, a PDCCH, that is, a physical channel for DL/UL scheduling and for transmitting a variety of types of control information, has a limit in that it is transmitted through limited OFDM symbols.

Accordingly, an advanced PDCCH (i.e., an enhanced PDCCH (E-PDCCH)) more freely multiplexed with a PDSCH using the FDW/TDM method instead of a control channel separated from a PDSCH like a PDCCH and transmitted through OFDM symbol may be introduced.

FIG. 16 is a diagram illustrating a PDCCH and an E-PDCCH in a wireless communication system to which the present invention may be applied.

Referring to FIG. 16, a legacy PDCCH (i.e., an L-PDCCH) is transmitted in the first n OFDM symbols of a subframe, and an E-PDCCH is multiplexed with a PDSCH using the FDM/TDM method and transmitted.

Quasi Co-Located (QCL) Between Antenna Ports

Quasi co-located and quasi co-location (QC/QCL) may be defined as follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE can perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property can be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several ~several tens of ms, and each resource block has also low density of 1 resource element for each antenna port in average. Accordingly, the CSI-RS may experience performance deterioration if it is used to estimate the large-scale property of a wireless channel.

That is, UE can perform the detection/reception, channel estimation, and channel state report of a downlink reference signal through a QC/QCL assumption between antenna ports.

Cell Measurement/Measurement Report

For one of several methods (handover, random access, cell search, etc.) for guaranteeing the mobility of a UE or for the several methods, a UE reports the results of cell measurement to an eNB (or a network).

In the 3GPP LTE/LTE-A system, a cell-specific reference signal (CRS) is transmitted through zeroth, fourth, seventh and eleventh OFDM symbols within each subframe in the time axis, and is basically used for cell measurement. That is, a UE performs cell measurement using CRSs received from a serving cell and a neighbor cell.

The cell measurement is a concept, including radio resource management (RRM) measurement, such as reference signal receive power (RSRP) for the measurement of the signal intensity or signal intensity to total received power of a serving cell and a neighbor cell, a received signal strength indicator (RSSI) and reference signal received quality (RSRQ), and radio link monitoring (RLM) measurement capable of evaluating a radio link failure by measuring link quality with a serving cell.

The RSRP is a linear average of a power distribution of REs in which a CRS is transmitted within a measurement frequency band. In order to determine the RSRP, a CRS (R0) corresponding to an antenna ports "0" may be used. Furthermore, in order to determine the RSRP, a CRS (R1) corresponding to the antenna ports "1" may be additionally used. In order to determine the RSRP, the number of REs used within a measurement frequency band and measurement period used by a UE may be determined by the UE within the limits that corresponding measurement accuracy requirements are satisfied. Furthermore, power per RE may be determined from energy received within the remaining parts of a symbol other than a cyclic prefix (CP).

The RSSI is derived as a linear average of total received power sensed from all of sources by a corresponding UE, including a serving cell and non-serving cell of a co-channel, interference from a neighbor channel, and thermal noise in OFDM symbols including an RS corresponding to the antenna port "0" within a measurement band. If a specific subframe for performing RSRQ measurement is indicated by higher layer signaling, the RSSI is measured through all of OFDM symbols within the indicated subframes.

The RSRQ is derived as N×RSRP/RSSI. In this case, N means the number of RBs of an RSSI measurement bandwidth. Furthermore, in the above equation, the measurement of the numerator and the denominator may be calculated from a set of the same RBs.

An eNB may transfer configuration information for measurement to a UE through higher layer signaling (e.g., an RRC connection reconfiguration message).

The RRC connection reconfiguration message includes a radio resource configuration-dedicated ("radioResource-ConfigDedicated") information element (IE) and a measurement configuration ("measConfig") IE.

The "measConfig" IE specifies measurement that must be performed by a UE, and includes configuration information for intra-frequency mobility, inter-frequency mobility and inter-RAT mobility in addition to the configuration of a measurement gap.

Particularly, the "measConfig" IE includes "measObjectToRemoveList" indicative of a list of measurement objects ("measObject") to be removed from measurement and "measObjectToAddModList" indicative of a list that is to be newly added or modified. Furthermore, the "measObject" includes "MeasObjectCDMA2000", "MeasObjctEUTRA" and "MeasObjectGERAN" depending on a communication technology.

The "RadioResourceConfigDedicated" IE is used to setup/modify/release a radio bearer, to change a MAC main configuration, to change a semi-persistent scheduling (SPS) configuration or to change a dedicated physical configuration.

The "RadioResourceConfigDedicated" IE includes a "measSubframePattern-Serv" field indicative of a time domain measurement resource restriction pattern for serving cell measurement. Furthermore, the "RadioResourceConfigDedicated" IE includes "measSubframeCellList" indicative of a neighbor cell to be measured by a UE and "measSubframePattern-Neigh" indicative of a time domain measurement resource restriction pattern for neighbor cell measurement.

The time domain measurement resource restriction pattern configured for measurement cells (including a serving cell and a neighbor cell) may indicate at least one subframe perform radio frame for performing RSRQ measurement. RSRQ measurement is not performed in a subframe other than a subframe indicated by the time domain measurement resource restriction pattern configured for a measurement cell.

As described above, a UE (e.g., 3GPP Rel-10) has to perform RSRQ only in the period configured by a subframe pattern "measSubframePattern-Serv" for serving cell measurement and a subframe pattern "measSubframePattern-Neigh" for neighbor cell measurement.

However, regarding the RSRP, measurement within such a pattern is not limited, but it is preferred that the RSRP is measured only within the pattern for an accuracy requirement.

Measurements

Measurement performed by a UE for intra/inter-frequency mobility may be controlled using broadcast or dedicated control by an E-UTRAN.

In the RRC_IDLE state, a UE complies with a measurement parameter defined for cell reselection specified by E-UTRAN broadcast. For the RRC_IDLE state, dedicated measurement control may be used.

In the RRC_CONNECTED state, a UE complies with a measurement configuration specified by RRC (e.g., UTRAN MEASUREMENT_CONTROL) transferred by an E-UTRAN.

Intra-frequency neighbor (cell) measurement and inter-frequency neighbor (cell) measurement are defined as follows.

In relation to the intra-frequency neighbor (cell) measurement, when a current cell and a target cell operate on the same carrier frequency, neighbor cell measurement performed by a UE is intra-frequency measurement. The UE may perform such measurement without a measurement gap.

In contrast, in relation to inter-frequency neighbor (cell) measurement, when a neighbor cell operates on a different carrier frequency from that of a current cell, neighbor cell measurement performed by a UE is inter-frequency measurement. The UE cannot perform such measurement without a measurement gap.

Whether a gap is not supported or a gap is supported in measurement may be determined by the capability and current operation frequency of a UE.

A UE may determine whether specific cell measurement needs to be performed within a transmission/reception gap and whether it is necessary to be aware of whether a scheduler requires a gap.

In the case of the same carrier frequency and cell bandwidth, intra-frequency measurement is performed and a measurement gap is not supported.

If carrier frequencies are the same carrier frequency and the bandwidth of a target cell is smaller than the bandwidth of a current cell, intra-frequency measurement is performed and a measurement gap is not supported.

If carrier frequencies are the same carrier frequency and the bandwidth of a target cell is greater than the bandwidth of a current cell, intra-frequency measurement is performed and a measurement gap is not supported.

If carrier frequencies are different carrier frequencies, the bandwidth of a target cell is smaller than the bandwidth of a current cell, and the bandwidth of a target cell is present within the bandwidth of the current cell, inter-frequency measurement is performed and a measurement gap is supported.

If carrier frequencies are different carrier frequencies, the bandwidth of a target cell is greater than the bandwidth of a current cell and the bandwidth of a current cell is present within the bandwidth of the target cell, inter-frequency measurement is performed and a measurement gap is supported.

In the case of different carrier frequencies and a non-overlapping bandwidth, inter-frequency measurement is performed and a measurement gap is supported.

The pattern of a measurement gap is configured and enabled by RRC.

When a CA is configured, a current cell refers to a serving cell within a set of configured serving cells. Accordingly, the definition of intra/inter frequency measurement may be as follows.

In relation to intra-frequency neighbor (cell) measurement, when one of serving cells of a configured set and a target cell operate on the same carrier frequency, neighbor cell measurement performed by a UE is intra-frequency measurement. The UE may perform such measurement without a measurement gap.

In contrast, in relation to inter-frequency neighbor (cell) measurement, when a neighbor cell operates on a carrier frequency different from that of serving cells of a configured set, neighbor cell measurement performed by a UE is inter-frequency measurement. The UE cannot perform such measurement without a measurement gap.

Uplink Reference Signal

In the 3GPP LTE/LTE-A system, the following two types of uplink reference signals are supported.

a demodulation reference signal (DMRS) related to the transmission of a PUSCH or PUCCH a sounding reference signal (SRS) related to the transmission of a PUSCH or PUCCH FIG. 17 is a diagram illustrating the structure of an uplink subframe in a wireless communication system to which the present invention may be applied.

Referring to FIG. 17, a UE may transmit a sounding reference signal (SRS) periodically or aperiodically in order to estimate a channel for an uplink band (subband) other than a band in which a PUSCH is transmitted or to obtain information about a channel corresponding to a total uplink bandwidth (wide band). If the sounding reference signal is periodically transmitted, a cycle is determined through a higher layer signal and an eNB may indicate the transmission of an aperiodic sounding reference signal using the "SRS request" field of a PDCCH uplink/downlink DCI format or may transmit a triggering message. As in the example of FIG. 17, the region in which a sounding reference signal may be transmitted within one subframe is the period in which an SC-FDMA symbol located at the last on the time axis is located within one subframe. The sounding reference signals of several UEs transmitted in the last SC-FDMA of the same subframe may be classified depending on frequency positions. Unlike in a PUSCH, a discrete Fourier transform (DFT) operation for transform into SC-FDMA is not performed on a sounding reference signal, and the sounding reference signal is transmitted without using a precoding matrix used in a PUSCH.

Furthermore, the region in which a demodulation-reference signal (DMRS) is transmitted within one subframe is the period in which an SC-FDMA symbol located at the center of each slot on the time axis is located. Likewise, a demodulation-reference signal (DMRS) is transmitted through a data transmission band on the frequency. For example, in a subframe to which a normal cyclic prefix is applied, a demodulation-reference signal is transmitted in the fourth SC-FDMA symbol and the eleventh SC-FDMA symbol.

A demodulation-reference signal may be combined with the transmission of a PUSCH or PUCCH. A sounding reference signal is a reference signal transmitted from a UE to an eNB for uplink scheduling. The eNB estimates an uplink channel through the received sounding reference signal and uses the estimated uplink channel for uplink scheduling. The sounding reference signal is not combined with the transmission of a PUSCH or PUCCH. For a demodulation-reference signal and a sounding reference signal, the same kind of a base sequence may be used. Meanwhile, in uplink multiple antenna transmission, precoding applied to a demodulation-reference signal may be the same as precoding applied to a PUSCH.

FIG. 18 is a diagram for illustrating a signal processing process for transmitting a reference signal in uplink in a wireless communication system to which the present invention may be applied.

As shown in FIG. 18, data is transmitted through IFFT after a signal is generated in the time domain and frequency mapping through a DFT precoder. In contrast, a process through the DFT precoder is omitted for a reference signal. Specifically, after a reference sequence is immediately generated in the frequency domain (S1801), the reference sequence sequentially experiences localization mapping (S1802), an IFFT (S1803) process and a cyclic prefix (CP) attachment process (S1804), and is transmitted.

FIG. 19 is a diagram showing the structure of a subframe for transmitting a demodulation-reference signal (DMRS) in a wireless communication system to which the present invention may be applied.

FIG. 19(a) is a diagram showing the structure of a subframe for transmitting a demodulation-reference signal in the case of a normal cyclic prefix (CP). FIG. 19(b) is a diagram showing the structure of a subframe for transmitting a demodulation-reference signal in the case of an extended cyclic prefix (CP). Referring to FIG. 19(a), in a normal cyclic prefix, a demodulation-reference signal is transmitted through the fourth and the eleventh SC-FDMA symbols. Referring to FIG. 19(b), in an extended cyclic prefix, a demodulation-reference signal is transmitted through the third and the ninth SC-FDMA symbols.

A method of generating/mapping an uplink reference signal is described in detail below.

For a DMRS and SRS, the same base sequence set is used.

A reference signal sequence $r_{u,v}^{(\alpha)}(n)$ is defined by the cyclic shift (CS) $\alpha$ of a base sequence $\bar{r}_{u,v}(n)$ as in Equation 16 below.

$$r_{u,v}^{(\alpha)}(n) = e^{j\alpha n}\bar{r}_{u,v}(n), \ 0 \leq n < M_{sc}^{RS} \quad \text{[Equation 16]}$$

In Equation 16, $M_{sc}^{RS}$ is the length of the reference signal sequence. $M_{sc}^{RS}=m*N_{sc}^{RB}$ ($1 \leq m \leq N_{RB}^{max,UL}$). A multiple reference signal sequence is defined by different cyclic shifts $\alpha$ from a single base sequence. $N_{sc}^{RB}$ means the size of a resource block (RB) in the frequency domain and is expressed as the number of sub-carriers. $N_{RB}^{max,UL}$ means a maximum of uplink bandwidth configurations and is expressed as a multiple of $N_{sc}^{RB}$.

The base sequence may be divided into a plurality of groups. $u \in \{0, 1, \ldots, 29\}$ is a group number, and v is a base sequence number within the group. Each group includes one base sequence (v=0) having a length of $M_{sc}^{RS}=m*N_{sc}^{RB}$ ($1 \leq m \leq 5$) and two base sequences (v=0,1) each having a length of $M_{sc}^{RS}=m*N_{sc}^{RB}$ ($6 \leq m \leq N_{RB}^{max,UL}$). The sequence group number u and the base sequence number v within the group may be different over time.

The base sequence $\bar{r}_{u,v}(0), \ldots, \bar{r}_{u,v}(M_{sc}^{RS}-1)$ may be differently defined depending on a sequence length $M_{sc}^{RS}$.

The sequence-group number u within the slot n_s is defined by a group hopping pattern $f_{gh}(n_s)$ and a sequence-shift pattern $f_{ss}$ as in Equation 17.

$$u = (f_{gh}(n_s) + f_{ss}) \bmod 30 \quad \text{[Equation 17]}$$

17 different hopping patterns and 30 different sequence-shift patterns are present. Sequence-group hopping may be enabled or disabled by a cell-specific parameter "Group-hopping-enabled" provided by a higher layer. If PUSCH transmission does not correspond to the retransmission of the same transport block as part of a random access response grant or contention-based random access procedure, although sequence-group hopping is enabled based on a cell, sequence-group hopping for a PUSCH may be disabled by a specific UE through a higher layer parameter "Disable-sequence-group-hopping."

A group-hopping pattern $f_{gh}(n_s)$ may be different depending on a PUSCH, a PUCCH and an SRS, and is determined as in Equation 18.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 18]}$$

c(i) indicates a pseudo-random number sequence. The pseudo-random number sequence generator may be reset as a value $$c_{init} = \left\lfloor \frac{n_{ID}^{RS}}{30} \right\rfloor$$

when each radio frame starts. In this case, $n_{ID}^{RS}$ is a virtual cell identity (VCID) for generating a sequence, and will be described in detail later.

The definition of a sequence-shift pattern "f_ss" is different depending on a PUCCH, a PUSCH and an SRS.

In the case of a PUCCH, a sequence-shift pattern $f_{ss}^{PUCCH}$ is determined as in $f_{ss}^{PUCCH} = n_{ID}^{RS} \bmod 30$.

In the case of a PUSCH, if $n_{ID}^{PUSCH}$ is not configured by a higher layer or PUSCH transmission does not correspond to the retransmission of a transport block as a random access response grant or part of a contention-based random access procedure, the sequence-shift pattern $f_{ss}^{PUSCH}$ is determined as in $f_{ss}^{PUSCH} = (N_{ID}^{cell} + \Delta_{ss}) \bmod 30$. In this case, $\Delta_{ss} \in \{0, 1, \ldots, 29\}$ is configured by a higher layer.

N_ID^cell means a physical layer cell identity. In contrast, if not, the sequence-shift pattern f_ss^PUSCH is determined as in $f_{ss}^{PUSCH} = n_{ID}^{RS} \mod 30$.

In the case of an SRS, the sequence-shift pattern f_ss^PUSCH is determined as in $f_{ss}^{SRS} = n_{ID}^{RS} \mod 30$.

Sequence hopping is applied when the length M_sc^RS of a reference signal is equal to or greater than 6*N_sc^RB.

If the length M_sc^RS of a reference signal is smaller than 6*N_sc^RB, a base sequence number v within a base sequence group is determined to be 0.

If the length M_sc^RS of a reference signal is equal to or greater than 6*N_sc^RB, a base sequence number v within a base sequence group in a slot n_s is defined as in Equation 19.

$$v = \begin{cases} c(n_s) & \text{if group hopping is disabled and sequence hopping is enabled} \\ 0 & \text{otherwise} \end{cases} \quad \text{[Equation 19]}$$

In Equation 19, c(i) indicates a pseudo-random number sequence. The parameter "Sequence-hopping-enabled" provided by a higher layer determines whether sequence hopping is enabled. If PUSCH transmission does not correspond to the retransmission of the same transport block as a random access response grant or part of a contention-based random access procedure, although sequence hopping has been enabled based on a cell, sequence hopping for a PUSCH may be disabled with respect to a specific UE through the higher layer parameter "Disable-sequence-group-hopping."

In the case of a PUSCH, the pseudo-random number sequence generator is reset as $$c_{init} = \left\lfloor \frac{n_{ID}^{RS}}{30} \right\rfloor \cdot 2^5 + f_{ss}^{PUSCH}$$

when each radio frame starts.

In the case of an SRS, the pseudo-random number sequence generator is reset to $$c_{init} = \left\lfloor \frac{n_{ID}^{RS}}{30} \right\rfloor \cdot 2^5 + (n_{ID}^{RS} + \Delta_{ss}) \mod 30$$

when each radio frame starts.

A virtual cell identity n_ID^RS for generating a sequence may be differently defined depending on the type of transmission.

In transmission related to a PUSCH, if n_ID^PUSCH is not configured by a higher layer or PUSCH transmission corresponds to the retransmission of the same transport block as a random access response grant or part of a contention-based random access procedure, n_ID^RS=N_ID^cell. In contrast, if not, n_ID^RS=n_ID^PUSCH. n_ID^PUSCH may be provided to a UE by higher layer signaling.

In transmission related to a PUCCH, if n_ID^PUCCH is not configured by a higher layer, n_ID^RS=N_ID^cell. In contrast, if not, n_ID^RS=n_ID^PUCCH. n_ID^PUCCH may be provided to a UE by higher layer signaling.

In the case of a sounding reference signal, n_ID^RS=N_ID^cell.

1) A reference signal for a PUSCH

A reference signal for a PUSCH is determined as follows.

A reference signal sequence $r_{PUSCH}^{(\lambda)}(\cdot)$ for a PUSCH is associated with a layer index $\lambda \in \{0, 1, \ldots, v-1\}$ and is defined as in Equation 20 below.

$$r_{PUSCH}^{(\lambda)}(m \cdot M_{sc}^{RS} S + n) = w^{(\lambda)}(m) r_{u,v}^{(\alpha_\lambda)}(n) \quad \text{[Equation 20]}$$

In Equation 20, m=0,1 and n=0, . . . , M_sc^RS−1. Furthermore, M_sc^RS=M_sc^PUSCH. M_sc^PUSCH means a bandwidth scheduled for uplink transmission and is expressed as the number of subcarriers.

In Equation 20, the orthogonal sequence w^(λ)(m) is determined to be [w^λ(0) w^λ(1)]=[1 1] for the DCI format 0 if a higher layer parameter "Activate-DMRS-with OCC" has not been set or a temporary C-RNTI is used to transmit the most recent uplink-related DCI for a transport block associated with the transmission of a corresponding PUSCH.

In contrast, if not, the orthogonal sequence w^(λ)(m) is determined as in Table 18 below using a cyclic shift field included in the most recent uplink-related DCI for a transport block related to the transmission of a corresponding PUSCH.

[w^λ(0) w^λ(1)] indicates an orthogonal sequence corresponding to the layer index λ. Particularly, w^(λ)(0) is a value applied to the first slot of the layer index λ, and w^(λ)(1) is a value applied to the second slot of the layer index A.

Table 18 shows a corresponding relation between a cyclic shift field within DCI related to uplink and n_DMRS,λ^(2) and [w^λ(0) w^λ(1)].

TABLE 18

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

A cyclic shift value $\alpha_\lambda$ within the n_s slot is determined as in Equation 21 below.

$$\alpha_\lambda = 2\pi n_{cs,\lambda}/12 \quad \text{[Equation 21]}$$

In Equation 21, n_cs,λ may be defined as in Equation 22.

$$n_{cs,\lambda} = (n_{DMRS}^{(1)} + n_{DMRS,\lambda}^{(2)} + n_{PN}(n_s)) \bmod 12 \quad \text{[Equation 22]}$$

The value n_DMRS^(1) is determined by Table 19 based on the parameter "cyclicShift" provided by a higher layer.

TABLE 19

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 | n_DMRS,λ^(2) is determined by a cyclic shift value for a DMRS field within the most recent uplink-related DCI for a transport block associated with the transmission of a corresponding PUSCH, and the value n_DMRS,λ^(2) is shown in Table 18.

If uplink-related DCI for the same transmission block associated with the transmission of the corresponding PUSCH is not present and a first PUSCH for the same transmission block is semi-persistently scheduled or the first PUSCH for the same transmission block is scheduled by a random access response grant, the first column of Table 18 may be used to obtain n_DMRS,λ^(2) and w^(λ)(m).

The value n_PN^(n_s) may be defined as Equation 23 below.

$$n_{PN}(n_s) = \sum_{i=0}^{7} c(8N_{symb}^{UL} \cdot n_s + i) \cdot 2^i \quad \text{[Equation 23]}$$

In Equation 23, c(i) is a pseudo-random number sequence and is a cell-specific value. The pseudo-random number sequence generator may be reset to a c_init value when each radio frame starts. N_symb^UL means the number of SC-FDMA symbols within an uplink slot.

If the N_ID^csh_DMRS is not configured by a higher layer or PUSCH transmission is the retransmission of the same transport block as a random access response grant or part of a contention-based random access procedure, c_init is determined as in Equation 24. If not, c_init is determined as in Equation 25 below.

$$c_{init} = \left\lfloor \frac{N_{ID}^{cell}}{30} \right\rfloor \cdot 2^5 + ((N_{ID}^{cell} + \Delta_{ss}) \bmod 30) \quad \text{[Equation 24]}$$

$$c_{init} = \left\lfloor \frac{N_{ID}^{csh\_DMRS}}{30} \right\rfloor \cdot 2^5 + (N_{ID}^{csh\_DMRS} \bmod 30) \quad \text{[Equation 25]}$$

The vector of a reference signal may be precoded as in Equation 26.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(v-1)} \end{bmatrix} \quad \text{[Equation 26]}$$

In Equation 26, P is the number of antenna ports used for PUSCH transmission. If a PUSCH is transmitted using one antenna port, P=1, W=1 and v=1. In the case of spatial multiplexing, P=2 or P=4. A precoding matrix W may use a precoding matrix for the precoding of a PUSCH within the same subframe.

A physical mapping method for an uplink reference signal in a PUSCH is as follows.

With respect to each antenna port used for PUSCH transmission, a sequence $\tilde{r}_{PUSCH}^{(\tilde{p})}(\cdot)$ is multiplied with an amplitude scaling factor β_PUSCH and is sequentially mapped starting from $\tilde{r}_{PUSCH}^{(\tilde{p})}(0)$. A relation between a physical resource block set and index $\tilde{p}$ and a antenna ports number P used in the mapping process is the same as that of corresponding PUSCH transmission. An index is mapped to a (k,l) resource element (RE) in order that k increases in l=3 in the case of a normal cyclic prefix and in l=2 in the case of an extended cyclic prefix, and is then mapped in order that a slot number increases.

2) A reference signal for a PUCCH

A reference signal for a PUCCH is determined as follows.

A reference signal sequence $r_{PUSCH}^{(\tilde{p})}(\cdot)$ for a PUCCH is defined as in Equation 27.

$$r_{PUCCH}^{(\tilde{p})}(m'N_{RS}^{PUCCH} M_{sc}^{RS} + mM_{sc}^{RS} + n) = \frac{1}{\sqrt{P}} \bar{w}^{(\tilde{p})}(m) z(m) r_{u,v}^{(\alpha_{\tilde{p}})}(n) \quad \text{[Equation 27]}$$

In Equation 21, m=0, . . . , N_RS^PUCCH−1, n=0, . . . , M_sc^RS−1, and m'=0,1. N_RS^PUCCH means the number of reference symbols for a PUCCH per slot. P is the number of antenna ports used for PUCCH transmission. In the case of the PUCCH format 2a, 2b, when m=1, z(m) is the same as d(10). In other case, z(m)=1. d(10) means a single modulation symbol used to generate a reference signal for the PUCCH format 2a, 2b.

$\alpha_{\tilde{p}}$ indicative of a cyclic shift is determined by a PUCCH format.

In the case of the PUCCH format 1, 1a, 1b, $\alpha_{\tilde{p}}(n_s,l)$ is defined as in Equation 28 below.

The number of reference symbols N_RS^PUCCH for a PUCCH per slot is shown in Table 20.

Table 20 shows the number of reference symbols for PUCCH demodulation per slot.

TABLE 20

| PUCCH format | Normal cyclic prefix | Extended cyclic prefix |
|---|---|---|
| 1, 1a, 1b | 3 | 2 |
| 2, 3 | 2 | 1 |
| 2a, 2b | 2 | N/A |

An orthogonal sequence is determined by a PUCCH format.

Table 21 shows an orthogonal sequence $[\bar{w}^{(\tilde{p})}(0) \ldots \bar{w}^{(\tilde{p})}(N_{RS}^{PUCCH}-1)]$ for the PUCCH format 1, 1a, 1b.

TABLE 21

| Sequence index $\bar{n}_{oc}^{(\tilde{p})}$ ($n_s$) | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Table 22 shows an orthogonal sequence $[\bar{w}^{(\tilde{p})}(0) \ldots \bar{w}^{(\tilde{p})}(N_{RS}^{PUCCH}-1)]$ in the PUCCH format 2, 2a, 2b, 3.

TABLE 22

| Normal cyclic prefix | Extended cyclic prefix |
|---|---|
| [1 1] | [1] |

A physical mapping method for an uplink reference signal in a PUCCH is the same.

With respect to each antenna port used for PUCCH transmission, the sequence $r_{PUCCH}^{(\tilde{p})}(\cdot)$ is multiplied with an amplitude scaling factor β_PUCCH and is sequentially mapped starting from $r_{PUCCH}^{(\tilde{p})}(0)$. An index is mapped to a resource element (RE), that is, (k,l), in order that k increases, mapped in order that l increases, and then mapped in order that a slot number increases. A relation between the k value, the index $\tilde{p}$ and the antenna ports number P is the same as the values used for corresponding PUCCH transmission. A symbol index l value within a slot is the same as Table 23.

Table 23 shows the location of a demodulation-reference signal for each PUCCH format.

TABLE 23

| | Set of values for l | |
|---|---|---|
| PUCCH format | Normal cyclic prefix | Extended cyclic prefix |
| 1, 1a, 1b | 2, 3, 4 | 2, 3 |
| 2, 3 | 1, 5 | 3 |
| 2a, 2b | 1, 5 | N/A |
| 4, 5 | 3 | 2 |

3) A sounding reference signal

A sounding reference signal is determined as follows.

The sounding reference signal $r_{SRS}^{(\tilde{p})}(n) = r_{u,v}^{(\alpha_{\tilde{p}})}(n)$ is generated from the aforementioned reference signal sequence. In this case, u is a sequence-group number, and v is a base sequence number.

Sounding reference signals transmitted by several UEs have different cyclic shift values $\alpha_{\tilde{p}}$ according to Equation 28.

$$\alpha_{\tilde{p}} = 2\pi \frac{n_{SRS}^{cs,\tilde{p}}}{n_{SRS}^{cs,max}}$$ [Equation 28]

$$n_{SRS}^{cs,\tilde{p}} = \left(n_{SRS}^{cs} + \frac{n_{SRS}^{cs,max} \tilde{p}}{N_{ap}}\right) \mod n_{SRS}^{cs,max}$$

$$\tilde{p} \in \{0, 1, \ldots, N_{ap}-1\}$$

In Equation 24, n_SRS^cs={0, 1, . . . , n_SRS^cs,max} is a value set in each UE by a higher layer and set with respect to each periodic sounding by a higher layer parameter "cyclicShift". Each setting of aperiodic sounding is set by "cyclicShift-ap". N_ap is the number of antenna ports used for SRS transmission. If K_TC=2, n_SRS^cs,max=8. If not, n_SRS^cs,max=12. If a parameter K_TC has been set, N_ap is determined by a higher layer parameter "transmissionCombNum". If not, K_TC=2.

A physical mapping method for a sounding reference signal is as follows.

A sounding reference signal sequence is multiplied by an amplitude scaling factor β_PUSCH in order to satisfy transmission power P_SRS and then mapped to a resource element (RE) having an index of (k,l) from $r_{SRS}^{(\tilde{p})}(0)$ with respect to the antenna port P according to Equation 29.

$$a_{K_{TC}k'+k_0^{(p)},l}^{(p)} = \begin{cases} \frac{1}{\sqrt{N_{ap}}} \beta_{SRS} r_{SRS}^{(p)}(k') & k' = 0, 1, \ldots, M_{sc,b}^{RS}-1 \\ 0 & \text{otherwise} \end{cases}$$ [Equation 29]

In Equation 29, N_ap is the number of antenna ports used for the transmission of a sounding reference signal. A relation between the index $\tilde{p}$ and the antenna port P is predefined.

A set of antenna ports used for the transmission of a sounding reference signal is independently determined with respect to each setting of aperiodic sounding and periodic sounding. k_0^(p) indicates the start point of a frequency domain of the sounding reference signal.

M_sc,b^RS is the length of the sounding reference signal sequence, that is, a bandwidth, expressed in a subcarrier unit defined as in Equation 30.

$$M_{sc,b}^{RS} = m_{SRS,b} N_{sc}^{RB}/K_{TC}$$ [Equation 30]

In this case, m_SRS,b is a value signaled by an eNB according to an uplink bandwidth N_RB^UL as shown in Table 24 to Table 27, and b=B_SRS.

In order to obtain m_SRS,b, a cell-specific parameter C_SRS and a UE-specific parameter B_SRS are necessary. C_SRS∈{0, 1, 2, 3, 4, 5, 6, 7} is given by a higher layer cell-specific parameter "srs-BandwidthConfig", and the value of B_SRS∈{0, 1, 2, 3} is given by a higher layer UE-specific parameter "srs-Bandwidth."

In the frequency domain, the start point k_0^(p) is determined as in Equation 31 below.

$$k_0^{(p)} = \bar{k}_0^{(p)} + \sum_{b=0}^{B_{SRS}} K_{TC} M_{sc,b}^{RS} n_b$$ [Equation 31]

In Equation 31, n_b indicates a frequency position index. $\bar{k}_0^{(p)}$ is defined as in Equation 32 in the case of a common uplink subframe.

$$\bar{k}_0^{(p)} = (\lfloor N_{RB}^{UL}/2 \rfloor - m_{SRS,0}/2) N_{sc}^{RB} + k_{TC}^{(p)}$$ [Equation 32]

In Equation 32, the value k_TC^(p)∈{0, 1, . . . , K_TC−1} is defined as in Equation 33.

$$k_{TC}^{(p)} = \begin{cases} 1-\bar{k}_{TC} & \text{if } n_{SRS}^{cs} \in \{4, 5, 6, 7\} \text{ and } \tilde{p} \in \{1, 3\} \text{ and } N_{ap} = 4 \\ \bar{k}_{TC} & \text{otherwise} \end{cases}$$ [Equation 33]

In this case, k_TC^(p)∈{0, 1, . . . , K_TC−1} is determined by a higher layer UE-specific parameter "transmissionComb" in the case of periodic transmission. In the case of aperiodic transmission, the configuration of each transmission is determined by a higher layer UE-specific parameter "transmissionComb-ap."

The frequency hopping of a sounding reference signal is set by a parameter b_hop having a value of 0 to 3 given by a higher layer parameter "srs-HoppingBandwidth."

The frequency hopping is not supported with respect to aperiodic transmission.

If the frequency hopping of a sounding reference signal is disabled (i.e., b_hop≥B_SRS), it has a specific value as Equation 34 unless a frequency position index n_b is reset.

$$n_b = \lfloor 4n_{RRC}/m_{SRS,b} \rfloor \bmod N_b \quad \text{[Equation 34]}$$

In Equation 34, n_RRC is determined with respect to periodic transmission by a higher layer parameter "freqDomainPosition", and each configuration of aperiodic transmission is determined by "freqDomainPosition-ap."

In contrast, if the frequency hopping of a sounding reference signal is enabled (i.e., b_hop<B_SRS), a frequency position index n_b is defined by Equation 35 and Equation 36.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 35]}$$

In Equation 35, N_b is given by Table 24 to Table 27 depending on each uplink frequency bandwidth N_RB^UL.

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \\ \quad \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad \text{[Equation 36]}$$

In Equation 36, N_b_hop is 1 regardless of the N_b value according to Table 13 to Table 16. n_SRS is a parameter for calculating the number of times that a UE-specific sounding reference signal has been transmitted and is determined by Equation 37.

$$n_{SRS} = \begin{cases} 2N_{SP}n_f + 2(N_{SP} - 1)\left\lfloor \frac{n_s}{10} \right\rfloor + \left\lfloor \frac{T_{offset}}{T_{offset\_max}} \right\rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases} \quad \text{[Equation 37]}$$

In Equation 37, T_SRS is the cycle in which a UE-specific sounding reference signal has been transmitted. T_offset is a sounding reference signal subframe offset, and T_offset_max is a maximum value for a specific sounding reference signal subframe offset.

In the case of all of subframes other than a special subframe, a sounding reference signal is transmitted in the last symbol of a subframe.

Table 24 shows the values of m_SRS,b and N_b according to b=0, 1, 2, 3 if an uplink bandwidth is 6≤N_RB^UL≤40.

TABLE 24

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 25 shows the values of m_SRS,b and N_b according to b=0, 1, 2, 3 if an uplink bandwidth is 40<N_RB^UL≤60.

TABLE 25

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 26 shows the values of m_SRS,b and N_b according to b=0, 1, 2, 3 if an uplink bandwidth is 60<N_RB^UL≤80.

TABLE 26

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 27 shows the values of m_SRS,b and N_b according to b=0, 1, 2, 3 if an uplink bandwidth is 80<N_RB^UL≤110.

TABLE 27

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

A subframe configuration for transmitting a sounding reference signal is as follows.

A cell-specific subframe configuration cycle T_SFC and a cell-specific subframe offset Δ_SFC for transmitting a sounding reference signal are shown in Table 28 and Table 29 depending on the type 1 and type 2 of a frame structure.

In this case, an "srs-SubframeConfig" parameter is given by higher layer signaling. Sounding reference signal subframes satisfy $\lfloor n_s/2 \rfloor$ mod $T_{SFC} \in \Delta_{SFC}$. In the case of the type 2 frame structure, a sounding reference signal is transmitted through only a configured uplink subframe or UpPTS.

Table 28 shows the configuration of a sounding reference signal in the type 1 frame structure.

TABLE 28

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 29 shows the configuration of a sounding reference signal in the type 2 frame structure.

TABLE 29

| srs-SubframeConfig | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |

TABLE 29-continued

| srs-SubframeConfig | Binary | Configuration Period $T_{SFC}$ (subframes) | Transmission offset $\Delta_{SFC}$ (subframes) |
|---|---|---|---|
| 13 | 1101 | 10 | {1, 4, 6, 7} |
| 14 | 1110 | reserved | reserved |
| 15 | 1111 | reserved | reserved |

Method of Transmitting Uplink Data in Unlicensed Band

The name of an eNB described in this specification is used as a comprehensive term, including a remote radio head (RRH), an eNB, a transmission point (TP), a reception point (RP) and a relay.

Hereinafter, for convenience of description, a proposed method is described based on the 3GPP LTE/LTE-A system. However, the range of a system to which the proposed method is applied may also be extended to other systems (e.g., UTRA) in addition to the 3GPP LTE/LTE-A system.

As more communication devices require greater communication capacity, the efficient utilization of a limited frequency band in a next wireless communication system becomes a more important requirement.

Accordingly, in a cellular communication system, such as LTE/LTE-A systems, a scheme using an unlicensed band, such as the 2.4 GHz band used in the existing Wi-Fi system, and an unlicensed band, such as the newly highlighted 5 GHz band, in traffic offloading is being reviewed.

Basically, in the unlicensed band, a method of performing wireless transmission and reception through a contention between communication nodes is assumed. Each communication node is required to check that another communication node does not send a signal by performing channel sensing before sending a signal. This is called clear channel assessment (CCA). An eNB or UE of an LTE system may have to perform CCA for signal transmission in the unlicensed band. Furthermore, when an eNB or UE of an LTE/LTE-A system sends a signal, other communication nodes, such as Wi-Fi, should not generate interference by performing CCA. For example, in the Wi-Fi standard (801.11ac), a CCA threshold has been regulated as −62 dBm with respect to a non-Wi-Fi signal and has been regulated as −82 dBm with respect to a Wi-Fi signal. This means that a STA or AP does not send a signal so that it does not generate interference with a signal other than Wi-Fi is received with power of −62 dBm or more, for example. Characteristically, in the Wi-Fi system, a STA or AP performs CCA if a signal of a CCA threshold or more is not detected for 4 μs or more, and may perform signal transmission.

In the present invention, a situation in which signals are transmitted and received through the carrier of an unlicensed band in which the exclusive use of a specific system is not guaranteed is taken into consideration. For example, the present invention may be applied in the situation of FIG. 20.

FIG. 20 is a diagram illustrating a carrier aggregation in an unlicensed band according to an embodiment of the present invention.

As in FIG. 20, an eNB may send a signal to a UE or the UE may send a signal to the eNB in the carrier aggregation situation of a component carrier (CC) (or cell) of a licensed band and the CC (or cell) of an unlicensed band.

Hereinafter, for convenience of description, a licensed band is called an "LTE-A band", and an unlicensed band is called an "LTE-U band" or "U cell" compared to the LTA-A band.

Hereinafter, in the description of an embodiment of the present invention, for convenience of description of the method proposed by the present invention, a situation in which a UE has been configured to perform wireless communication through a CC0 (PCell), that is, one or more component carriers (CCs), in the licensed band and through one or more component carriers in the unlicensed band is assumed.

Hereinafter, in the description of the present invention, for convenience of description, a situation in which wireless communication has been configured to be performed through a CC0 (PCell), that is, one CC, in the licensed band and through at least one CC of three CCs (CC1, CC2, CC3) in the unlicensed band is assumed.

In this case, for example, the carrier of the licensed band may be construed as being a primary component carrier (PCC or PCell), and the carrier of the unlicensed band may be construed as being a secondary component carrier (SCC or SCell).

In this viewpoint, a system taken into consideration in the present invention may be called a license assisted access (LAA) system, for convenience sake. The LAA means a technology for merging the LTE license band and the unlicensed band into one using a carrier aggregation (CA).

However, methods proposed by the present invention are not necessarily limited and applied to the LAA system. The methods proposed by the present invention may be extended and applied to a situation in which a plurality of licensed bands and a plurality of unlicensed bands are used as a carrier aggregation scheme. Furthermore, the methods may be extended and applied to a case where the transmission/reception of signals is performed between an eNB and a UE through only the unlicensed band or a case where a carrier aggregation is performed through only the unlicensed band or a carrier aggregation is performed through only the licensed band and thus the transmission/reception of signals is performed between an eNB and a UE. Furthermore, the proposed methods of the present invention may be extended and applied to systems of other characteristics in addition to the 3GPP LTE system.

Data traffic has suddenly increased with the recent advent of smartphones. Accordingly, in a next wireless communication system, such as 3GPP LTE-A, a scheme of efficiently using a limited frequency band is sought. In this viewpoint, a scheme for using the cellular network, such as the LTE system, in the 2.4 GHz band chiefly used by the Wi-Fi system or the unlicensed band of the 5 GHz band is being reviewed.

Basically, in the unlicensed band, a method of performing wireless transmission and reception through a contention between communication nodes (e.g., a UE and a UE) is assumed. Accordingly, each communication node is required to check that another communication node does not send a signal by performing channel sensing before it sends a signal. For convenience sake, such an operation is called a listen before talk (LBT). Particularly, an operation of checking whether another communication node sends a signal is defined as carrier sensing (CS) or clear channel assessment (CCA). Furthermore, if, as a result of CCA, it is determined that another communication node does not send a signal, it is defined as a channel unoccupied state (or busy state). If, as a result of CCA, there is signal transmission, it is defined as a channel occupied state (or idle state).

An eNB or UE of the LTE system has to perform LBT for signal transmission in the unlicensed band (for convenience sake, called an LTE-U band or a U band or a U cell). When an eNB or UE of the LTE system sends a signal, other communication nodes, such as Wi-Fi, should not generate interference by performing the LBT. For example, in the Wi-Fi standard (e.g., 801.11ac, etc.), a CCA threshold has been regulated as −62 dBm with respect to a non-Wi-Fi signal and has been regulated as −82 dBm with respect to a Wi-Fi signal. This means that a station (STA) or an access point (AP) does not send a signal so that it does not generate interference when a signal other than Wi-Fi is received with power (or energy) of −62 dBm or more, for example.

Hereinafter, a time unit at which a CCA operation for checking whether another communication node sends a signal is called a CCA slot (or CCA time).

As a detailed example of the LBT scheme, the European regulations illustrate two LBT-based channel access operations called frame based equipment (FBE) and load based equipment (LBE).

FIG. 21 illustrates a channel access operation of frame based equipment in a wireless communication system to which the present invention may be applied.

Referring to FIG. 21, the frame based equipment (FBE) configures a channel occupancy time (e.g., 1~10 ms) meaning the time during which a communication node can continue to perform transmission when it succeeded in channel access and an idle time corresponding at least 5% of the channel occupancy time into one frame.

CCA is defined as an operation of monitoring a channel for at least 20 µs in the last part (i.e., CCA slot) of the idle time. That is, a communication node attempting to transmit a signal determines whether there is signal transmission from another communication node by monitoring a channel for a CCA slot.

In this case, the communication node periodically performs CCA in a frame unit. If the channel is the unoccupied state for a CCA slot, the communication node sends data during a channel occupancy time within a next frame. If the channel is the occupied state for a CCA slot, the communication node postpones the transmission of a signal within a next frame and waits until the CCA slot of a next cycle (i.e., a CCA slot within a next frame).

FIG. 22 illustrates a channel access operation of load based equipment in a wireless communication system to which the present invention may be applied.

A communication node first sets a value of q□{4, 5, . . . , 32} and then performs CCA on one CCA slot.

In this case, if a channel is the unoccupied state in a first CCA slot, the communication node may secure the channel occupancy time of a (13/32)q ms length and transmits data. That is, the corresponding communication node may transmit a signal during the channel occupancy time of the (13/32)q ms length from the end time point of the first CCA slot.

In contrast, if the channel is the occupied state in the first CCA slot, the communication node randomly selects a value of N□{1, 2, . . . , q} and stores it as the initial value of a counter. Thereafter, the communication node senses the channel state in a CCA slot unit and reduces the value stored in the counter one by one if the channel is the unoccupied state in a specific CCA slot. Furthermore, when the value of the counter becomes 0, the communication node may send data using the channel occupancy time of the (13/32)q ms length. This may be referred to as an enhanced CCA (ECCA) operation.

In the case of FIG. 22, the communication node senses the channel state for each CCA slot because the channel is the occupied state in the first CCA slot. In this case, assuming that a third CCA slot is the occupied state, if N=4, the corresponding communication node may transmit a signal during the channel occupancy time of the (13/32)q ms length from the end time point of five CCA slots.

In the above description, the occupied or unoccupied state of the channel may be determined by determining whether the received power of a corresponding communication node in a CCA slot exceeds a specific threshold. Such a threshold may be determined according to the regulations of each country (e.g., US, EP, China (CN) and KR.).

As another LBT scheme, a channel access procedure for the LAA may be performed as follows.

After a channel is sensed to be idle during the slot duration T_sl (i.e., CCA slot) of deferred duration T_d and after a counter N becomes 0 in a 4 step to be described later, an eNB/UE may transmit transmission including a PDSCH/PUSCH on a channel on which LAA Scell(s) transmission is performed. The counter N is adjusted by channel sensing for additional slot duration(s) T_sl according to the following step.

1 step) N is set as an N_init. In this case, the N_init indicates a specific number equally distributed between 0 and CW_p. Furthermore, the 4 step performed.

2 step) when N is greater than 0, N is set to N−1.

3 step) a channel is sensed for additional slot duration T_sl. If the additional slot duration T_sl is idle, the 4 step is performed. If not, a 5 step is performed.

4 step) if N=0, the procedure is stopped. If not, a Case 2 step is performed.

5 step) the channel is sensed for the slot duration of the additional deferred duration T_d.

6 step) if the channel is sensed to be idle For the slot duration of the additional deferred duration T_d, the 2 step is performed. If not, the 5 step is performed.

If an eNB/UE has not transmitted transmission including a PDSCH/PUSCH on a channel in which LAA Scell(s) transmission(s) is performed, the eNB/UE senses that a channel is at least idle within the slot duration T_sl of additional deferred duration T_d and may transmit transmission including a PDSCH/PUSCH on the corresponding channel.

The deferred duration T_d may include T_f (16 µs≤T_f≤16 µs+T_s) and m_p contiguous slot durations that follows the T_f. In this case, each slot duration T_sl is 9 µs≤T_f≤9 µs+T_s, and T_f may include idle slot duration T_sl at the start time point of the T_f.

The eNB/UE senses the channel for the slot duration T_sl. If power detected by the eNB/UE for at least 4 µs within the slot duration T_sl is smaller than a threshold X_Thresh, the corresponding slot duration T_sl may be considered to be idle. If not, the corresponding slot duration T_sl may be considered to be occupied (busy).

CW_p is CW_min,p≤CW_p≤CW_max,p and means a contention window. In this case, CW_min,p, CW_max,p and mp may be selected by the eNB/UE prior to the 1 step.

In the aforementioned LAA environment, in a communication environment in which a "channel unoccupied" state has to be checked by the CCA operation and a signal has to be transmitted for the uplink (UL) signal transmission of a UE, if UL transmission is scheduled in a specific resource position along with a different UE (i.e., in the case of uplink multi-user MIMO), a transmission signal from a co-scheduled UE may have to be cancelled from a power (or energy) detection process for CCA.

If not, it is difficult to maximize frequency reuse (FR). There is a problem in that UL MU-MIMO transmission is not performed as desired (i.e., scheduled) by an eNB because a co-scheduled UE signal is not detected in an UL MU-MIMO situation and determined to be a "channel occupied" state.

The present invention proposes a method in which a UE operating in the unlicensed band performs uplink transmission more effectively by cancelling a signal transmitted by a co-scheduled candidate UE for UL MU-MIMO transmission and detecting power (or energy) for CCA with respect to the remaining signals.

Hereinafter, in this specification, a signal transmitted prior to UL data transmission for each co-scheduled candidate UE for UL MU-MIMO transmission is called a "reservation signal" (or initial signal).

Embodiment 1

FIG. 23 is a diagram illustrating a method of transmitting uplink data in the unlicensed band according to an embodiment of the present invention.

Referring to FIG. 23, a UE receives uplink scheduling information (i.e., downlink control information) within a cell operating in the unlicensed band from an eNB (S2301).

In this case, the uplink scheduling information may be referred to as uplink resource allocation information or an uplink grant, and may be included in an UL-related DCI format (e.g., the DCI format 0, 4, etc.) and transmitted to the UE.

Furthermore, in the LAA denoting a carrier aggregation of a cell (S cell) operating in the unlicensed band and a cell (P cell) operating in the licensed band, the uplink scheduling information may be transmitted from the cell operating in the licensed band.

The UE senses (or listens to) the channel of the cell operating in the unlicensed band (S2302).

That is, the UE may sense (or listen to) the channel in a specific period unit (hereinafter referred to as a "CCA slot") in order to determine whether the channel of the corresponding cell is the occupied state (busy/occupied) or the idle state (idle/unoccupied/free).

As described above, an operation of sensing (or listening to) the channel of a corresponding cell is referred to as "CCA or CCA operation." An operation of determining whether a channel is the occupied state or the idle state may be referred to as a "CCA determination." In this case, a UE may determine the state of the channel by applying the aforementioned channel access operation (e.g., the channel access operation in the FBE, LBE or LAA environment).

The UE may sense (or listen to) the channel for CCA slot duration. If energy (or power) detected by the UE is smaller than a predetermined threshold, the UE may determine the corresponding CCA slot duration to be the unoccupied state.

In this case, for UL MU-MIMO transmission, the UE may detect energy (or power) of the remaining signals by cancelling a reservation signal transmitted by a co-scheduled candidate UE, and may compare the detected energy (or power) with a predetermined threshold.

If the channel is sensed to be the idle state, the UE transmits a reservation signal (S2303).

In this case, the UE may repeatedly transmit the reservation signal in a specific period unit before a time resource indicated by the uplink scheduling information received at step S2301 from the time when the channel is sensed to be the unoccupied state.

The reservation signal is described in more detail later.

The UE transmits uplink data to the eNB in radio resources assigned by the uplink scheduling information (S2304).

A method for transmitting uplink data in the unlicensed band is described in more detail below.

Embodiment 2

In an embodiment of the present invention, when an eNB transmits uplink resource allocation (i.e., uplink scheduling information or an uplink grant) through downlink control information (DCI) (e.g., UL-related DCI, the DCI format 0 or 4 or a new DCI format), the eNB may transmit information for specifying a CCA operation for the uplink transmission of a UE.

This is called "CCA indication information", for convenience of description.

That is, when the UE receives the DCI (i.e., uplink scheduling information or an UL grant) transmitted on a PDCCH, it may perform the CCA operation specified by CCA indication information included in the UL grant.

If, as a result of the execution of the CCA, the channel unoccupied state (or free/idle state) is determined, the UE may transmit UL data in an UL frequency-time resource indicated in the UL grant.

In this case, the CCA indication information may indicate whether the UL transmission of the UE scheduled by the eNB is single-user (SU) UL transmission or multi-user (MU) UL transmission. That is, the CCA indication information may be a delimiter for delimiting SU UL transmission or MU UL transmission.

In this case, if the CCA indication information indicates MU UL transmission, the corresponding UE may cancel a reservation signal transmitted by a co-scheduled UE from a power (or energy) detection process for CCA.

Furthermore, a specific N-bit field (i.e., an N-bit DCI field) for specifying the CCA operation of the UE may be defined in the DCI as the CCA indication information.

When a CCA operation for the UL transmission of the UE is performed based on a field description dynamically indicated in this field (i.e., the CCA indication information), a signal from a specific UE(s) may be cancelled from a power (or energy) detection process for CCA.

Hereinafter, for convenience of description, it is assumed that the N-bit field (i.e., the CCA indication information) for indicating the CCA operation of the UE defined in the DCI is 2 bits (i.e., N=2), but the present invention is not limited thereto. The field for indicating a CCA operation may have a specific number of bits.

When each of states (e.g., 00, 01, 10 and 11 in the case of 2 bits) indicated in the CCA indication information is dynamically indicated, the eNB may previously provide the UE with a description regarding an operation for enabling the state to be applied by the UE through higher layer signaling (e.g., RRC signaling).

Hereinafter, for convenience of description, a description of a CCA operation for enabling a state indicated in CCA indication information to be applied by a UE is called "CCA configuration information" or an "RRC parameter set." The CCA configuration information may be defined or configured for each state indicated in the CCA indication information.

The CCA configuration information (RRC parameter set) may include information, such as a parameter, format and/or form regarding a reservation signal that needs to be cancelled for a CCA determination by a UE and that is transmitted by a co-scheduled candidate UE for the purpose of UL MU-MIMO transmission.

That is, the CCA configuration information (RRC parameter set) is provided to the UE in advance for each state indicated in the CCA indication information.

In this case, in the CCA indication information a default state (e.g., "00") may be defined or configured to be not associated with the RRC parameter set in the UE. That is, when the default state is dynamically indicated for the UE (i.e., by DCI), the UE may perform common CCA. For example, such a case may correspond to a case where an eNB has scheduled a corresponding UE only and the SU-MIMO transmission of the corresponding UE may be construed as being scheduled.

A separate RRC parameter set may be configured with respect to each of the remaining states (or all of the states indicated by the CCA indication information) other than the default state.

In this case, information that may be configured for each RRC parameter set includes specific parameter information (or identification information) by which a specific (UL) signal (to be transmitted for the purpose of a channel reservation prior to UL data transmission) of a corresponding UE can be identified for each co-scheduled candidate UE. More specifically, the information may include at least one of the following information.

Information indicative of the type of a reservation signal (i.e., waveform) transmitted by a co-scheduled candidate UE For example, a DM-RS (e.g., a (PUSCH/PUCCH) DM-RS or (PUSCH/PUCCH) DMRS modified signal) used to demodulate UL data, a reference signal (e.g., a sounding reference signal (SRS) or an SRS modified signal) used to measure an UL channel state, a signal related to a random access channel (RACH) (e.g., an RACH preamble or a modified signal of the RACH preamble), a synchronization signal (i.e., a primary synchronization signal (PSS) and/or a secondary synchronization signal (SSS) or a modified signal (e.g., a sidelink synchronization signal (SLSS), that is, a primary sidelink synchronization signal (PSSS) and/or a secondary sidelink synchronization signal (SSSS) of the synchronization signal, or other specific known signals defined in advance.

Accordingly, the information indicative of the type of signal used as the reservation signal may be included in each RRC parameter set and transmitted to the UE.

Alternatively, in order to simplify the operation of a UE, the type (e.g., SRS, etc.) of reservation signal may be simplified (e.g., in a cell-specific manner) and fixedly defined or may be configured in the UE. In this case, information indicative of the type of signal used as the reservation signal may not be included in the RRC parameter set.

A sequence seed value (e.g., an initialization value) for generating a reservation signal transmitted by a co-scheduled candidate UE For example, in the case of a (PUSCH-) DMRS, one of 0~503 may be set as a seed value (e.g., a virtual cell identity (VOID)) for generating a corresponding sequence or one of 0~509, that is, the range of an enhanced value of a PUSCH DMRS, may be configured. Accordingly, the sequence seed value for generating the reservation signal may be included in each RRC parameter set and transmitted to the UE.

The VOID value may be a VOID (or one of them) set in a corresponding co-scheduled candidate UE by higher layer signaling (e.g., RRC signaling) for the UE's PUSCH DMRS transmission (or may be restricted as described above).

For example, in the case of an SRS, a seed value (VOID) for generating the corresponding SRS may be a separate VCID not the physical cell identity (PCID) of a cell to which a corresponding co-scheduled candidate UE has been connected. In this case, the VCID for the SRS may be limited to the generation of the sequence of a reservation signal transmitted prior to UL data transmission for a "channel reservation" purpose as in the present invention. That is, an SRS may be generated from a PCID as in the current operation if a UE attempts to perform common SRS transmission not a channel reservation purpose.

In the above cases, it is preferred that the signal waveform of the corresponding reservation signal in the time domain has a repetition pattern in a specific CCA slot duration unit (e.g., 20 µs). Accordingly, a sequence of a form in which 0 is inserted (or substituted with 0) at specific intervals may be defined or configured in the UE as the sequence of the reservation signal. That is, in the frequency domain, the value 0 may be mapped at a specific subcarrier interval.

And/or, in the case of a sequence transmitted for the purpose of a reservation signal, all of operations of hopping a corresponding waveform over time, such as "slot hopping" (i.e., frequency hopping in a slot unit), may be defined or configured in a UE so that they are disabled. Accordingly, there is an advantage in that another UE can detect a reservation signal more effectively because the corresponding waveform is repeatedly transmitted right before actual UL data transmission.

And/or, in the case of a sequence transmitted for the purpose of a reservation signal, after inverse fast Fourier transform (IFFT), etc. is performed on the time axis (or the time domain), unlike in a case where a cyclic prefix (CP) is inserted in a conventional OFDM or SC-FDMA method, a CP is not inserted and a corresponding waveform may be defined or configured in a UE so that it continues to be transmitted right before UL data transmission.

Right before UL transmission is initiated by an UL grant through the aforementioned definitions/configurations, the UE may continuously transmit the reservation signal from the time when the UE checks channel non-occupancy (or channel idle) (i.e., after a CCA slot in which channel non-occupancy is checked).

Co-scheduled UEs may perform a correlation between known sequences through identification information checked through a specific RRC parameter set indicated by the aforementioned CCA indication information with respect to such a contiguous waveform (i.e., the reservation signal). By performing a correlation, etc. as described above, a UE may detect a corresponding reservation signal and cancel the detected reservation signal from a power (or energy) detection process for CCA.

In the aforementioned operation, the "CCA slot" length (e.g., 60 µs) may be defined to be longer than a CCA slot length (e.g., 20 µs) (by several multiples) when common UL transmission is performed (e.g., in the case of SU-MIMO transmission).

A CCA determination is a determination according to energy detection, and thus a common CCA slot length (e.g., in the case of SU-MIMO transmission) may be configured to be relatively short (e.g., 20 µs).

In contrast, in the case of an UL MU-MIMO operation, as in the aforementioned methods in addition to energy detection when a CCA determination is performed, an operation of detecting a specific reservation signal transmitted by a specific UE (i.e., a co-scheduled candidate UE) and cancelling the detected reservation signal from a power (or energy) detection process for CCA need to be performed. Accordingly, to this end, as described above, a series of methods for producing a repetition pattern on a waveform, such as that a CP is not attached, may also be applied. If a method, such as zero insertion, is not applied in order to generate the repetition pattern of a waveform, the length of the repetition pattern may become relatively long. Accordingly, the length of the CCA slot may be defined or configured to the UE so that it is relatively longer than that of a CCA slot when common UL transmission is performed (e.g., in the case of SU-MIMO transmission). As a result, the UE may differently apply a CCA slot length depending on SU transmission or MU transmission.

In this case, whether transmission is SU transmission or MU transmission may be determined by the aforementioned CCA indication information (i.e., the delimiter of SU transmission or MU transmission or the N-bit DCI field) within the DCI. For example, if the "00" state is indicated on the N-bit DCI field, it may indicate SU transmission. If the remaining states are indicated on the N-bit DCI field, it may indicate MU transmission. Accordingly, a CCA slot length may be differently defined or configured to the UE. Alternatively, a different CCA slot length may be defined or configured to the UE for each state that may be indicated on the N-bit DCI field.

In this case, which CCA slot length is applied may be explicitly defined by an RRC parameter set or may be configured to the UE depending on each transmission method (i.e., whether transmission is SU transmission or MU transmission) or for each state (i.e., each state that may be indicated on the N-bit DCI field). Alternatively, a CCA slot length may be previously fixed and defined depending on each transmission method (i.e., whether transmission is SU transmission or MU transmission) or for each state (i.e., each state that may be indicated on the N-bit DCI field). In this case, the CCA slot length may be implicitly configured to the UE based on the CCA indication information within the DCI.

An operation of the UE according to the aforementioned present embodiment is described below.

First, it is assumed that a UE, that is, a target of UL MU-MIMO scheduling, receives an UL grant in an #n subframe (SF) and starts UL transmission in an #n+k SF if it performs MU-MIMO transmission in response to the corresponding UL grant.

In this case, the UE may perform CCA prior to the point of time of the #n+k SF after receiving the UL grant.

Furthermore, the UE may continue to transmit the aforementioned "reservation signal" from the point of time (from the CCA slot) at which the "channel unoccupied (channel unoccupied/free/idle)" state was checked.

In this case, a reservation signal (e.g., the form, etc. of the reservation signal) transmitted by the UE may be defined or configured through separate higher layer signaling (e.g., RRC signaling). That is, the UE may receive reservation signal configuration information, including a parameter, format and/or form transmitted by an eNB and related to the reservation signal transmitted by the UE. For example, the waveform form of the reservation signal may be defined or configured by higher layer signaling.

For example, the time-domain waveform may be defined to be generated in a form, such as "comb=4 (e.g., a higher layer parameter 'transmissionCombNum' or 'transmission-Comb-ap'), a specific VOID value, no CP" of an SRS.

Thereafter, the UE may initiate UL data transmission when the UL transmission point of time (#n+k) is reached while continuing to transmit the reservation signal.

In this case, when the #n+k point of time (subframe) is reached although the repetition pattern of the waveform (i.e., the reservation signal) has not been ended right before the n+k point of time (subframe), the UE may cease the transmission of the last waveform and immediately initiate the UL transmission.

As another method, at a point of time when the UE checks the channel unoccupied state, the UE may calculate the remaining time before a point of time at which the UL transmission will be actually initiated at the #n+k point of time (subframe) so that the repetition pattern of the waveform is terminated right before the #n+k point of time (subframe), and may transmit the reservation signal based on such calculation. That is, the repetition pattern of the waveform is backward aligned in line with the #n+k point of time (subframe).

Furthermore, as described above, the UE performs CCA in order to check the channel unoccupied right before the operation of transmitting the reservation signal is initiated. In this case, as described above, the UE may attempt to detect a known signal (s) (for channel reservation) generated through corresponding identification information based on RRC parameter set information regarding a co-scheduled candidate UE that is dynamically indicated in the CCA indication information (e.g., the SU-MIMO/MU-MIMO delimiter or the N-bit field of DCI). That is, the UE may attempt to detect a reservation signal(s) specified in the RRC parameter set for a state indicated by the CCA indication information. Furthermore, the UE may perform a CCA determination by cancelling all of successfully detected known signals from a power (or energy) detection process for CCA.

That is, pieces of ID information within the specific RRC parameter set may include pieces of listed ID information regarding a plurality of co-scheduled candidate UEs. The UE may perform a CCA determination after removing all of signals successfully detected in the pieces of information.

The aforementioned present embodiment is described below with reference to the drawing.

FIG. 24 is a diagram illustrating a method of transmitting uplink data in the unlicensed band according to an embodiment of the present invention.

Referring to FIG. 24, a UE receives CCA configuration information from an eNB (S2401).

As described above, the CCA configuration information (RRC parameter set) means information about a CCA operation that is applied by the UE. The CCA configuration information (RRC parameter set) may be provided to the UE for each state indicated in the CCA indication information.

In this case, the CCA configuration information may include information (e.g., information, such as a parameter, format and/or form regarding a reservation signal) for identifying a reservation signal that is transmitted by a co-scheduled candidate UE for UL MU-MIMO transmission and that needs to be cancelled by the UE for a CCA determination.

For example, the CCA configuration information (RRC parameter set) may include information indicative of the type of reservation signal (i.e., waveform) transmitted by a co-scheduled candidate UE and/or a sequence seed value (e.g., an initialization value) for generating a reservation signal transmitted by a co-scheduled candidate UE.

In this case, the CCA configuration information may be provided to the UE as system information in a cell-specific manner or may be provided to the UE as an RRC message if CA including a cell belonging to the unlicensed band has been configured in a corresponding UE in a UE-specific manner.

The UE receives uplink scheduling information (i.e., downlink control information) within a cell operating in the unlicensed band from the eNB (S2402).

The uplink scheduling information may include CCA indication information. The CCA indication information may indicate a default state that belongs to a plurality of predefined states and that is applied to the UE, and may specify a CCA operation that needs to be applied by the UE based on CCA configuration information corresponding to a state indicated in the CCA indication information.

For example, as described above, if the state is defined as SU UL transmission and MU UL transmission, the CCA indication information may correspond to a delimiter for distinguishing SU UL transmission or MU UL transmission.

For another example, as described above, the CCA indication information may be configured as an N-bit field within DCI and may indicate a state (i.e., CCA configuration information according to a corresponding state) that belongs to predefined M states and that is applied to the UE.

In this case, the uplink scheduling information may be referred to as uplink resource allocation information or an uplink grant, and may be included in an UL-related DCI format (e.g., the DCI format 0, 4, etc.) and transmitted to the UE.

Furthermore, in the LAA denoting a carrier aggregation of a cell (S cell) operating in the unlicensed band and a cell (P cell) operating in the licensed band, uplink scheduling information may be transmitted in the cell operating in the licensed band.

The UE senses (or listens to) the channel of a cell operating in the unlicensed band (S2403).

The UE may sense (or listen to) the channel in a specific period unit (hereinafter referred to as a "CCA slot") in order to determine whether the channel of the corresponding cell is the occupied state (busy/occupied) or the unoccupied state (idle/unoccupied/free).

In this case, the UE may determine the state of the channel by applying the aforementioned channel access operation (e.g., a channel access operation in the FBE, LBE or LAA environment).

The UE may sense (or listen to) the channel for CCA slot duration, and may determine the corresponding CCA slot duration to be the unoccupied state if energy (or power) detected by the UE is smaller than a predetermined threshold.

In this case, the UE may detect energy (or power) of the remaining signals by cancelling a reservation signal transmitted by a co-scheduled candidate UE for UL MU-MIMO transmission, and may compare the detected energy (or power) with the predetermined threshold.

That is, the UE may identify a reservation signal transmitted by a different UE using CCA configuration information according to a state indicated by the CCA indication information received at step S2402, and may cancel the identified reservation signal when performing CCA determination. That is, the UE may cancel reservation signals transmitted by different UEs by performing a correlation using information known by the CCA configuration information.

If the channel is sensed to be the idle state, the UE transmits a reservation signal (S2404).

As described above, the UE may receive configuration information for a transmitted reservation signal through higher layer signaling (e.g., RRC signaling), and may transmit a reservation signal generated based on the received configuration information. In this case, the configuration information for the reservation signal transmitted by the UE may be transmitted along with the CCA configuration information.

In this case, the UE may repeatedly transmit the reservation signal in a specific period before a time resource indicated by the uplink scheduling information received at step S2402 after the channel is sensed to be the unoccupied state.

The UE transmits uplink data to the eNB in radio resources indicated in the uplink scheduling information (S2405).

Embodiment 3

In another embodiment of the present invention, unlike in the dynamic indication method through the SU-MIMO/MU-MIMO delimiter or the N-bit field of DCI in the previous embodiment, pieces of ID information intended to be provided in the aforementioned CCA configuration information (RRC parameter set) may be provided through higher layer signaling (e.g., RRC signaling or MAC control element (CE) signaling).

That is, the present invention may be modified into a form in which information is provided relatively through semi-static indication instead of dynamic indication for various co-scheduled candidate UE combinations.

In other words, in the aforementioned embodiment, a reservation signal whose detection of power (or energy) is cancelled when UE performs CCA may be dynamically configured depending on a state indicated by CCA indication information. In the present embodiment, however, a reservation signal whose detection of power (or energy) is cancelled when UE performs CCA may be semi-statically configured by higher layer signaling.

The characteristics applied in the embodiment 2 may be identically applied to the present embodiment although they are not described in detail herein except that dynamically indicated for a UE based on CCA indication information in the embodiment 2.

Alternatively, as described above, in the state in which pieces of identity information provided by the aforementioned RRC parameter set has been configured through higher layer signaling (e.g., RRC signaling or MAC CE signaling), only whether an operation of determining CCA by cancelling a specific reservation signal (for UL MU-MIMO scheduling) will be enabled may be dynamically indicated through explicit DCI signaling (e.g., a 1 bit).

Alternatively, whether an operation of determining CCA by cancelling a specific reservation signal will be enabled may be indicated in an implicit indication form.

For example, an implicit indication method, such as depending on a DCI format including an UL grant (e.g., a CCA operation is enabled only in the case of the DCI format 4), depending on a common search space (CSS)/UE search space (USS) (e.g., a CCA operation is enabled only when DCI is transmitted through a USS), depending on a subframe type (e.g., a CCA operation is enabled only when DCI is transmitted in a non-MBMS single frequency network (MB-SFN) subframe (or a specific subframe set)) or depending on a control channel (e.g., a CCA operation is enabled only when an UL grant is transmitted in an EPDCCH), may be used. Furthermore, when at least one of the aforementioned methods is applied, a CCA operation maybe defined to be enabled or may be configured to be enabled in a UE.

Furthermore, whether an operation itself of interpreting such implicit indication will be applied may be indicated through separate higher layer signaling (e.g., RRC signaling). That is, information indicating whether a UE has to determine whether a CCA operation is enabled based on the implicit indication may be provided to the UE through higher layer signaling. Alternatively, in order for a UE to determine whether a CCA operation is enabled based on the aforementioned implicit indication, mapping information between the implicit indication and whether a CCA operation is enabled based on the implicit indication may be provided to the UE through higher layer signaling.

Alternatively, when information related to an RRC parameter set is provided to the UE through the aforementioned higher layer signaling (e.g., RRC or MAC CE), the above operation may be applied. That is, the UE may determine whether a CCA operation is enabled based on the implicit indication from the time when the RRC parameter set is received through high layer signaling. Accordingly, control signaling (higher layer signaling, etc.) for releasing the operation of enabling the UE to determine whether a CCA operation is enabled based on the implicit indication may be defined and provided to the UE. The UE may not determine whether a CCA operation is enabled according to the implicit indication when the release signaling is received.

As described above, even in the present embodiment, in order for the signal waveform of a corresponding reservation signal in the time domain to have a repetition pattern in a specific CCA slot duration unit (e.g., 20 μs), a sequence of a form in which zero is inserted (or substituted with 0) at specific intervals may be defined or configured in a UE as a sequence of a reservation signal.

And/or, in the case of a sequence transmitted for the purpose of a reservation signal, all of operations of hopping a corresponding waveform over time, such as "slot hopping" (i.e., frequency hopping in a slot unit), may be defined or configured to a UE so that they are disabled.

And/or, in the case of a sequence transmitted for the purpose of a reservation signal, a CP is not inserted and a corresponding waveform may be defined or configured to a UE so that it continues to be transmitted right before UL data transmission.

Furthermore, a "CCA slot" length (e.g., 60 μs) may be defined to be longer than a CCA slot length (e.g., 20 μs) (by several multiples) when common UL transmission is performed (e.g., in the case of SU-MIMO transmission).

The aforementioned present embodiment is described below with reference to the drawing.

FIG. 25 is a diagram illustrating a method of transmitting uplink data in the unlicensed band according to an embodiment of the present invention.

Referring to FIG. 25, a UE receives CCA configuration information from an eNB (S2501).

As described above, the CCA configuration information (an RRC parameter set) means information about a CCA operation to be applied by the UE. In FIG. 24, however, the CCA configuration information (RRC parameter set) may be provided to the UE for each state indicated in the CCA indication information. In the case of FIG. 25, only the single piece of CCA configuration information (RRC parameter set) may be provided to the UE.

In this case, the CCA configuration information may include information (e.g., information, such as a parameter, format and/or form regarding a reservation signal) for identifying a reservation signal that is transmitted by a co-scheduled candidate UE for UL MU-MIMO transmission and that should be cancelled by the UE for a CCA determination.

For example, the CCA configuration information (RRC parameter set) may include information indicative of the type (i.e., waveform) of a reservation signal transmitted by a co-scheduled candidate UE and/or a sequence seed value (e.g., an initialization value) for generating a reservation signal transmitted by a co-scheduled candidate UE.

In this case, the CCA configuration information may be provided to the UE as system information in a cell-specific manner or may be provided to the UE through an RRC message if a CA including a cell belonging to the unlicensed band may be provided to a corresponding UE in a UE-specific manner.

The UE receives uplink scheduling information (i.e., downlink control information) within a cell operating in the unlicensed band from the eNB (S2502).

In this case, as described above, the uplink scheduling information may indicate whether an operation of determining CCA is enabled explicitly or implicitly by cancelling a specific reservation signal for UL MU-MIMO transmission.

In this case, the uplink scheduling information may be referred to as uplink resource allocation information or an uplink grant, and may be included in an UL-related DCI format (e.g., the DCI format 0, 4, etc.) and transmitted to the UE.

Furthermore, in the LAA denoting a carrier aggregation of a cell (S cell) operating in the unlicensed band and a cell (P cell) operating in the licensed band, the uplink scheduling information may be transmitted to the cell operating in the licensed band.

The UE senses (or listens to) the channel of the cell operating in the unlicensed band (S2503).

That is, the UE may sense (or listen to) the channel in a specific period unit (hereinafter referred to as a "CCA slot") in order to determine whether the channel of the corresponding cell is the occupied state (busy/occupied) or the idle state (idle/unoccupied/free).

In this case, the UE may determine the state of the channel by applying the aforementioned channel access operation (e.g., a channel access operation in the FBE, LBE or LAA environment).

The UE may sense (or listen to) the channel for CCA slot duration and determine the corresponding CCA slot duration to be the unoccupied state if energy (or power) detected by the UE is smaller than a predetermined threshold.

In this case, the UE may detect energy (or power) of the remaining signals other than a reservation signal transmitted by a co-scheduled candidate UE for UL MU-MIMO transmission, and may compare the detected energy (or power) with the predetermined threshold.

That is, the UE may identify a reservation signal transmitted by a different UE using the CCA configuration information received at step S2501, and may cancel the identified reservation signal when performing a CCA determination. That is, the UE may cancel reservation signal transmitted by different UEs by performing a correlation using information known by the CCA configuration information.

If the channel is sensed to be the idle state, the UE transmits a reservation signal (S2504).

As described above, the UE may receive configuration information for a transmitted reservation signal through higher layer signaling (e.g., RRC signaling), and may transmit the generated reservation signal based on the received configuration information. In this case, the configuration information for the reservation signal transmitted by the UE may be transmitted along with the CCA configuration information.

In this case, the UE may repeatedly transmit the reservation signal in a specific period unit before a time resource indicated by the uplink scheduling information received at step S2502 after the channel is sensed to be the unoccupied state.

The UE transmits uplink data to the eNB in radio resources indicated in the uplink scheduling information (S2505).

Embodiment 4

In yet another embodiment of the present invention, a reservation signal set may be previously defined or configured in a UE as a plurality of orthogonal sequences (e.g., in short duration in a time domain). Furthermore, a reservation signal set that should be cancelled by a UE in a CCA determination may be determined depending on a reservation (initial) signal given to the UE within the reservation signal set.

A relation between the initial (reservation) signal of a UE and a signal that should be cancelled in a CCA determination may be previously defined or may be configured to a UE by higher layer signaling (e.g., RRC signaling).

In the case of the former, the remaining (some or all of) reservation signals by cancelling a reservation signal transmitted by a UE may be determined to be signals that should be cancelled in a CCA determination within a previously defined or configured reservation signal set.

More specifically, for example, each of sequences (i.e., reservation signals) that form a reservation signal set may be mapped (e.g., 1:1 mapping) to a reference signal (e.g., a PUSCH DMRS/PUCCH DMRS/SRS) transmitted by a UE. In this case, the UE may transmit a reservation signal mapped to a reference signal transmitted by the UE, and may cancel the remaining reservation signals within the reservation signal set when performing a CCA determination.

In this case, the reservation (initial) signal to be used by the UE may be determined in association with a predetermined rule based on a PUSCH DM-RS and/or OCC assignment to be transmitted by the corresponding UE.

For example, a PUSCH DMRS sequence transmitted by a corresponding UE may be determined based on a PUSCH DMRS parameter received from an UL grant. The UE may transmit a DMRS sequence mapped to the PUSCH DMRS sequence as its own reservation signal, may recognize that the remaining DMRS sequences may be potentially used by different UEs, and may cancel a corresponding DMRS sequence in CCA when the corresponding DMRS sequence is detected.

Hereinafter, in the present embodiment, it is assumed that a PUSCH DMRS is continuously transmitted as the aforementioned reservation signal for convenience of description.

For example, as in Table 30, a combination set of the present (the rank 4 of SU-MIMO) cyclic shifts (CSs)/orthogonal code (OCC) (i.e., orthogonal sequence) or some of the table or a similar modified table may be fixedly, defined and used as a specific "predefined DMRS sequence set" (i.e., reservation signal set).

TABLE 30

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

A DMRS set, such as Table 30, is previously defined, and a UE operation when the DMRS set is used is described below.

For example, it is assumed that a UE1 receives an UL grant and thus a "001" state has been dynamically indicated in the UE1 through a cyclic shift field.

The corresponding UE1 may apply its own PUSCH DMRS by a corresponding rank. That is, a PUSCH DMRS sequence may be generated by applying a cyclic shift value (i.e., $n_{DMRS,\lambda}^{(2)}$) corresponding to each layer index λ corresponding to the rank. For example, if the rank of the UE1 is 3, the PUSCH DMRS sequence may be generated by applying the value $n_{DMRS,\lambda}^{(2)}$ when λ=0, λ=1, and λ=2 in Table 30.

In contrast, a sequence for transmitting the aforementioned reservation signal may be defined to transmit a sequence corresponding to a specific predetermined column (i.e., a specific layer index λ, for example, fixed and defined to be λ=0) or may be configured to a UE so that the sequence corresponding to the specific predetermined column is transmitted. That is, the DMRS sequence may be generated by applying the value $n_{DMRS,\lambda}^{(2)}$ corresponding to the predetermined λ, and may be transmitted as a reservation signal. For example, if the "001" state is indicated through an UL grant, a UE may transmit a DMRS sequence, generated using $n_{DMRS,\lambda}^{(2)}$=6 corresponding to the predefined λ=0, as a reservation signal.

In this case, prior to the transmission of the corresponding reservation signal, the UE needs to perform a CCA determination. In this case, the UE may attempt to detect all of DMRS sequences generated with cyclic shift values (e.g., correspond to) $n_{DMRS,\lambda}^{(2)}$=0, 9 and 3 in the above example) corresponding to the remaining indices λ other than the DMRS sequence (e.g., corresponding to $n_{DMRS,\lambda}^{(2)}$=6 in the above example) transmitted as its own reservation signal in the default state (e.g., "001" in the above example) indicated in the corresponding UE. Furthermore, if all of the DMRS sequences are detected, a CCA operation may be defined or configured to the UE so that all of the DMRS sequences are cancelled when a CCA determination is performed.

That is, in order to generate the reservation signal as described above, the DMRS sequence generated by applying the cyclic shift values corresponding to the remaining indices λ other than the predetermined layer index λ may correspond to a DMRS sequence that should be cancelled when a CCA determination is performed.

The operation is characterized in that the candidates of reservation signals of different UEs that should be cancelled when a CCA determination is performed may be defined to be a smaller number in the case of a UE for which a specific dynamically indicated state has been indicated through an UL grant with respect to the specific dynamically indicated state (e.g., corresponding to the "011", "100", "101" or "110" state of a cyclic shift field).)

For example, if the state "011" has been indicated, $n_{DMRS,\lambda}^{(2)}$=4 if a specific layer index λ=0 for transmitting a reservation signal. In this case, only a DMRS sequence generated as $n_{DMRS,\lambda}^{(2)}$=10 may correspond to a DMRS sequence that should be checked by a corresponding UE as a candidate of the reservation signal of a different UE. The reason for this is that a case where $n_{DMRS,\lambda}^{(2)}$=7, 1 corresponding to λ=2, 3 is indicated as the value $n_{DMRS,\lambda}^{(2)}$ when λ=0 in another state is not present in the above table. In other words, regardless of a UE in which any state has been indicated, a DMRS sequence generated by applying the value $n_{DMRS,\lambda}^{(2)}$ when a predetermined specific λ=0 is transmitted as a reservation signal. Accordingly, a DMRS sequence generated by applying the value(s) $n_{DMRS,\lambda}^{(2)}$ not included in the value $n_{DMRS,\lambda}^{(2)}$, when the predetermined specific λ=0, may be considered to be not transmitted as the reservation signal.

As described above, even in the present embodiment, in order for the signal waveform of a corresponding reservation signal in the time domain to have a repetition pattern in a specific CCA slot duration unit (e.g., 20 µs), a sequence of a form in which 0 is inserted (zero insertion) (or substituted with 0) at specific intervals may be defined or configured in a UE as the sequence of a reservation signal.

And/or, in the case of a sequence transmitted for the purpose of a reservation signal, all of operations of hopping a corresponding waveform over time, such as "slot hopping" (i.e., frequency hopping in a slot unit) may be defined or configured in a UE so that they are disabled.

And/or, in the case of a sequence transmitted for the purpose of a reservation signal, a CP is not inserted and a corresponding waveform may be defined or configured to a UE so that the UE continues to transmit right before UL data transmission.

Furthermore, a "CCA slot" length (e.g., 60 µs) may be defined to be longer than a CCA slot length (e.g., 20 µs) (by several multiples) when common UL transmission is performed (e.g., in the case of SU-MIMO transmission).

Meanwhile, in the aforementioned present embodiment, an example in which a PUSCH DMRS sequence is used in the form of a reservation signal has been assumed and described, for convenience of description, but the present invention is not limited thereto. That is, it is evident that the present embodiment may be extended to a case where an SRS (or a different signal or a reference signal) is used in the form of a reservation signal by properly applying all of the aforementioned contents in a similar form.

For example, in the case of an SRS, comb=2 is currently used, but a case where comb=4 is used may be defined. In this case, an SRS sequence transmitted by a UE may be determined to be the sequence of a reservation signal transmitted by the corresponding UE. Other SRS sequences may be determined to be the sequence of reservation signals transmitted by different UEs and may be cancelled when a CCA determination is performed.)

Alternatively, a cyclic shift (CS) value ($n_{DMRS,\lambda}^{(2)}$ value) applied for each UE may be applied in a form in which the CS value is mapped and defined by an UL grant (e.g., the value of a cyclic shift field). In this case, a DMRS sequence generated by applying the cyclic shift (CS) value ($n_{DMRS,\lambda}^{(2)}$ value)(s) determined by the UL grant (e.g., the cyclic shift field value) may be determined to be the sequence of a reservation signal transmitted by a different UE and may be cancelled when a CCA determination is performed.

The aforementioned present embodiment is described below with reference to the drawing.

FIG. 26 is a diagram illustrating a method of transmitting uplink data in the unlicensed band according to an embodiment of the present invention.

Referring to FIG. 26, a UE receives CCA configuration information from an eNB (S2601).

In this case, the CCA configuration information may include the aforementioned reservation signal set. In this case, the reservation signal set may include a reservation signal mapped to a reference signal transmitted by the corresponding UE and a reservation signal transmitted by a co-scheduled candidate UE for UL MU-MIMO transmission that should be cancelled by the UE for a CCA determination.

However, if a set of reservation signals (e.g., a DMRS sequence set) have been previously defined as in Table 30, the UE may not receive the CCA configuration information from the eNB. That is, in this case, step S2601 may be omitted.

The UE receives uplink scheduling information (i.e., downlink control information) within a cell operating in the unlicensed band from the eNB (S2602).

In this case, the uplink scheduling information may include a reference signal parameter, that is, information used to determine (or generate) a reservation signal (or a reference signal (a DMRS, an SRS, etc.)) transmitted by the UE.

For example, if a DMRS sequence set is used as the reservation signal set as in Table 30, a cyclic shift field within the uplink scheduling information may be used as a reference signal parameter.

In this case, the uplink scheduling information may be referred to as uplink resource allocation information or an uplink grant, and may be included in an UL-related DCI format (e.g., the DCI formats 0, 4) and transmitted to the UE.

Furthermore, in the LAA denoting a carrier aggregation of a cell (S cell) operating in the unlicensed band and a cell (P cell) operating in the licensed band, the uplink scheduling information may be transmitted in the cell operating in the licensed band.

The UE senses (or listens to) the channel of the cell operating in the unlicensed band (S2603).

The UE may sense (or listen to) the channel in a specific period unit (hereinafter referred to as a "CCA slot") in order to determine whether the channel of the corresponding cell is the occupied state (busy/occupied) or the idle state (idle/unoccupied/free).

In this case, the UE may determine the state of the channel by applying the aforementioned channel access operation (e.g., a channel access operation in the FBE, LBE or LAA environment).

The UE may sense (or listen to) the channel for CCA slot duration, and may determine the corresponding CCA slot duration to be the unoccupied state if the energy (or power) detected by the UE is smaller than a predetermined threshold.

In this case, the UE may detect energy (or power) of the remaining signals by cancelling a reservation signal transmitted by a co-scheduled candidate UE for UL MU-MIMO transmission, and may compare the detected energy (or power) with the predetermined threshold.

The UE may determine a reservation signal set that should be cancelled in a CCA determination depending on a reservation (initial) signal (or a reference signal) provided to the corresponding UE within the reservation signal set. A relation between the initial (reservation) signal of the UE and a signal that should be cancelled in a CCA determination may be previously defined or may be configured in the UE through higher layer signaling (e.g., RRC signaling).

In this case, the reservation (initial) signal of the corresponding UE may be determined based on a reference signal parameter within the uplink scheduling information at step S2602. For example, the sequence of the reservation signal of the corresponding UE may be determined based on a predetermined layer index and the value of the cyclic shift field within the uplink scheduling information. In this case, the sequence of a reservation signal transmitted by a different UE may be determined based on a layer index other than the predetermined layer index and the value of the cyclic shift field within the uplink scheduling information.

As a result, the UE may identify a reservation signal transmitted by a different UE that is determined based on its own reservation signal, and may cancel the identified reservation signal when performing a CCA determination. That is, the UE may cancel reservation signals transmitted by different UEs by performing a correlation.

If the channel is sensed to be the idle state, the UE transmits a reservation signal (S2604).

As described above, the reservation (initial) signal of the UE may be determined based on a reference signal parameter within the uplink scheduling information at step S2602. For example, the sequence of the reservation signal of the corresponding UE may be determined based on the predetermined layer index and the value of the cyclic shift field within the uplink scheduling information.

In this case, the UE may repeatedly transmit the reservation signal in a specific period unit before a time resource indicated in the uplink scheduling information received at step S2602 after the channel is sensed to be the unoccupied state.

The UE transmits uplink data to the eNB in radio resources indicated in the uplink scheduling information (S2605).

The method proposed in the present invention is summarized again. A form in which the reservation signal of a UE may be basically defined or configured in the UE according to the following four options.

(1) A previously fixed single operation (e.g., definition on the standard)

As in the aforementioned embodiment 4, a reservation signal set may be defined and the CCA operation of a UE may be defined based on an association (mapping) relation with the reference signal of the UE. That is, assuming that a corresponding UE may transmit a reservation signal associated with (mapped to) the reference signal of the UE and different UEs transmit the remaining reservation signals within a reservation signal set, the remaining reservation signals may be cancelled when a CCA determination is performed. For example, a UE operation fixed by an association relation based on Table 30 (or based on a similar modified table) may be defined.

(2) An operation according to a higher layer configuration

As in the aforementioned embodiment 3, related information for generating a sequence to be used for the transmission of a reservation signal by a corresponding UE may be configured to the UE in a semi-static manner based on higher layer signaling (e.g., RRC, MAC CE signaling). Information related to a sequence set that should be detected when UL MU-MIMO transmission is performed and that should be cancelled when a CCA determination is performed may also be configured in the UE through higher layer signaling in a semi-static manner.

(3) As in the aforementioned embodiment 3, related information for generating a sequence to be used for the transmission of a reservation signal by a corresponding UE may be configured to the UE in a semi-static manner through higher layer signaling (e.g., RRC or MAC CE signaling). Information related to a sequence set that should be detected when UL MU-MIMO transmission is performed and that should be cancelled when a CCA determination is performed may also be configured in the UE through higher layer signaling in a semi-static manner.

In this case, the corresponding sequence (i.e., a reservation signal) may be randomized (or subjected to sequence hopping) in a specific time unit (e.g., a subframe or slot number).

That is, in the same state as the above (2) description, additional randomization or an additional hopping pattern may be indicated/configured in the UE on higher layer signaling (e.g., RRC or MAC CE signaling).

Alternatively, a plurality of randomization methods or hopping patterns may be configured to a UE through higher layer signaling and a specific randomization method or a specific hopping pattern may be dynamically indicated to a UE through DCI. Accordingly, the UE can be aware that it has to apply which sequence (or which sequence will be applied) based o a current time point (i.e., a subframe or slot number).

(4) An RRC parameter set (i.e., parameter information related to a sequence to be used as a reservation signal) may be provided to a UE through higher layer signaling (e.g., RRC signaling). Furthermore, a sequence to be finally used as a reservation signal by a UE may be dynamically assigned to the UE through an L1 (i.e., physical layer) UL grant (DCI) (i.e., CCA indication information). That is, which RRC parameter is used may be specified by CCA indication information. Furthermore, the UE may cancel a reservation signal identified through the RRC parameter and specified by the CCA indication information when performing a CCA determination.

Embodiment 5

In yet another embodiment of the present invention, a sequence corresponding to a corresponding reservation signal may be previously defined in a cell-specific, operator-specific or inter-operator-specific manner. In this case, a UE for which UL MU-MIMO transmission has been scheduled may transmit a predefined reservation signal. Accordingly, the UE may cancel a corresponding reservation signal when performing a CCA determination when the corresponding reservation signal is found in its own CCA determination process regardless of a predefined reservation signal transmitted by which UE.

For example, a sequence (e.g., DMRS sequence) corresponding to a corresponding reservation signal may be fixedly defined in a cell-specific manner and transferred to UEs through cell-specific signaling (e.g., an RRC-common message) or UE-specific signaling (e.g., UE-dedicated RRC signaling).

That is, in this case, a gain according to sequence orthogonality (e.g., orthogonality according to a cyclic shift (CS)), such as that in the aforementioned various methods, cannot be expected. However, there may be no great performance deterioration through only a sequence that has been fixed and defined in a cell-specific manner because the transmission length of a reservation signal may be relatively shorter than the length of an UL data packet transmitted by a UE when viewed in average.

As a result, in this case, the UE may cancel a corresponding reservation signal when performing a CCA determination if the corresponding reservation signal is found in its own CCA determination process regardless of a fixed specific reservation signal transmitted by a different UE. Furthermore, if a channel is determined to be the channel unoccupied state, a corresponding UE may transmit such a fixed same reservation signal before it transmits its own UL data.

In this method, a corresponding reservation signal may be a signal defined over a specific fixed band (e.g., a full band). Alternatively, the reservation signal may be a specific fixed and associated reservation signal corresponding to the scheduled PUSCH band (or a specific length associated with the scheduled PUSCH band) of each UE.

In this case, particularly, in the case of a frequency division multiplexed (FDMed)" reservation signal, a UE may be defined or configured to extract only a signal part, corresponding to a corresponding scheduled band, from the reservation signal of a full band and to transmit the extracted signal part. In this case, a separate reservation signal may be defined for each FDMed band or may be configured in the UE.

For another example, a sequence (e.g., DMRS sequence) corresponding to a corresponding reservation signal may be fixedly defined in an operator-specific manner. Most (at least one) of the descriptions related to the form in which a sequence corresponding to a reservation signal is configured in a cell-specific manner in the aforementioned embodiment may also be identically applied to the present embodiment.

However, in view of characteristics in an overall operation, a corresponding reservation signal is designed in an operator-specific manner so that an effect/characteristic expected if a sequence is configured in a cell-specific manner in the previous embodiment is further extended. That is, this means that all of UEs transmit reservation signals having the same between neighbor cells.

Even in the aforementioned UL MU-MIMO transmission viewpoint, a reservation signal (or reservation signal set) of a single form may be defined. Likewise, a UE may perform an operation, such as cancelling a reservation signal in a CCA determination and transmitting a corresponding reservation signal.

As described above, in accordance with the form of a reservation signal defined/designed in an operator-specific manner, although a UE performs handover (HO) to a neighbor cell, the UE identically maintains and applies a method of transmitting a reservation signal known in a previous cell unless separate additional signaling (e.g., RRC signaling) is present. The reason for this is that a reservation signal is defined in an operator-specific manner.

The above method may be further extended, and a sequence (e.g., DMRS sequence) corresponding to a reservation signal may be fixedly defined in an inter-operator. In this case, an operation and/or protocol for exchanging configuration parameters related to a reservation signal (e.g., at least one of the parameters described in the aforementioned embodiment) of a UE through X2 signaling between cells may be defined and used as described above.

For more stable UE control, whenever the UE performs HO, a corresponding new cell may always configure a configuration related to the transmission of a reservation signal (e.g., at least one of the parameters described in the aforementioned embodiment) in a corresponding UE. In this case, for an operator-specific operation, whenever the same information may be configured/provided to the UE again whenever a serving cell is changed.

As described above, even in the present embodiment, in order for the signal waveform of a predefined fixed reservation signal in the time domain to have a repetition pattern in a specific CCA slot duration unit (e.g., 20 µs), a sequence of a form in which 0 is inserted (zero insertion) (or substituted with 0) at specific intervals may be defined and configured in a UE as the sequence of a default reservation signal.

And/or, in the case of the sequence of a predefined fixed reservation signal, all of operations of hopping a corresponding waveform over, such as "slot hopping" (i.e., frequency hopping in a slot unit), may be defined or configured in a UE so that they are disabled.

And/or, in the case of the sequence of a predefined fixed reservation signal, a CP is not inserted, and a corresponding waveform may be defined or configured in a UE so that it continues to be transmitted right before UL data transmission.

Furthermore, a "CCA slot" length (e.g., 60 µs) may be defined to be longer than a CCA slot length (e.g., 20 µs) (by several multiples) when common UL transmission is performed (e.g., in the case of SU-MIMO transmission).

Referring back to FIG. 23, the UE receives uplink scheduling information (i.e., downlink control information) within a cell operating in the unlicensed band from the eNB (S2301).

In this case, the uplink scheduling information may be referred to as uplink resource allocation information or an uplink grant, and may be included in an UL-related DCI format (e.g., the DCI format 0, 4, etc.) and transmitted to the UE.

Furthermore, in the LAA denoting a carrier aggregation of a cell (S cell) operating in the unlicensed band and a cell (P cell) operating in the licensed band, the uplink scheduling information may be transmitted from the cell operating in the licensed band.

The UE senses (or listens to) the channel of the cell operating in the unlicensed band (S2302).

The UE may sense (or listen to) the channel in a specific period unit (hereinafter referred to as a "CCA slot") in order to determine whether the channel of the corresponding cell is the occupied state (busy/occupied) or the idle state (idle/ unoccupied/free).

In this case, a UE may determine the state of the channel by applying the aforementioned channel access operation (e.g., the channel access operation in the FBE, LBE or LAA environment).

The UE may sense (or listen to) the channel for CCA slot duration. If energy (or power) detected by the UE is smaller than a predetermined threshold, the UE may determine the corresponding CCA slot duration to be the unoccupied state.

In this case, the UE may detect energy (or power) of the remaining signals other than a reservation signal predefined in a cell-specific, operator-specific or inter-operator-specific manner, and may compare the detected energy (or power) with a predetermined threshold.

If the channel is sensed to be the idle state, the UE transmits a reservation signal (S2303).

Likewise, the UE may transmit a reservation signal predefined in a cell-specific, operator-specific or inter-operator-specific manner.

In this case, the UE may repeatedly transmit the reservation signal in a specific period unit before a time resource indicated by the uplink scheduling information received at step S2301 from the time when the channel is sensed to be the unoccupied state.

The UE transmits uplink data to the eNB in radio resources assigned by the uplink scheduling information (S2304).

Embodiment 6

In yet another embodiment of the present invention, a parameter, format and/or form related to the transmission of a specific default reservation signal may be previously defined in the standard.

In this case, a UE may apply the parameter, format and/or form related to the transmission of the specific default reservation signal until it receives additional signaling.

If the configuration related to the transmission of the reservation signal is transmitted by a specific cell (e.g., through RRC signaling), the UE may first apply the received information.

The UE may define or configure a reservation signal (e.g., the form of a reservation signal) transmitted by the UE through separate higher layer signaling (e.g., RRC signaling). That is, the UE may receive reservation signal configuration information, including a parameter, format and/or form related to the transmitted reservation signal, from an eNB. For example, what the reservation signal has which form of a waveform may be defined or configured by higher layer signaling.

A combination of the aforementioned embodiments 2 to 4 may be applied to the present embodiment.

That is, in the aforementioned embodiments 2 to 4, when the CCA configuration information (if the CCA configuration information is present in the case of the embodiment 4) is transmitted to the UE through higher layer signaling (e.g., RRC signaling), the UE may first apply the received information. That is, the UE may transmit a predefined default reservation signal as a reservation signal until it receives the CCA configuration information, and may cancel the default reservation signal when performing a CCA determination.

Furthermore, when HO is performed, the UE may be defined to comply with a configuration related to the transmission of a reservation signal which has been applied in a cell prior to the HO or to comply with a configuration basically defined in the standard before additional signaling (i.e., the configuration related to the transmission of the reservation signal) is transmitted. For example, if a UE receives CCA configuration information from a cell prior to HO and performs the CCA operation described in the embodiments 2 to 4, the UE may perform same CCA operation until it receives additional signaling (i.e., a configuration related to the transmission of a reservation signal) from a new cell after the HO is completed. In contrast, if the UE performs a CCA operation using a predefined default reservation signal because CCA configuration information is not received from a cell prior to the HO, the UE may perform the same CCA operation before additional signaling (i.e., a configuration related to the transmission of a reservation signal) is received from a new cell after the HO is completed.

In addition, signaling for resetting configuration information related to the transmission of a corresponding reservation signal may be transmitted to a UE.

In this case, when the configuration information related to the transmission of a reservation signal is reset, the UE may be defined to comply with a configuration related to the transmission of a specific default reservation signal defined in the standard.

Alternatively, when the configuration information related to the transmission of a reservation signal is reset, the UE may be defined to transmit a random signal not defined as a reservation signal.

Alternatively, when the configuration information related to the transmission of a reservation signal is reset, the UE may initiate uplink data transmission in the case of "channel unoccupied" when a point of time at which corresponding scheduled uplink data is transmitted is reached without transmitting a reservation signal.

As described above, even in the present embodiment, in order for the signal waveform of a default reservation signal in the time domain to have a repetition pattern in a specific CCA slot duration unit (e.g., 20 μs), a sequence of a form in which zero is inserted (or substituted with 0) at specific intervals may be defined or configured in a UE as a sequence of a default reservation signal.

And/or, in the case of the sequence of a default reservation signal, all of operations of hopping a corresponding waveform over time, such as "slot hopping" (i.e., frequency hopping in a slot unit), may be defined or configured in a UE so that they are disabled.

And/or, in the case of the sequence of a default reservation signal, a CP is not inserted and a corresponding waveform may be defined or configured in a UE so that it continues to be transmitted right before UL data transmission.

Furthermore, a "CCA slot" length (e.g., 60 μs) may be defined to be longer than a CCA slot length (e.g., 20 μs) (by several multiples) when common UL transmission is performed (e.g., in the case of SU-MIMO transmission).

Embodiment 7

Assuming an FBE operation, it may be more advantageous that each UE does not transmit a reservation signal itself depending on the environment when perform UL MU-MIMO transmission.

The reason for this is that in particular, in the environment in which a cell radius is not so great, if a definition/configuration has been set so that transmission is performed only when "channel unoccupied" is determined based on a CCA determination right before UL transmission timing agreed when an UL MU-MIMO grant is transmitted, there is a high possibility that the simultaneous transmission of UEs determined to be "channel unoccupied" may not be effectively reflected in energy detection when the UEs perform CCA determinations.

The reason for this is that although a point of time at which transmission is started may be different by a difference between timing advances (TAs) because each UE has a different TA value, such a difference between the points of time of transmission may be a marginal level compared to a "CCA slot" (e.g., 20 μs). For example, if there is a difference of a 300 m distance, a difference between points of time of transmission may correspond to a difference of 1 μs.

Accordingly, the present embodiment proposes a signaling method for an eNB to indicate whether a specific reservation (initial) signal will be transmitted or not right before the PUSCH transmission of a UE when the eNB provides an UL grant through DCI.

For example, 1-bit indication may be used. If the bit value is "1", it may indicate that a reservation (initial) signal is transmitted by a UE (or the UE can transmit the reservation (initial) signal. In contrast, if the bit value is "0", it may indicate that a UE does not necessarily transmit a reservation (initial) signal and initiates PUSCH transmission in the case of "channel unoccupied" according to a CCA determination right before the PUSCH transmission.

For example, if the bit value is "1", it may be an UL SU-MIMO grant. If the bit value is "0", it may be construed as being an UL MU-MIMO grant.

The indication may be transmitted to a UE through DCI, and may switch (or toggle) whether an initial (reservation) signal is transmitted (can be transmitted) through an MAC CE or RRC signaling.

A combination of the aforementioned embodiments 1 to 6 may be applied to the present embodiment.

That is, in the aforementioned embodiments 1 to 6, the uplink scheduling information may further include an indicator indicating whether a reservation (initial) signal will be transmitted or not.

As a result, if the transmission of a reservation (initial) signal is indicated in PUSCH scheduling information, a UE may transmit a reservation signal determined through higher layer signaling or may transmit a predefined default reservation signal. In contrast, the UE may not transmit a reservation signal if the transmission of a reservation (initial) signal is not indicated in PUSCH scheduling information (although the UE receives CCA configuration information through higher layer signaling, etc.).

In the aforementioned embodiments 1 to 7, a reservation signal that needs to be transmitted by a corresponding UE as a reservation signal (and/or a reservation signal that needs to be cancelled when a CCA determination is performed (e.g., a DMRS sequence (and/or a DMRS sequence)) when a CCA determination is performed may be defined/configured so that it is always transmitted in a fixed specific bandwidth (i.e., a specific number of fixed PRBs, for example, a total system bandwidth).

In other words, the scheduled band of the PUSCH transmission of a corresponding UE may be some band of a total system bandwidth. In contrast, a reservation signal (and/or a reservation signal that needs to be cancelled when a CCA determination is performed) transmitted prior to corresponding PUSCH transmission may be defined or configured so that it is always transmitted in a specific bandwidth (e.g., a full band). If the transmission bandwidth of a reservation signal is fixed as described above, there is an advantage that an implementation of a UE is simplified.

Furthermore, in the aforementioned embodiments 1 to 7, assuming that symbol duration when common uplink signal transmission is performed is 66 μs (e.g., 1 OFDM symbol or 1 SC-FDMA symbol), a CCA slot may be defined to be shorter (e.g., 20 μs) than the symbol duration or such CCA slot may be configured in a UE.

A system operation may be preferable if the CCA slot is defined/configured to be shorter than the symbol duration as described above.

In this case, it is also necessary to define the signal waveform of the reservation signal in the time domain so that it has short symbol duration corresponding to a short CCA slot. Accordingly, the signal waveform of the reservation signal in the time domain can form a short pattern by applying zero insertion in a proper number (e.g., at specific intervals) as described above.

For example, it is assumed that a corresponding reservation signal is defined to be always transmitted in a specific band (e.g., S RB(s), that is, a full band) as described above and the corresponding reservation signal is defined to be repeatedly transmitted in a length k times shorter than the existing one symbol duration. In this case, a base sequence of a length corresponding to S/K RBs may be selected and (fixedly) applied as the sequence of the corresponding reservation signal. In this case, a sequence of a total of S RB length may be generated by applying a (K−1) number of 0 insertions between the elements of the base sequence having the length of the S/K RB. Furthermore, the sequence of the S RB length may be defined or configured in a UE so that it is used as the transmission sequence of the corresponding reservation signal. The signal waveform in the time axis may form K repetition patterns.

As another method, in the aforementioned embodiments 1 to 7, the transmission band of a corresponding reservation signal may be defined in a form in which the reservation signal is transmitted to the extent identical with the transmission band of a PUSCH through which a corresponding UE has received an UL grant or may be configured to the UE.

Even in this case, if a form in which a signal waveform is repeatedly transmitted in a short length of K times as described above is required, a sequence for the form may be defined separately (e.g., separately for each possible band).

Alternatively, the form may be defined or configured to a UE in such a way as to generate the sequence by applying the (K−1) number of 0 insertions as described above.

Alternatively, in order to prevent a UE implementation from becoming excessively complicated, one form of a reservation signal corresponding to some PUSCH transmission band candidate groups may be defined. Accordingly, groups may be divided into a number smaller than a total number of PUSCH transmission band candidates, and a form of a reservation signal may be defined or configured in a UE for each group.

At least one of the operations proposed in the aforementioned embodiments 1 to 7 may be defined or configured in a UE so that it is limitedly applied to a case where an LBE operation is applied.

General Apparatus to which an Embodiment of the Present Invention May be Applied FIG. 27 illustrates a block diagram of a wireless communication apparatus according to an embodiment of the present invention.

Referring to FIG. 27, the wireless communication system includes an eNB 2710 and a plurality of pieces of UE 2720 located within the area of the eNB 2710.

The eNB 2710 includes a processor 2711, memory 2712, and a radio frequency (RF) unit 2713. The processor 2711 implements the functions, processes and/or methods proposed in FIGS. 1 to 26. The layers of a wireless interface protocol may be implemented by the processor 2711. The memory 2712 is connected to the processor 2711 and stores various pieces of information for driving the processor 2711. The RF unit 2713 is connected to the processor 2711 and transmits and/or receives a radio signal.

The UE 2720 includes a processor 2721, memory 2722, and an RF unit 2723. The processor 2721 implements the functions, processes and/or methods proposed in FIGS. 1 to 26. The layers of a wireless interface protocol may be implemented by the processor 2721. The memory 2722 is connected to the processor 2721 and stores various pieces of information for driving the processor 2721. The RF unit 2723 is connected to the processor 2721 and transmits and/or receives a radio signal.

The memory 2712, 2722 may be inside or outside the processor 2711, 2721 and connected to the processor 2711, 2721 by various well-known means. Furthermore, the eNB 2710 and/or the UE 2720 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

A method for a UE to transmit uplink data in the unlicensed band in a wireless communication system of the present invention has been illustrated as being applied to the 3GPP LTE/LTE-A systems, but may be applied to various wireless communication systems in addition to the 3GPP LTE/LTE-A systems.

The invention claimed is:

1. A method of transmitting, by a first user equipment (UE), uplink (UL) data in an unlicensed band in a wireless communication system, the method comprising:
    receiving, from an evolved NodeB (eNB), UL scheduling information on a cell operating in an unlicensed band;
    sensing whether a channel of the cell is in an idle state based on the energy of one or more signals;
    receiving, from the eNB, clear channel assessment (CCA) configuration information for detecting a first reservation signal transmitted by a second UE co-scheduled with the first UE for a UL multi-user multiple input multiple output (MU-MIMO) transmission;
    detecting the first reservation signal based on the CCA configuration;
    cancelling the detected first reservation signal among the one or more signals,
    transmitting, to the eNB, a second reservation signal when the channel is in the idle state; and
    transmitting, to the eNB, the UL data on the channel based on the UL scheduling information,
    wherein a sequence of the second reservation signal is determined based on a predetermined layer index and a value of a cyclic shift field within the UL scheduling information, and
    wherein a sequence of the first reservation signal is determined based on a layer index other than the predetermined layer index and the value of the cyclic shift field within the uplink scheduling information.

2. The method of claim 1, wherein the second reservation signal is repeatedly transmitted in a specific period unit before the UL data is transmitted.

3. The method of claim 1, wherein cancelling the first reservation signal and sensing the idle state of the channel is enabled explicitly or implicitly by the UL scheduling information.

4. The method of claim 1, wherein at least one of a demodulation reference signal (DMRS), a sounding reference signal (SRS), a synchronization signal (SS) or a sidelink synchronization signal (sidelink SS, SLSS) is used as the first reservation signal and the second reservation signal.

5. The method of claim 1, wherein the first reservation signal and the second reservation signal are a predetermined cell-specific signal an operator-specific signal or an inter-operator-specific signal.

6. The method of claim 1, further comprising:
    receiving reservation signal configuration information for the first reservation signal from the eNB, wherein the UE transmits a predetermined default reservation signal before the UE receives the reservation signal configuration information.

7. The method of claim 1, wherein the UL scheduling information comprises information indicating whether the UE needs to transmit the second reservation signal.

8. The method of claim 1, wherein the sequence of the first reservation signal and the sequence of the second reservation signal have a form in which 0 is inserted at specific intervals.

9. The method of claim 1, wherein after an inverse fast Fourier transform (IFFT) is applied to the first reservation signal and the second reservation signal, a cyclic prefix is not inserted into the reservation signals.

10. The method of claim 1, wherein the first reservation signal and the second reservation signal are transmitted in a predetermined bandwidth or a transmission bandwidth assigned by the uplink scheduling information.

11. A first user equipment (UE) transmitting uplink (UL) data in an unlicensed band in a wireless communication system, the UE comprising:
    a transceiver for transceiving radio signals; and
    a processor controlling the transceiver,
    wherein the processor is configured to:
    control the transceiver to receive, from an evolved NodeB (eNB), UL scheduling information on a cell operating in an unlicensed band,
    sense whether a channel of the cell is in an idle state based on the energy of one or more signals,
    control the transceiver to receive, from the eNB, clear channel assessment (CCA) configuration information for detecting a first reservation signal transmitted by a second UE co-scheduled with the first UE for a UL multi-user multiple input multiple output (MU-MIMO) transmission,
    detect the first reservation signal based on the CCA configuration, and
    cancel the detected first reservation signal among the one or more signals,
    control the transceiver to transmit, to the eNB, a second reservation signal when the channel is in the idle state, and
    control the transceiver to transmit, to the eNB, the UL data on the channel based on the UL scheduling information,
    wherein a sequence of the second reservation signal is determined based on a predetermined layer index and a value of a cyclic shift field within the UL scheduling information, and
    wherein a sequence of the first reservation signal is determined based on a layer index other than the predetermined layer index and the value of the cyclic shift field within the uplink scheduling information.

* * * * *